(12) United States Patent
Kühnemund

(10) Patent No.: US 12,435,364 B2
(45) Date of Patent: Oct. 7, 2025

(54) PROBES COMPRISING A SPLIT BARCODE REGION AND METHODS OF USE

(71) Applicant: 10x Genomics, Inc., Pleasanton, CA (US)

(72) Inventor: Malte Kühnemund, Stockholm (SE)

(73) Assignee: 10x Genomics, Inc., Pleasanton, CA (US)

( * ) Notice: Subject to any disclaimer, the term of this patent is extended or adjusted under 35 U.S.C. 154(b) by 416 days.

(21) Appl. No.: 17/888,361

(22) Filed: Aug. 15, 2022

(65) Prior Publication Data
US 2023/0061542 A1 Mar. 2, 2023

Related U.S. Application Data

(60) Provisional application No. 63/233,599, filed on Aug. 16, 2021.

(51) Int. Cl.
| | |
|---|---|
| *C12Q 1/6841* | (2018.01) |
| *C12Q 1/6827* | (2018.01) |
| *C12Q 1/6837* | (2018.01) |
| *C12Q 1/6851* | (2018.01) |
| *C12Q 1/6876* | (2018.01) |

(52) U.S. Cl.
CPC ......... *C12Q 1/6841* (2013.01); *C12Q 1/6827* (2013.01); *C12Q 1/6837* (2013.01); *C12Q 1/6876* (2013.01); *C12Q 1/6851* (2013.01)

(58) Field of Classification Search
CPC ............ C12Q 1/6841; C12Q 2531/125; C12Q 2533/107; C12Q 2537/162
See application file for complete search history.

(56) References Cited

U.S. PATENT DOCUMENTS

| | | | |
|---|---|---|---|
| 4,318,846 | A | 3/1982 | Khanna et al. |
| 4,683,195 | A | 7/1987 | Mullis et al. |
| 4,683,202 | A | 7/1987 | Mullis |
| 4,757,141 | A | 7/1988 | Fung et al. |
| 4,800,159 | A | 1/1989 | Mullis et al. |
| 4,849,336 | A | 7/1989 | Miyoshi et al. |

(Continued)

FOREIGN PATENT DOCUMENTS

| | | | | |
|---|---|---|---|---|
| EP | 3447152 A1 | * | 2/2019 | ........... C12Q 1/6806 |
| WO | WO 1991/017160 | | 11/1991 | |

(Continued)

OTHER PUBLICATIONS

Archer et al., "Selective and flexible depletion of problematic sequences from RNA-seq libraries at the cDNA stage," BMC Genomics. (2014) 15(1):401.

(Continued)

*Primary Examiner* — Joseph G. Dauner
(74) *Attorney, Agent, or Firm* — MORRISON & FOERSTER LLP

(57) ABSTRACT

In some aspects, the present disclosure relates to methods for reducing the detection of false positive ligation events. In some aspects, the method comprises use of a double split (or "split split") probe. The methods herein have particular applicability in reducing the detection of false positive ligation events when using ligases that have high ligation efficiency but low specificity (e.g., SplintR® ligase). Also provided are kits comprising probes for use in such methods.

20 Claims, 9 Drawing Sheets

Specification includes a Sequence Listing.

(56) References Cited

U.S. PATENT DOCUMENTS

| | | |
|---|---|---|
| 4,965,188 A | 10/1990 | Mullis et al. |
| 5,066,580 A | 11/1991 | Lee |
| 5,091,519 A | 2/1992 | Cruickshank |
| 5,151,507 A | 9/1992 | Hobbs et al. |
| 5,188,934 A | 2/1993 | Menchen |
| 5,198,537 A | 3/1993 | Huber et al. |
| 5,344,757 A | 9/1994 | Holtke et al. |
| 5,354,657 A | 10/1994 | Boehringer et al. |
| 5,366,860 A | 11/1994 | Bergot et al. |
| 5,512,462 A | 4/1996 | Cheng |
| 5,599,675 A | 2/1997 | Brenner |
| 5,635,352 A | 6/1997 | Urdea et al. |
| 5,688,648 A | 11/1997 | Mathies |
| 5,695,940 A | 12/1997 | Drmanac et al. |
| 5,702,888 A | 12/1997 | Holtke et al. |
| 5,750,341 A | 5/1998 | Macevicz |
| 5,800,996 A | 9/1998 | Lee et al. |
| 5,847,162 A | 12/1998 | Lee et al. |
| 5,990,479 A | 11/1999 | Weiss et al. |
| 6,054,274 A | 4/2000 | Sampson et al. |
| 6,172,218 B1 | 1/2001 | Brenner |
| 6,207,392 B1 | 3/2001 | Weiss et al. |
| 6,251,303 B1 | 6/2001 | Bawendi et al. |
| 6,265,552 B1 | 7/2001 | Schatz |
| 6,291,187 B1 | 9/2001 | Kingsmore et al. |
| 6,306,597 B1 | 10/2001 | Macevicz |
| 6,319,426 B1 | 11/2001 | Bawendi et al. |
| 6,322,901 B1 | 11/2001 | Bawendi et al. |
| 6,323,009 B1 | 11/2001 | Lasken et al. |
| 6,344,329 B1 | 2/2002 | Lizardi et al. |
| 6,368,801 B1 | 4/2002 | Faruqi |
| 6,391,937 B1 | 5/2002 | Beuhler et al. |
| 6,423,551 B1 | 7/2002 | Weiss et al. |
| 6,426,513 B1 | 7/2002 | Bawendi et al. |
| 6,444,143 B2 | 9/2002 | Bawendi et al. |
| 6,534,266 B1 | 3/2003 | Singer |
| 6,576,291 B2 | 6/2003 | Bawendi et al. |
| 6,828,109 B2 | 12/2004 | Kaplan et al. |
| 6,969,488 B2 | 11/2005 | Bridgham et al. |
| 7,057,026 B2 | 6/2006 | Barnes et al. |
| 7,255,994 B2 | 8/2007 | Lao |
| 7,264,929 B2 | 9/2007 | Rothberg et al. |
| 7,345,159 B2 | 3/2008 | Ju et al. |
| 7,473,767 B2 | 1/2009 | Dimitrov |
| 7,534,991 B2 | 5/2009 | Miller et al. |
| 7,544,794 B1 | 6/2009 | Benner |
| 7,555,155 B2 | 6/2009 | Levenson et al. |
| 7,566,537 B2 | 7/2009 | Balasubramanian et al. |
| 7,632,641 B2 | 12/2009 | Dirks et al. |
| 7,655,898 B2 | 2/2010 | Miller |
| 7,721,721 B1 | 5/2010 | Kronengold et al. |
| 7,893,227 B2 | 2/2011 | Wu et al. |
| 7,910,304 B2 | 3/2011 | Drmanac |
| 7,914,987 B2 | 3/2011 | Fredriksson et al. |
| 7,941,279 B2 | 5/2011 | Hwang et al. |
| 7,989,166 B2 | 8/2011 | Koch et al. |
| 8,124,751 B2 | 2/2012 | Pierce et al. |
| 8,199,999 B2 | 6/2012 | Hoyt et al. |
| 8,268,554 B2 | 9/2012 | Schallmeiner |
| 8,330,087 B2 | 12/2012 | Domenicali |
| 8,415,102 B2 | 4/2013 | Geiss et al. |
| 8,431,691 B2 | 4/2013 | McKernan et al. |
| 8,460,865 B2 | 6/2013 | Chee et al. |
| 8,462,981 B2 | 6/2013 | Determan et al. |
| 8,481,258 B2 | 7/2013 | Church et al. |
| 8,519,115 B2 | 8/2013 | Webster et al. |
| 8,551,710 B2 | 10/2013 | Bernitz et al. |
| 8,580,504 B2 | 11/2013 | Fredriksson et al. |
| 8,632,975 B2 | 1/2014 | Vander Horn et al. |
| 8,658,361 B2 | 2/2014 | Wu et al. |
| 8,771,950 B2 | 7/2014 | Church et al. |
| 8,986,926 B2 | 3/2015 | Ferree et al. |
| 9,201,063 B2 | 12/2015 | Sood et al. |
| 9,217,178 B2 | 12/2015 | Fedurco et al. |
| 9,273,349 B2 | 3/2016 | Nguyen et al. |
| 9,371,563 B2 | 6/2016 | Geiss et al. |
| 9,371,598 B2 | 6/2016 | Chee |
| 9,376,717 B2 | 6/2016 | Gao et al. |
| 9,512,422 B2 | 12/2016 | Barnard et al. |
| 9,541,504 B2 | 1/2017 | Hoyt |
| 9,551,032 B2 | 1/2017 | Landegren et al. |
| 9,624,538 B2 | 4/2017 | Church et al. |
| 9,650,406 B2 | 5/2017 | Zhou et al. |
| 9,714,446 B2 | 7/2017 | Webster et al. |
| 9,714,937 B2 | 7/2017 | Dunaway |
| 9,727,810 B2 | 8/2017 | Fodor et al. |
| 9,778,155 B2 | 10/2017 | Gradinaru et al. |
| 9,783,841 B2 | 10/2017 | Nolan et al. |
| 9,889,422 B2 | 2/2018 | Smith et al. |
| 9,909,167 B2 | 3/2018 | Samusik et al. |
| 10,032,064 B2 | 7/2018 | Hoyt |
| 10,059,990 B2 | 8/2018 | Boyden et al. |
| 10,126,242 B2 | 11/2018 | Miller et al. |
| 10,138,509 B2 | 11/2018 | Church et al. |
| 10,179,932 B2 | 1/2019 | Church et al. |
| 10,227,639 B2 | 3/2019 | Levner et al. |
| 10,246,700 B2 | 4/2019 | Dunaway et al. |
| 10,266,888 B2 | 4/2019 | Daugharthy et al. |
| 10,267,808 B2 | 4/2019 | Cai |
| 10,309,879 B2 | 6/2019 | Chen et al. |
| 10,317,321 B2 | 6/2019 | Tillberg et al. |
| 10,364,457 B2 | 7/2019 | Wassie et al. |
| 10,370,698 B2 | 8/2019 | Nolan et al. |
| 10,415,080 B2 | 9/2019 | Dunaway et al. |
| 10,457,980 B2 | 10/2019 | Cai et al. |
| 10,465,235 B2 | 11/2019 | Gullberg et al. |
| 10,494,662 B2 | 12/2019 | Church et al. |
| 10,495,554 B2 | 12/2019 | Deisseroth et al. |
| 10,501,777 B2 | 12/2019 | Beechem et al. |
| 10,501,791 B2 | 12/2019 | Church et al. |
| 10,510,435 B2 | 12/2019 | Cai et al. |
| 10,526,649 B2 | 1/2020 | Chen et al. |
| 10,545,075 B2 | 1/2020 | Deisseroth et al. |
| 10,550,429 B2 | 2/2020 | Harada et al. |
| 10,580,128 B2 | 3/2020 | Miller |
| 10,640,816 B2 | 5/2020 | Beechem et al. |
| 10,640,826 B2 | 5/2020 | Church et al. |
| 10,669,569 B2 | 6/2020 | Gullberg et al. |
| 10,746,981 B2 | 8/2020 | Tomer et al. |
| 10,774,372 B2 | 9/2020 | Chee et al. |
| 10,774,374 B2 | 9/2020 | Frisén et al. |
| 10,794,802 B2 | 10/2020 | Gradinaru et al. |
| 10,802,262 B2 | 10/2020 | Tomer et al. |
| 10,815,519 B2 | 10/2020 | Husain et al. |
| 10,829,814 B2 | 11/2020 | Fan et al. |
| 10,844,426 B2 | 11/2020 | Daugharthy et al. |
| 10,858,698 B2 | 12/2020 | Church et al. |
| 10,872,679 B2 | 12/2020 | Cai et al. |
| 10,964,001 B2 | 3/2021 | Miller |
| 11,111,522 B2 | 9/2021 | Li et al. |
| 11,174,281 B1 | 11/2021 | Graham et al. |
| 11,287,422 B2 | 3/2022 | Previte et al. |
| 11,434,525 B2 | 9/2022 | Glezer |
| 11,459,603 B2 | 10/2022 | Tyagi et al. |
| 11,499,185 B2 | 11/2022 | Vijayan et al. |
| 11,597,965 B2 | 3/2023 | Nilsson et al. |
| 11,643,679 B2 | 5/2023 | Glezer et al. |
| 11,999,999 B2 | 6/2024 | Ju et al. |
| 12,297,499 B2 | 5/2025 | Daugharthy et al. |
| 2002/0045045 A1 | 4/2002 | Adams et al. |
| 2002/0051986 A1 | 5/2002 | Baez et al. |
| 2003/0017264 A1 | 1/2003 | Treadway et al. |
| 2005/0100900 A1 | 5/2005 | Kawashima et al. |
| 2006/0188901 A1 | 8/2006 | Barnes et al. |
| 2006/0234261 A1 | 10/2006 | Pierce et al. |
| 2006/0240439 A1 | 10/2006 | Smith et al. |
| 2006/0281109 A1 | 12/2006 | Barr et al. |
| 2007/0166705 A1 | 7/2007 | Milton et al. |
| 2009/0118128 A1 | 5/2009 | Liu et al. |
| 2010/0055733 A1 | 3/2010 | Lutolf et al. |
| 2011/0059865 A1 | 3/2011 | Smith et al. |
| 2011/0223585 A1 | 9/2011 | Gullberg et al. |
| 2011/0256183 A1 | 10/2011 | Frank et al. |
| 2012/0270305 A1 | 10/2012 | Reed et al. |

(56) References Cited

U.S. PATENT DOCUMENTS

| | | |
|---|---|---|
| 2013/0079232 A1 | 3/2013 | Kain et al. |
| 2013/0260372 A1 | 10/2013 | Buermann et al. |
| 2013/0288249 A1 | 10/2013 | Gullbert |
| 2013/0323729 A1 | 12/2013 | Landegren et al. |
| 2014/0274756 A1* | 9/2014 | Nguyen ............... C12Q 1/6816 506/9 |
| 2016/0024555 A1 | 1/2016 | Church et al. |
| 2016/0108458 A1 | 4/2016 | Frei et al. |
| 2016/0305856 A1 | 10/2016 | Boyden et al. |
| 2016/0369321 A1 | 12/2016 | Landegren et al. |
| 2016/0369329 A1 | 12/2016 | Cai et al. |
| 2016/0376642 A1 | 12/2016 | Landegren et al. |
| 2017/0009278 A1 | 1/2017 | Söderberg et al. |
| 2017/0081489 A1 | 3/2017 | Rodriques et al. |
| 2017/0101672 A1 | 4/2017 | Luo et al. |
| 2017/0211133 A1* | 7/2017 | Landegren ............ C12Q 1/6876 |
| 2017/0219465 A1 | 8/2017 | Desseroth et al. |
| 2017/0220733 A1 | 8/2017 | Zhuang et al. |
| 2017/0253918 A1 | 9/2017 | Kohman |
| 2018/0052081 A1 | 2/2018 | Kohman |
| 2018/0080876 A1 | 3/2018 | Rockel et al. |
| 2018/0208967 A1 | 7/2018 | Larman et al. |
| 2018/0237864 A1 | 8/2018 | Imler et al. |
| 2018/0251833 A1 | 9/2018 | Daugharthy et al. |
| 2018/0320226 A1 | 11/2018 | Church et al. |
| 2019/0017106 A1 | 1/2019 | Frisen et al. |
| 2019/0032121 A1 | 1/2019 | Daugharthy et al. |
| 2019/0032128 A1 | 1/2019 | Chen et al. |
| 2019/0055594 A1 | 2/2019 | Samusik et al. |
| 2019/0106733 A1 | 4/2019 | Kishi et al. |
| 2019/0112599 A1 | 4/2019 | Church et al. |
| 2019/0119735 A1 | 4/2019 | Deisseroth et al. |
| 2019/0155835 A1 | 5/2019 | Daugharthy et al. |
| 2019/0161796 A1 | 5/2019 | Hauling et al. |
| 2019/0177718 A1 | 6/2019 | Church et al. |
| 2019/0177800 A1 | 6/2019 | Boutet et al. |
| 2019/0194709 A1 | 6/2019 | Church et al. |
| 2019/0218608 A1 | 7/2019 | Daugharthy et al. |
| 2019/0233878 A1 | 8/2019 | Delaney et al. |
| 2019/0249248 A1 | 8/2019 | Beechem et al. |
| 2019/0264270 A1 | 8/2019 | Zhuang et al. |
| 2019/0271028 A1 | 9/2019 | Khafizov et al. |
| 2019/0276881 A1 | 9/2019 | Zhuang et al. |
| 2019/0339203 A1 | 11/2019 | Miller et al. |
| 2019/0367969 A1 | 12/2019 | Belhocine |
| 2019/0376956 A1 | 12/2019 | Bobrow et al. |
| 2020/0010891 A1 | 1/2020 | Beechem et al. |
| 2020/0071751 A1 | 3/2020 | Daugharthy et al. |
| 2020/0080139 A1 | 3/2020 | Cai et al. |
| 2020/0123597 A1 | 4/2020 | Daniel |
| 2020/0140920 A1 | 5/2020 | Pierce et al. |
| 2020/0224243 A1 | 7/2020 | Desai et al. |
| 2020/0224244 A1 | 7/2020 | Nilsson et al. |
| 2020/0239874 A1 | 7/2020 | Mikkelsen et al. |
| 2020/0239946 A1 | 7/2020 | Dewal |
| 2020/0354774 A1 | 11/2020 | Church et al. |
| 2020/0354782 A1 | 11/2020 | Dewal |
| 2020/0362398 A1 | 11/2020 | Kishi et al. |
| 2020/0393343 A1 | 12/2020 | Kennedy-Darling et al. |
| 2020/0399689 A1 | 12/2020 | Luo et al. |
| 2021/0017587 A1 | 1/2021 | Cai et al. |
| 2021/0115504 A1 | 4/2021 | Cai et al. |
| 2021/0164039 A1 | 6/2021 | Wang et al. |
| 2021/0198723 A1 | 7/2021 | Kuhnemund et al. |
| 2021/0222234 A1 | 7/2021 | Carlson |
| 2021/0230692 A1 | 7/2021 | Daugharthy et al. |
| 2021/0238662 A1 | 8/2021 | Bava |
| 2021/0238674 A1 | 8/2021 | Bava |
| 2021/0254140 A1 | 8/2021 | Stahl et al. |
| 2021/0262018 A1 | 8/2021 | Bava et al. |
| 2021/0277460 A1 | 9/2021 | Bava |
| 2021/0292834 A1 | 9/2021 | Daugharthy et al. |
| 2021/0310052 A1 | 10/2021 | Daugharthy et al. |
| 2021/0340618 A1 | 11/2021 | Kuhnemund et al. |
| 2021/0340621 A1 | 11/2021 | Daugharthy et al. |
| 2021/0388423 A1 | 12/2021 | Bava et al. |
| 2021/0388458 A1 | 12/2021 | Bava |
| 2022/0010358 A1 | 1/2022 | Kuhnemund et al. |
| 2022/0026433 A1 | 1/2022 | Guo et al. |
| 2022/0049302 A1 | 2/2022 | Daugharthy et al. |
| 2022/0049303 A1 | 2/2022 | Busby et al. |
| 2022/0064697 A1 | 3/2022 | Zhuang et al. |
| 2022/0083832 A1 | 3/2022 | Shah |
| 2022/0084628 A1 | 3/2022 | Shah |
| 2022/0084629 A1 | 3/2022 | Shah |
| 2022/0128565 A1 | 4/2022 | Miller et al. |
| 2022/0136049 A1 | 5/2022 | Bava et al. |
| 2022/0186300 A1 | 6/2022 | Bava |
| 2022/0195498 A1 | 6/2022 | Kuhnemund et al. |
| 2022/0213529 A1 | 7/2022 | Kuhnemund et al. |
| 2022/0228200 A1 | 7/2022 | Bava |
| 2022/0235403 A1 | 7/2022 | Costa |
| 2022/0282306 A1 | 9/2022 | Bava et al. |
| 2022/0282316 A1 | 9/2022 | Bava |
| 2022/0282319 A1 | 9/2022 | Verheyen |
| 2022/0372570 A1 | 11/2022 | Costa |
| 2022/0380838 A1 | 12/2022 | Kuhnemund et al. |
| 2022/0403458 A1 | 12/2022 | Bava |
| 2023/0002808 A1 | 1/2023 | Mignardi |
| 2023/0012607 A1 | 1/2023 | Kuhnemund et al. |
| 2023/0013775 A1 | 1/2023 | Chen et al. |
| 2023/0015226 A1 | 1/2023 | Chen et al. |
| 2023/0026886 A1 | 1/2023 | Chen |
| 2023/0031305 A1 | 2/2023 | Hernadez Neuta et al. |
| 2023/0031996 A1 | 2/2023 | Hernandez Neuta et al. |
| 2023/0035685 A1 | 2/2023 | Hernandez Neuta et al. |
| 2023/0037182 A1 | 2/2023 | Bava et al. |
| 2023/0039148 A1 | 2/2023 | Verheyen |
| 2023/0041485 A1 | 2/2023 | Hernandez Neuta et al. |
| 2023/0044650 A1 | 2/2023 | Dockter |
| 2023/0057571 A1 | 2/2023 | Costa et al. |
| 2023/0061542 A1 | 3/2023 | Kuhnemund |
| 2023/0084407 A1 | 3/2023 | Hernandez Neuta et al. |
| 2023/0159997 A1 | 5/2023 | Belhocine et al. |
| 2023/0160794 A1 | 5/2023 | Dockter et al. |
| 2023/0183787 A1 | 6/2023 | Bava et al. |
| 2023/0242974 A1 | 8/2023 | Costa et al. |
| 2023/0279465 A1 | 9/2023 | He et al. |
| 2023/0279475 A1 | 9/2023 | Kuhnemund et al. |
| 2023/0279480 A1 | 9/2023 | Kuhnemund |
| 2023/0287478 A1 | 9/2023 | Bava |
| 2023/0314327 A1 | 10/2023 | Hoffman |
| 2023/0314328 A1 | 10/2023 | Costa |
| 2023/0323427 A1 | 10/2023 | Schnall-Levin |
| 2023/0323430 A1 | 10/2023 | Shastry |
| 2023/0323437 A1 | 10/2023 | Chen et al. |
| 2023/0374573 A1 | 11/2023 | Qian et al. |
| 2023/0374580 A1 | 11/2023 | Costa |
| 2023/0416821 A1 | 12/2023 | Bava et al. |
| 2024/0002902 A1 | 1/2024 | Jakobsen et al. |
| 2024/0026426 A1 | 1/2024 | Bava |
| 2024/0026427 A1 | 1/2024 | Kuhnemund et al. |
| 2024/0026439 A1 | 1/2024 | Sasaki |
| 2024/0026448 A1 | 1/2024 | Costa |
| 2024/0035070 A1 | 2/2024 | Christopherson |
| 2024/0035071 A1 | 2/2024 | Delaney et al. |
| 2024/0035072 A1 | 2/2024 | Christopherson |
| 2024/0043910 A1 | 2/2024 | Shastry |
| 2024/0043914 A1 | 2/2024 | Chen et al. |
| 2024/0060119 A1 | 2/2024 | Bava |
| 2024/0084373 A1 | 3/2024 | Shastry |
| 2024/0084378 A1 | 3/2024 | Marks et al. |
| 2024/0101978 A1 | 3/2024 | Boghospor et al. |
| 2024/0132938 A1 | 4/2024 | Kuhnemund |
| 2024/0141418 A1 | 5/2024 | Mielinis |
| 2024/0150816 A1 | 5/2024 | Feng et al. |
| 2024/0158852 A1 | 5/2024 | Belhocine et al. |
| 2024/0167081 A1 | 5/2024 | Bava et al. |
| 2024/0175082 A1 | 5/2024 | Costa |
| 2024/0175083 A1 | 5/2024 | Bava et al. |
| 2024/0191297 A1 | 6/2024 | Christopherson et al. |
| 2024/0209330 A1 | 6/2024 | Shastry et al. |
| 2024/0218424 A1 | 7/2024 | Costa et al. |
| 2024/0218437 A1 | 7/2024 | Belhocine et al. |

(56) References Cited

U.S. PATENT DOCUMENTS

| | | | |
|---|---|---|---|
| 2024/0263219 A1 | 8/2024 | Kuhnemund | |
| 2024/0263220 A1 | 8/2024 | Olofsson | |
| 2024/0264155 A1 | 8/2024 | Costa | |

FOREIGN PATENT DOCUMENTS

| | | | | |
|---|---|---|---|---|
| WO | WO 2006/071582 | 7/2006 | | |
| WO | WO 2012/099896 | 7/2012 | | |
| WO | WO 2017/143155 | 8/2017 | | |
| WO | WO 2018/026873 | 2/2018 | | |
| WO | WO 2018/160397 | 9/2018 | | |
| WO | WO 2019/038372 | 2/2019 | | |
| WO | WO 2019/199579 | 10/2019 | | |
| WO | WO 2020/076976 | 4/2020 | | |
| WO | WO 2020/076979 | 4/2020 | | |
| WO | WO 2020/096687 | 5/2020 | | |
| WO | WO 2020/099640 | 5/2020 | | |
| WO | WO 2020/117914 | 6/2020 | | |
| WO | WO 2020/123316 | 6/2020 | | |
| WO | WO 2020/123742 | 6/2020 | | |
| WO | WO 2020/142490 | 7/2020 | | |
| WO | WO 2020/240025 | 12/2020 | | |
| WO | WO 2020/254519 | 12/2020 | | |
| WO | WO 2021/123282 | 6/2021 | | |
| WO | WO 2021/123286 | 6/2021 | | |
| WO | WO 2021/138676 | 7/2021 | | |
| WO | WO 2021/155063 | 8/2021 | | |
| WO | WO 2021/168326 | 8/2021 | | |
| WO | WO 2023/108139 | 6/2023 | | |
| WO | WO-2023096672 A1 * | 6/2023 | ........... | C12Q 1/6811 |
| WO | WO 2023/141476 | 7/2023 | | |
| WO | WO 2023/172915 | 9/2023 | | |
| WO | WO 2023/192302 | 10/2023 | | |
| WO | WO 2024/148300 | 7/2024 | | |

OTHER PUBLICATIONS

Baner et al., "Signal amplification of padlock probes by rolling circle replication," Nucleic Acids Res. (1998) 26(22):5073-5078.

Bibikova et al., "Quantitative gene expression profiling in formalin-fixed, paraffin-embedded tissues using universal bead arrays," Am J Pathol. Nov. 2004;165(5):1799-807.

Bolognesi et al., "Multiplex Staining by Sequential Immunostaining and Antibody Removal on Routine Tissue Sections," J. Histochem. Cytochem. (2017); 65(8): 431-444.

Capodieci et al., "Gene expression profiling in single cells within tissue," Nat Methods. (2005) 2(9): 663-5.

Chemeris et al., "Real-time hybridization chain reaction," Dokl Biochem Biophys. (2008) 419: 53-55.

Chen et al., "Nanoscale imaging of RNA with expansion microscopy," Nat Methods. (2016) 13:679-684.

Chen et al., "RNA imaging. Spatially resolved, highly multiplexed RNA profiling in single cells," Science. (2015) 348(6233): aaa6090. 16 pgs.

Chen et al., "Expansion Microscopy," Science (2015) 347(6221):543-548.

Choi et al., "Programmable in situ amplification for multiplexed imaging of mRNA expression," Nat Biotechnol. (2010) 28(11): 1208-1212.

Conze et al., "Single molecule analysis of combinatorial splicing," Nucleic Acids Res. (2010) 38(16): e163.

Dean et al., "Rapid Amplification Of Plasmid And Phage DNA Using Phi29 DNA Polymerase And Multiply-Primed Rolling Circle Amplification," Genome Research (2001) 11:1095-1099.

Dirks et al., "Triggered amplification by hybridization chain reaction," Proc Natl Acad Sci USA. (2004) 101(43): 15275-15278.

Eng et al., "Transcriptome-scale super-resolved imaging in tissues by RNA seqFISH," Nature. (2019) 568(7751): 235-239.

Fang et al., "Fluoride-Cleavable Biotinylation Phosphoramidite for 5'-end-Labelling and Affinity Purification of Synthetic Oligonucleotides," Nucleic Acids Res. (2003) 31(2): 708-715.

Faruqi et al., "High-throughput genotyping of single nucleotide polymorphisms with rolling circle amplification," BMC Genomics. (2001) 2:4.

Femino et al., "Visualization of single RNA transcripts in situ," Science. (1998) 280(5363): 585-90.

Forcucci et al., "All-plastic miniature fluorescence microscope for point-of-care readout of bead-based bioassays," J Biomed Opt. (2015) 20(10): 105010.

Gavrilovic et al., "Automated classification of multicolored rolling circle products in dual-channel wide-field fluorescence microscopy," Cytometry A. (2011) 79(7): 518-27.

Geiss et al., "Direct multiplexed measurement of gene expression with color-coded probe pairs," Nat Biotechnol. (2008) 26(3): 317-25.

Glass et al., "SIMPLE: a sequential immunoperoxidase labeling and erasing method," J Histochem Cytochem. (2009) 57(10); 899-905.

Goh, J.J.L. et al. (Jul. 2020, e-pub. Jun. 15, 2020). "Highly Specific Multiplexed RNA Imaging In Tissues With Split-FISH," Nat Methods 17(7):689-693. doi: 10.1038/s41592-020-0858-0. Epub Jun. 15, 2020.

Goransson et al., "A single molecule array for digital targeted molecular analyses," Nucleic Acids Res. 2009 37(1):e7. doi: 10.1093/nar/gkn921.

Gunderson et al. "Decoding randomly ordered DNA arrays." Genome research 14.5 (2004): 870-877.

Gyllborg et al., "Hybridization-based in situ sequencing (HybISS) for spatially resolved transcriptomics in human and mouse brain tissue," Nucleic Acids Res. (2020) 48(19): e112.

Han et al., "Quantum-dot-tagged microbeads for multiplexed optical coding of biomolecules," Nat Biotechnol. (2001) 19(7): 631-5.

Henegariu et al., "Custom fluorescent-nucleotide synthesis as an alternative method for nucleic acid labeling," Nature Biotechnol. (2000) 18:345.

Itzkovitz et al., "Single-molecule transcript counting of stem-cell markers in the mouse intestine," Nat Cell Biol. (2011) 14(1): 106-14.

Itzkovitz et al., "Validating Transcripts with Probes and Imaging Technology," Nat Methods. (2011) 8(4 Suppl): S12-S19.

Jamur et al., "Permeabilization of cell membranes," Method Mol. Biol. (2010) 588: 63-66 (abstract only).

Korlach et al. "Selective aluminum passivation for targeted immobilization of single DNA polymerase molecules in zero-mode waveguide nanostructures." *Proceedings of the National Academy of Sciences* 105.4 (2008): 1176-1181.

Lagunavicius et al., "Novel application of Phi29 DNA polymerase: RNA detection and analysis in vitro and in situ by target RNA-primed RCA," RNA. (2009) 15(5):765-71.

Lakowicz et al., "Silver particles enhance emission of fluorescent DNA oligomers," Bio Techniques (2003) 34(1); 62-66.

Larsson et al. "In situ detection and genotyping of individual mRNA molecules," Nat Methods. (2010) 7(5):395-397.

Lee et al. "Highly Multiplexed Subcellular RNA Sequencing In Situ", Science (2014) 343(6177):1360-1363.

Levene et al. "Zero-mode waveguides for single-molecule analysis at high concentrations." *science* 299.5607 (2003): 682-686.

Levsky et al., "Fluorescence in situ hybridization: past, present and future," J Cell Sci. (2003) 116(Pt 14): 2833-8.

Levsky et al., "Single-cell gene expression profiling," Science. (2002) 297(5582): 836-40.

Lin et al., "Highly multiplexed imaging of single cells using a high-throughput cyclic immunofluorescence method," Nat Commun. (2015) 6:8390.

Liu et al. Barcoded oligonucleotides ligated on RNA amplified for multiplexed and parallel in situ analyses. Nucleic Acids Res. (2021) 49(10):e58, 15 pages. doi: 10.1093/nar/gkab120.

Lizardi et al., "Mutation detection and single-molecule counting using isothermal rolling-circle amplification," Nat Genet. (1998) 19(3): 225-232.

Lundquist et al. "Parallel confocal detection of single molecules in real time." Optics letters 33.9 (2008): 1026-1028.

Ma et al., "RNA template-dependent 5' nuclease activity of Thermus aquaticus and Thermus thermophilus DNA polymerases," J Biol Chem. (2000) 275(32): 24693-700.

(56) References Cited

OTHER PUBLICATIONS

Maierhorfer et al., "Multicolor deconvolution microscopy of thick biological specimens," Am J Pathol. (2003) 162(2): 373-9.
McGinn et al., "New technologies for DNA analysis—a review of the READNA Project," N Biotechnol. (2016) 33(3): 311-30. doi: 10.1016/j.nbt.2015.10.003.
Meade et al. "Multiplexed DNA detection using spectrally encoded porous SiO2 photonic crystal particles," Anal Chem. (2009) 81(7): 2618-25.
Mignardi et al., "Oligonucleotide gap-fill ligation for mutation detection and sequencing in situ," Nucleic Acids Res. (2015) 43(22): e151.
Mitra et al., "Fluorescent in situ sequencing on polymerase colonies," Anal. Biochem. (2003) 320, 55-65.
Moffitt et al., "RNA Imaging with Multiplexed Error-Robust Fluorescence In Situ Hybridization (MERFISH)," Methods in Enzymology, (2016) 572; 1-49.
Mohsen et al., "The Discovery of Rolling Circle Amplification and Rolling Circle Transcription," Acc Chem Res. (2016) 49(11): 2540-2550.
Nallur et al., "Signal amplification by rolling circle amplification on DNA microarrays," Nucleic Acids Res. (2001) 29(23): e118.
Niu et al., "Fluorescence detection for DNA using hybridization chain reaction with enzyme-amplification," Chem Commun (Camb). (2010) 46(18): 3089-91.
Payne et al. "In situ genome sequencing resolves DNA sequence and structure in intact biological samples," Science. (2021) 371(6532): eaay3446. doi: 10.1126/science.aay3446. Epub Dec. 31, 2020.
Pirici et al., "Antibody elution method for multiple immunohistochemistry on primary antibodies raised in the same species and of the same subtype," J Histochem Cytochem. (2009) 57(6); 567-75.
Raj et al., "Imaging individual mRNA molecules using multiple singly labeled probes," Nat Methods. (2008) 5(10): 877-879.
Rajeswari et al., "Multiple pathogen biomarker detection using an encoded bead array in droplet PCR," J Microbiol Methods. (2017) 139: 22-28.
Rouhanifard et al. "ClampFISH detects individual nucleic acid molecules using click chemistry-based amplification," Nat Biotechnol. (2018) 17 pages. doi: 10.1038/nbt.4286.
Schweitzer et al. "Immunoassays with rolling circle DNA amplification: A versatile platform for ultrasensitive antigen detection," Proc. Natl Acad. Sci. USA (2000) 97:10113-119.
Schweitzer et al., "Multiplexed protein profiling on microarrays by rolling-circle amplification," Nature Biotech. (2002) 20:359-365.
Shendure et al., "Accurate multiplex polony sequencing of an evolved bacterial genome," Science (2005) 309(5741); 1728-1732.
Soderberg et al. "Characterizing proteins and their interactions in cells and tissues using the in situ proximity ligation assay." *Methods* 45.3 (2008): 227-232.
Song et al., "Hybridization chain reaction-based aptameric system for the highly selective and sensitive detection of protein," Analyst. (2012) 137(6):1396-1401.
Sun et al., "Composite organic-inorganic nanoparticles as Raman labels for tissue analysis," Nano Lett. (2007) 7(2): 351-6.
Takei et al., (Feb. 2021, e-pub Jan. 27, 2021). "Integrated Spatial Genomics Reveals Global Architecture Of Single Nuclei," Nature 590(7845):344-350, 53 pages. doi: 10.1038/s41586-020-03126-2.
Vandernoot et al., "cDNA normalization by hydroxyapatite chromatography to enrich transcriptome diversity in RNA-seq applications," Biotechniques, (2012) 53(6) 373-80.
Wählby et al., "Sequential immunofluorescence staining and image analysis for detection of large numbers of antigens in individual cell nuclei," Cytometry. (2002) 47(1): 32-41.
Wang et al., "Three-dimensional intact-tissue sequencing of single-cell transcriptional states," Science. (2018) 361(6400): eaat5691.
Weibrecht et al., "Simultaneous visualization of both signaling cascade activity and end-point gene expression in single cells," PLoS One. (2011) 6(5): e20148.
Wetmur, "DNA Probes: Applications of the Principles of Nucleic Acid Hybridization," Critical Reviews in Biochemistry and Molecular Biology, (1991) 26(91); 227-259.
Wilson et al., "Encoded microcarriers for high-throughput multiplexed detection," Angew Chem Int Ed Engl. (2006) 18;45(37): 6104-17.
Wu, C. et al. "RollFISH Achieves Robust Quantification Of Single-Molecule RNA Biomarkers In Paraffin-Embedded Tumor Tissue Samples," Commun Biol. (2018) 1:(209):1-8. doi: 10.1038/s42003-018-0218-0.
Xia et al. "Multiplexed detection of RNA using MERFISH and branched DNA amplification." Scientific reports 9.1 (2019): 1-13.
Zhao et al., "Advances of multiplex and high throughput biomolecular detection technologies based on encoding microparticles," Sci China Chem. (2011) 54(8):1185.
Chen et al., "Efficient in situ barcode sequencing using padlock probe-based BaristaSeq," Nucleic Acids Res. (2018) 46(4): e22.
Sun et al., "Integrating barcoded neuroanatomy with spatial transcriptional profiling enables identification of gene correlates of projections," Nat Neurosci. (2021) 24(6):873-885.

\* cited by examiner

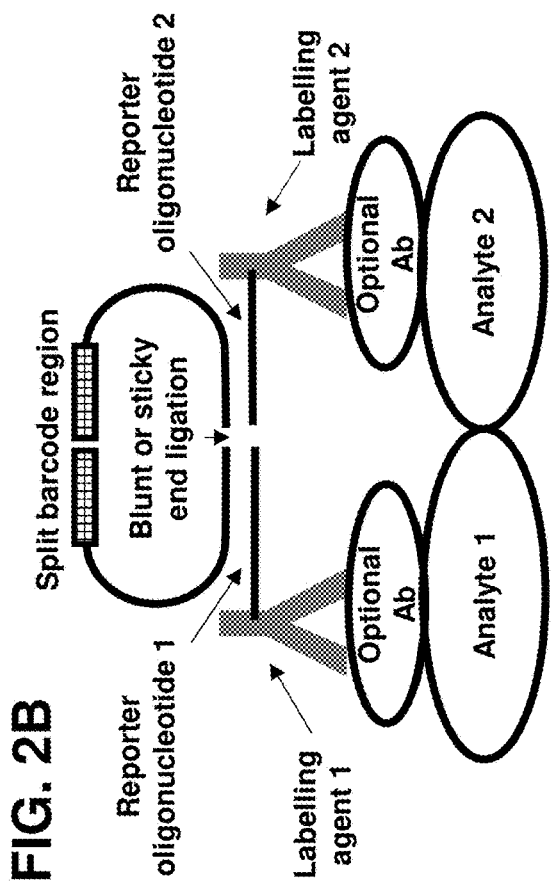
FIG. 2A
FIG. 2B
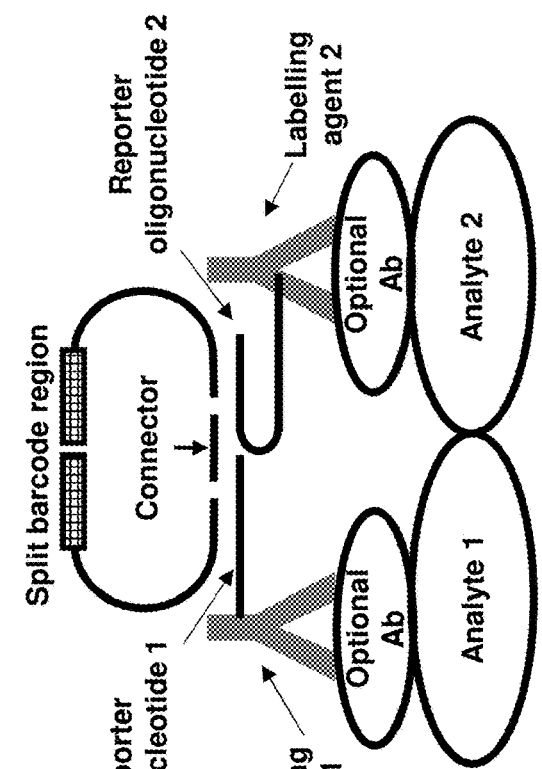
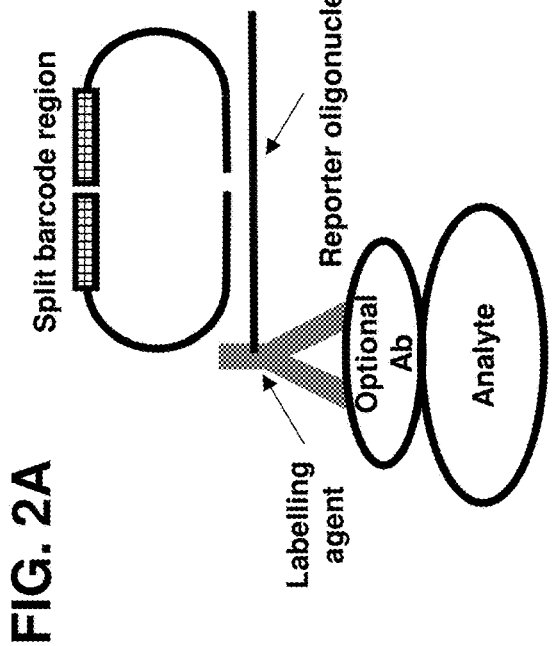
FIG. 2C
FIG. 2D
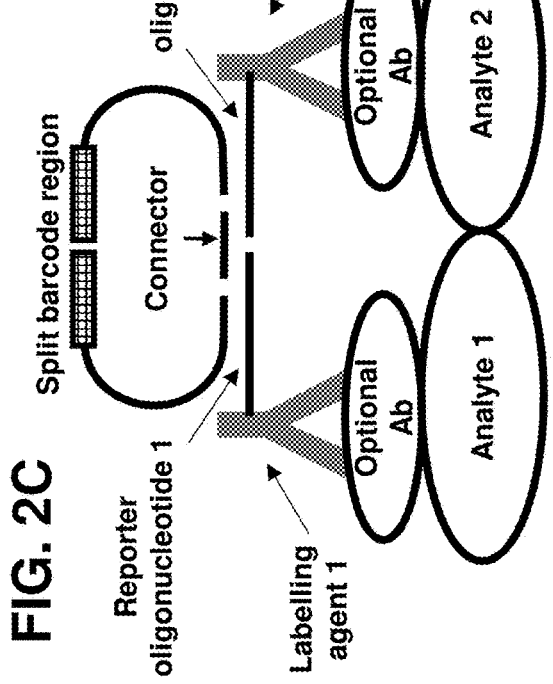

PROBES COMPRISING A SPLIT BARCODE REGION AND METHODS OF USE

CROSS-REFERENCE TO RELATED APPLICATION

This application claims priority to U.S. Provisional Patent Application No. 63/233,599, filed Aug. 16, 2021, entitled "PROBES COMPRISING A SPLIT BARCODE REGION AND METHODS OF USE," which is herein incorporated by reference in its entirety for all purposes.

REFERENCE TO AN ELECTRONIC SEQUENCE LISTING

The contents of the electronic sequence listing (202412006700SEQLIST.xml; Size: 4,665 bytes; and Date of Creation: Aug. 8, 2022) is herein incorporated by reference in its entirety.

FIELD

The present disclosure generally relates to methods and compositions for in situ analysis for detection of analytes in a sample.

BACKGROUND

Methods are available for analyzing nucleic acids in a biological sample in situ, such as a cell or a tissue. For instance, advances in single molecule fluorescent hybridization (smFISH) have enabled nanoscale-resolution imaging of RNA in cells and tissues. However, oligonucleotide probe-based assay methods for in situ analysis may suffer from low sensitivity, specificity, and/or detection efficiency and may require careful and laborious optimization. Improved methods for in situ analysis are needed. The present disclosure addresses these and other needs.

BRIEF SUMMARY

In some embodiments, disclosed herein is a method for analyzing a biological sample, comprising: (a) contacting the biological sample with: (i) a first probe comprising a first hybridization region and a first portion of a barcode region, and (ii) a second probe comprising a second hybridization region and a second portion of the barcode region, wherein the first and second hybridization regions are complementary to target sequences in a target nucleic acid molecule in the biological sample. In some embodiments, the barcode region comprises one or more barcode sequences corresponding to the target nucleic acid molecule. For instance, the first and second probes comprise a split barcode sequence, a portion of which is provided in the first portion of the barcode region, whereas another portion of the barcode sequence is provided in the second portion of the barcode region.

In any of the embodiments herein, the method may comprise connecting the first and second probes hybridized to the target nucleic acid molecule to form a composite probe. In some embodiments, formation of the composite probe comprises connecting the first and second portions of the barcode region.

In any of the embodiments herein, the method may comprise contacting the biological sample with a detectable probe that hybridizes to a sequence of the barcode region or a complement thereof. In any of the embodiments herein, the method may comprise contacting the biological sample with one or more detectable probes that hybridize to the barcode region at sequences corresponding to both the first portion of the barcode region and the second portion of the barcode region, or a complement thereof. In some embodiments, a signal associated with the one or more detectable probes is detected in the biological sample, thereby detecting the target nucleic acid molecule in the biological sample. In any of the embodiments herein, the method may comprise detecting a signal associated with the one or more detectable probes in situ.

In any of the embodiments herein, the first and second hybridization regions can hybridize to adjacent target sequences in the target nucleic acid molecule. In any of the embodiments herein, the first and second hybridization regions can hybridize to target sequences that are separated by 0, 1, 2, 3, 4, 5, 6, 7, 8, 9, 10, or more nucleotides in the target nucleic acid molecule. In some embodiments, the first and second hybridization regions in the target nucleic acid molecule are directly linked by a phosphodiester bond. In some embodiments, the first and second hybridization regions in the target nucleic acid molecule are linked by a nucleic sequence of 1, 2, 3, 4, 5, 6, 7, 8, 9, 10, or more nucleotides in length.

In any of the embodiments herein, the first and second hybridization regions can be equal in length. In any of the embodiments herein, the first hybridization region can be longer or shorter than the second hybridization region.

In any of the embodiments herein, the melting temperature of the first hybridization region hybridized to the target nucleic acid molecule can the same as the melting temperature of the second hybridization region hybridized to the target nucleic acid molecule. In any of the embodiments herein, the melting temperature of the first hybridization region hybridized to the target nucleic acid molecule can be higher or lower than the melting temperature of the second hybridization region hybridized to the target nucleic acid molecule. In any of the embodiments herein, the melting temperatures may differ by no more than 1° C., no more than 2° C., no more than 5° C., or no more than 10° C. In any of the embodiments herein, the melting temperatures can differ by 1° C. or more, 2° C. or more, 5° C. or more, or 10° C. or more. In any of the embodiments herein, the duplex formed between the first hybridization region and the target nucleic acid molecule can be equally stable, less stable, or more stable than the duplex formed between the second hybridization region and the target nucleic acid molecule.

In any of the embodiments herein, the first probe and/or the second probe can comprise one or more ribonucleotides at any suitable nucleotide position, e.g., at the 5', the 3', and an internal sequence of the first and/or second probes. In any of the embodiments herein, the first hybridization region and/or the second hybridization region can comprise one or more ribonucleotides. In any of the embodiments herein, the first hybridization region and/or the second hybridization region may comprise no more than four consecutive ribonucleotides. In any of the embodiments herein, the one or more ribonucleotides can be at and/or near a ligatable 3' end of the first probe or the second probe. In any of the embodiments herein, the one or more ribonucleotides may be at and/or near a ligatable 3' end of the first hybridization region or the second hybridization region.

In any of the embodiments herein, the method can further comprise connecting the first hybridization region and the second hybridization region. In any of the embodiments herein, the ends of the first hybridization region and the second hybridization region can be ligated using enzymatic ligation or chemical ligation, with or without gap filling prior to ligation. In any of the embodiments herein, the ends of the first hybridization region and the second hybridization region can be ligated using template-dependent ligation or template-independent ligation, with or without gap filling prior to ligation. In any of the embodiments herein, the ends of the first hybridization region and the second hybridization region can be ligated using click chemistry. In any of the embodiments herein, the ends of the first hybridization region and the second hybridization region can be ligated using a ligase having an RNA-templated ligase activity and/or a DNA-templated ligase activity. In any of the embodiments herein, the ends of the first hybridization region and the second hybridization region can be ligated using a ligase having an RNA-templated DNA ligase activity and/or an RNA-templated RNA ligase activity. In any of the embodiments herein, the ends of the first hybridization region and the second hybridization region can be ligated using a ligase selected from the group consisting of a *Chlorella* virus DNA ligase (PBCV DNA ligase), a T4 RNA ligase, a T4 DNA ligase, and a single-stranded DNA (ssDNA) ligase. In any of the embodiments herein, the ends of the first hybridization region and the second hybridization region can be ligated using a PBCV-1 DNA ligase or variant or derivative thereof, a T4 RNA ligase 2 (T4 Rnl2) or variant or derivative thereof, or a CircLigase™ or variant or derivative thereof. In any of the embodiments herein, the CircLigase™ can be CircLigase™ I or CircLigase™ II. In any of the embodiments herein, the first and second portions of the barcode region can be ligated using the same ligase that is used to ligate the first and second hybridization regions. Alternatively, in any of the embodiments herein, the first and second portions of the barcode region can be ligated using a ligase that is different from the ligase used to ligate the first and second hybridization regions.

In any of the embodiments herein, the first and second portions of the barcode region can be equal in length. Alternatively, in any of the embodiments herein, the first portion of the barcode region can be longer or shorter than the second portion of the barcode region.

In any of the embodiments herein, the ends of the first and second portions of the barcode region can be ligated using enzymatic ligation or chemical ligation, with or without gap filling prior to ligation. In some embodiments, the ends of the first and second portions of the barcode region are part of a barcode sequence, e.g., one that corresponds to an analyte of interest. In some embodiments, one or more ends of the first and/or second portions of the barcode region are part of a spacer or adapter sequence, e.g., a common or universal spacer or adapter sequence. In some embodiments, one or more ends of the first and/or second portions do not form part of a barcode sequence.

In any of the embodiments herein, the ends of the first and second portions of the barcode region can be ligated using template-dependent ligation or template-independent ligation, with or without gap filling prior to ligation. In any of the embodiments herein, the ends of the first and second portions of the barcode region can be ligated using click chemistry. In any of the embodiments herein, the ends of the first and second portions of the barcode region can be ligated using a ligase selected from the group consisting of a *Chlorella* virus DNA ligase (PBCV DNA ligase), a T4 DNA ligase, and a single-stranded DNA (ssDNA) ligase. In any of the embodiments herein, the ssDNA ligase can be a CircLigase™ or variant or derivative thereof. In any of the embodiments herein, the CircLigase™ can be CircLigase™ I or CircLigase™ II. In any of the embodiments herein, the ends of the first and second portions of the barcode region can be ligated using a splint that hybridizes to (i) the first portion or a subportion thereof and (ii) the second portion or a subportion thereof (e.g., a sequence thereof). In any of the embodiments herein, the splint can comprise a DNA molecule. In some embodiments, the splint hybridizes to the barcode region more stably when the splint comprises complementary sequences to both (i) the first portion or a subportion thereof and (ii) the second portion or a subportion thereof, as compared to when the splint comprises a mismatch with (i) the first portion or a subportion thereof and/or (ii) the second portion or a subportion thereof. In any of the embodiments herein, the method may comprise removing the splint comprising a mismatch with (i) the first portion or a subportion thereof and/or (ii) the second portion or a subportion thereof, whereas under the same conditions, the splint complementary to both (i) the first portion or a subportion thereof and (ii) the second portion or a subportion thereof remains stably hybridized to the barcode region for subsequent ligation.

In any of the embodiments herein, the melting temperature of the first portion or subportion thereof (e.g., a sequence thereof) hybridized to the splint can be the same as the melting temperature of the second portion or subportion thereof (e.g., a sequence thereof) hybridized to the splint. In any of the embodiments herein, the melting temperature of the first portion or subportion thereof (e.g., a sequence thereof) hybridized to the splint can be higher or lower than the melting temperature of the second portion or subportion thereof (e.g., a sequence thereof) hybridized to the splint. In any of the embodiments herein, the melting temperatures may differ by no more than 1° C., no more than 2° C., no more than 5° C., or no more than 10° C. In any of the embodiments herein, the melting temperatures can differ by 1° C. or more, 2° C. or more, 5° C. or more, or 10° C. or more. In any of the embodiments herein, the duplex formed between the first portion or subportion thereof (e.g., a sequence thereof) and the splint can be equally stable, less stable, or more stable than the duplex formed between the second portion or subportion thereof (e.g., a sequence thereof) and the splint. In any of the embodiments herein, the splint can be single-stranded and may not comprise a double-stranded region prior to splint hybridization to the first portion (of the barcode region) or a sequence thereof and/or the second portion (of the barcode region) or a sequence thereof.

In any of the embodiments herein, the one or more barcode sequences each can be independently between about 5 and about 35 nucleotides in length. In any of the embodiments herein, the one or more barcode sequences each can be independently between about 10 and about 20 nucleotides in length.

In any of the embodiments herein, the first portion of the barcode region can comprise one, two, or more barcode sequences. In any of the embodiments herein, the second portion of the barcode region can comprise one, two, or more barcode sequences. In any of the embodiments herein, the barcode region can comprise two or more adjacent barcode sequences. In any of the embodiments herein, the barcode region can comprise two or more non-overlapping barcode sequences. In any of the embodiments herein, the barcode region can comprise two or more overlapping barcode sequences. Alternatively, in any of the embodiments herein, the barcode region can consist of one barcode sequence. In any of the embodiments herein, the barcode region can be between about 8 and about 40 nucleotides in length. In any of the embodiments herein, the barcode region can be at least 15 nucleotides in length, whereas the first and second portions of the barcode region each can be no more than 10 nucleotides in length. In some embodiments, a detectable probe that stably hybridizes to the complete barcode region (or complement thereof) does not stably hybridize to only the first or second portion (or complement thereof). As such, the one or more detectable probes can be removed from chimeric probes (or products thereof) that comprise only one portion but not the other portion, whereas the one or more detectable probes remain stably hybridized to the complete barcode region (or complement thereof).

In any of the embodiments herein, the composite probe can be linear. Alternatively, in any of the embodiments herein, the composite probe can be circular.

In any of the embodiments herein, the one or more detectable probes can hybridize to the barcode region or complement thereof more stably when the one or more detectable probes comprise complementary sequences to both (i) the first portion or a subportion thereof (e.g., a sequence thereof) and (ii) the second portion or a subportion thereof (e.g., a sequence thereof), as compared to when the one or more detectable probes comprise a mismatch with (i) the first portion or a subportion thereof (e.g., a sequence thereof) and/or (ii) the second portion or a subportion thereof (e.g., a sequence thereof). In any of the embodiments herein, the method can comprise removing detectable probe molecule(s) comprising a mismatch with (i) the first portion or a subportion thereof (e.g., a sequence thereof) and/or (ii) the second portion or a subportion thereof (e.g., a sequence thereof), whereas under the same conditions, detectable probe molecule(s) complementary to both (i) the first portion or a subportion thereof (e.g., a sequence thereof) and (ii) the second portion or a subportion thereof (e.g., a sequence thereof) remain hybridized to the barcode region or complement thereof.

In any of the embodiments herein, the method can further comprise generating the complement of the barcode region, e.g., performing an extension reaction using the composite probe as template to generate the complement of the barcode region. In any of the embodiments herein, the method can comprise circularizing the composite probe and generating a rolling circle amplification (RCA) product of the circularized composite probe, wherein the RCA product comprises multiple copies of the complement of the barcode region. In any of the embodiments herein, the one or more detectable probes can hybridize to the RCA product more stably when the one or more detectable probes comprise both (i) the first portion or a subportion thereof (e.g., a sequence thereof) and (ii) the second portion or a subportion thereof (e.g., a sequence thereof), as compared to when the one or more detectable probes comprise a mismatch with the complementary sequence of (i) the first portion or a subportion thereof (e.g., a sequence thereof) and/or (ii) the second portion or a subportion thereof (e.g., a sequence thereof). In any of the embodiments herein, the method can comprise removing detectable probe molecule(s) comprising a mismatch with the complementary sequence of (i) the first portion or a subportion thereof (e.g., a sequence thereof) and/or (ii) the second portion or a subportion thereof (e.g., a sequence thereof), whereas under the same conditions, detectable probe molecule(s) comprising both (i) the first portion or a subportion thereof (e.g., a sequence thereof) and (ii) the second portion or a subportion thereof (e.g., a sequence thereof) remain hybridized to the RCA product.

In any of the embodiments herein, the one or more detectable probes can comprise a detectable label. In any of the embodiments herein, the detectable label can comprise a fluorophore. In any of the embodiments herein, the one or more detectable probes can comprise a sequence complementary to a sequence of a detectably labelled probe. In any of the embodiments herein, the detectably labelled probe can be a fluorescently labelled probe.

In any of the embodiments herein, the target nucleic acid molecule can comprise a DNA and/or an RNA. In any of the embodiments herein, the target nucleic acid molecule can be an mRNA or cDNA. In any of the embodiments herein, the target nucleic acid molecule can comprise a reporter oligonucleotide of a labelling agent for an analyte or a portion thereof in the biological sample. In any of the embodiments herein, the analyte can comprise a nucleic acid analyte and/or a non-nucleic acid analyte. In any of the embodiments herein, the labelling agent can comprise a binder that directly or indirectly binds a non-nucleic acid analyte, and the binder can be conjugated to the reporter oligonucleotide. In any of the embodiments herein, the non-nucleic acid analyte can be a protein analyte. In any of the embodiments herein, the binder can comprise an antibody or antigen binding fragment thereof. In any of the embodiments herein, the target nucleic acid molecule can comprise a ligation product of two or more reporter oligonucleotides, e.g., each conjugated to a binder for a non-nucleic acid analyte. In any of the embodiments herein, the ligation product can be generated when the two or more reporter oligonucleotides are in proximity to one another due to the proximity of the corresponding non-nucleic acid analytes.

In any of the embodiments herein, the composite probe or a product thereof can be generated in situ in the biological sample and/or in a matrix embedding the biological sample or molecules thereof. In any of the embodiments herein, the product can be a ligation product or a rolling circle amplification product. In any of the embodiments herein, the composite probe or a product thereof can be immobilized in the biological sample and/or in a matrix embedding the biological sample or molecules thereof. In any of the embodiments herein, the composite probe or a product thereof can be crosslinked to one or more other molecules in the biological sample and/or in a matrix embedding the biological sample or molecules thereof.

In any of the embodiments herein, the method can comprise imaging the biological sample to detect the signal associated with the one or more detectable probes. In any of the embodiments herein, the imaging can comprise fluorescent microscopy.

In any of the embodiments herein, the sequence of the barcode region or complement thereof can be analyzed in situ in the biological sample using sequential hybridization, sequencing by hybridization, sequencing by ligation, sequencing by synthesis, sequencing by binding, or a combination thereof.

In any of the embodiments herein, the target nucleic acid can be a target cDNA molecule reverse transcribed from a target RNA molecule. Alternatively, in any of the embodiments herein, the target nucleic acid can be a target RNA molecule, and the first and second probes can directly hybridize to the target RNA molecule without reverse transcribing the target RNA molecule to cDNA.

In some embodiments, disclosed herein is a method for analyzing a biological sample, comprising contacting the biological sample with: (i) a first probe comprising a first hybridization region and a first barcode sequence, (ii) a second probe comprising a second hybridization region and a second barcode sequence, and (iii) a third probe comprising a third hybridization region. In some embodiments, the third probe comprises a third barcode sequence. In some embodiments, the first and second hybridization regions are complementary to adjacent target sequences in a target nucleic acid molecule in the biological sample, and the third probe interferes with the hybridization of the second probe to the target nucleic acid molecule. In any of the embodiments herein, the first and/or second barcode sequences can correspond to an analyte of interest, whereas the third probe does not correspond to the analyte of interest. In any of the embodiments herein, the third barcode sequence can correspond to a different analyte of interest.

In any of the embodiments herein, the method can further comprise connecting the first and second probes hybridized to the target nucleic acid molecule to form a composite probe, wherein the connecting comprises: (i) connecting the first and second hybridization regions hybridized to the adjacent target sequences; and (ii) connecting the first and second barcode sequences of the first and second probes to form a composite barcode sequence corresponding to the analyte of interest.

In any of the embodiments herein, the method can further comprise contacting the biological sample with a detectable probe that hybridizes to the composite barcode sequence or a complement thereof at sequences corresponding to both the first and second barcode sequences.

In any of the embodiments herein, the method can further comprise removing detectable probes that hybridize to a composite probe or a complement thereof formed between the first and third probes, while the one or more detectable probes remain hybridized to the composite probe or complement thereof formed between the first and second probes.

In any of the embodiments herein, the method can further comprise detecting a signal associated with the one or more detectable probes in the biological sample, thereby detecting the analyte of interest in the biological sample.

In any of the embodiments herein, signals associated with the one or more detectable probes that hybridize to the composite probe or complement thereof formed between the first and third probes can be rendered invisible (not detected) in the biological sample.

In some embodiments, disclosed herein is a method for analyzing a biological sample, comprising: (a) contacting the biological sample with: (i) a first probe comprising a first hybridization region and a first barcode sequence, and (ii) a second probe comprising a second hybridization region and a second barcode sequence, wherein the first and second hybridization regions are complementary to adjacent target sequences in a target RNA molecule in the biological sample, and wherein the first and second barcode sequences each corresponds to the target RNA molecule; (b) ligating the first and second probes hybridized to the target RNA molecule to form a circular probe, wherein the ligating comprises: (i) ligating the first and second hybridization regions hybridized to the adjacent target sequences using the target RNA molecule as a template, and (ii) ligating the first and second probes to form a composite probe comprising the first and second barcode sequences corresponding to the target RNA molecule; and (c) contacting the biological sample with a detectable probe that hybridizes to the composite probe at both the first and second barcode sequences, wherein a signal associated with the detectable probe is detected in the biological sample, thereby detecting the target RNA molecule in the biological sample.

In some embodiments, disclosed herein is a method for analyzing a biological sample, comprising: (a) contacting the biological sample with: (i) a first probe comprising a first hybridization region and a first barcode sequence, and (ii) a second probe comprising a second hybridization region and a second barcode sequence, wherein the first and second hybridization regions are complementary to adjacent target sequences in a target RNA molecule in the biological sample, and wherein the first and second barcode sequences each corresponds to the target RNA molecule; (b) ligating the first and second probes hybridized to the target RNA molecule to form a circular probe, wherein the ligating comprises: (i) ligating the first and second hybridization regions hybridized to the adjacent target sequences using the target RNA molecule as a template, and (ii) ligating the first and second probes to form a composite probe comprising the first and second barcode sequences corresponding to the target RNA molecule; and (c) generating a rolling circle amplification product of the composite probe; (d) contacting the biological sample with a detectable probe that hybridizes to the composite probe or a complement thereof in the rolling circle amplification product at sequences corresponding to both the first and second barcode sequences, wherein a signal associated with the detectable probe is detected in the biological sample, thereby detecting the target RNA molecule in the biological sample.

In any of the embodiments herein, in the composite probe, the first and second barcode sequences can form a composite barcode sequence. In any of the embodiments herein, the composite barcode sequence can be contiguous or non-contiguous.

In any of the embodiments herein, in the composite probe, the first and second barcode sequences can be linked by one or more adapter sequences.

In any of the embodiments herein, the first probe and/or the second probe can further comprise one or more additional barcode sequences which alone or in combination correspond to the target RNA molecule. In some embodiments, the method can further comprise contacting the biological sample with an additional detectable probe that hybridizes to any one or more of the additional barcode sequences.

In any of the embodiments herein, the first probe and/or the second probe can be circularized using a *Chlorella* virus DNA ligase (PBCV DNA ligase), a T4 RNA ligase, a T4 DNA ligase, and/or a single-stranded DNA (ssDNA) ligase.

In any of the embodiments herein, the method can comprise contacting the biological sample with the detectable probe which is a detectably-labeled probe, and dehybridizing the detectable probe. In any of the embodiments herein, the method can comprise repeating the contacting and dehybridizing steps with the detectably-labeled probe and/or one or more other detectably-labeled probes.

In any of the embodiments herein, the method can comprise contacting the biological sample with the detectable probe which is an intermediate probe, wherein the intermediate probe is detectable using a detectably-labeled probe, and dehybridizing the intermediate probe and/or the detectably-labeled probe. In any of the embodiments herein, the method can comprise repeating the contacting and dehybridizing steps with the intermediate probe, the detectably-labeled probe, one or more other intermediate probes, and/or one or more other detectably-labeled probes.

In any of the embodiments herein, the biological sample can be a formalin-fixed, paraffin-embedded (FFPE) sample, a frozen tissue sample, or a fresh tissue sample. In any of the embodiments herein, the biological sample can be non-homogenized. In any of the embodiments herein, the biological sample can be fixed or not fixed. In any of the embodiments herein, the biological sample can be permeabilized. In any of the embodiments herein, the biological sample can be embedded in a matrix. In any of the embodiments herein, the matrix can comprise a hydrogel. In any of the embodiments herein, the biological sample can be cleared. In any of the embodiments herein, the clearing can comprise contacting the biological sample with a proteinase. In any of the embodiments herein, the biological sample can be crosslinked. In any of the embodiments herein, the biological sample can be a tissue slice between about 1 µm and about 50 µm in thickness. In any of the embodiments herein, the tissue slice can be between about 5 µm and about 35 µm in thickness.

In some embodiments, disclosed herein is a kit for analyzing a biological sample, comprising: (a) a first probe comprising a first hybridization region and a first portion of a barcode sequence, and (b) a second probe comprising a second hybridization region and a second portion of the barcode sequence, wherein the first and second hybridization regions are complementary to adjacent target sequences in a target RNA molecule, and the barcode sequence corresponds to the target RNA molecule. In some embodiments, the kit can further comprise (c) a splint that hybridizes to the first and second probes for ligation of the first and second portions to form a composite probe comprising the barcode sequence. In any of the embodiments herein, the first and second portions of the barcode sequence each can be no more than 10 nucleotides in length. In any of the embodiments herein, the barcode sequence can be at least 15 nucleotides in length. In any of the embodiments herein, the splint can be single-stranded.

In some embodiments, provided herein is a kit for analyzing a biological sample, comprising a plurality of pairs of first and second probes, wherein: the first probe of each pair comprises a first hybridization region and a first portion of a barcode sequence, and the second probe of each pair comprises a second hybridization region and a second portion of the barcode sequence, wherein the first and second hybridization regions of each pair of first and second probes hybridize to corresponding target sequences in a target nucleic acid molecule. In any of the embodiments herein, the kit can comprise a plurality of splints that hybridize to each pair such that the first and second probes in the pair are configured to form a composite probe, wherein each composite probe comprises the first and second portions of the barcode region of the first and second probes, respectively. In any of the embodiments herein, each pair of first and second probe can be provided with a corresponding unique splint. In any of the embodiments herein, the plurality of splints can be single-stranded. In any of the embodiments herein, the kit can comprise at least 10 distinguishable first probes and at least 10 distinguishable second probes. In any of the embodiments herein, the kit can comprise at least 10 distinguishable splints for each corresponding pair of first and second probes.

In any of the embodiments herein, the one or more barcode sequences and/or complements thereof can be analyzed (e.g., detected or sequenced) using any suitable methods or techniques, including those described herein, such as in situ sequencing, fluorescent in situ sequencing (FISSEQ), sequencing by synthesis (SBS), sequencing by ligation (SBL), sequencing by hybridization (SBH), or spatially-resolved transcript amplicon readout mapping (STARmap). In any of the embodiments herein, the one or more barcode sequences and/or complements thereof can be analyzed by sequential hybridization and detection with a plurality of detectable probes, such as fluorescently-labelled probes and/or intermediate probes that are capable of binding to fluorescently-labelled probes as well as the barcode sequences and/or complements thereof.

BRIEF DESCRIPTION OF THE DRAWINGS

The drawings illustrate certain embodiments of the features and advantages of this disclosure. These embodiments are not intended to limit the scope of the appended claims in any manner.

FIGS. 2A-2G show assays, e.g., for detecting non-nucleic acid analytes or interactions thereof or for detecting interactions between nucleic acid and non-nucleic acid analytes, using exemplary labelling agents disclosed herein.

FIG. 3A shows an example of using probes comprising gene-specific adapters to reduce formation of chimeric probes which may give false positive signals. FIG. 3B shows an example of using probes comprising split barcode sequences to reduce detection of false positive signals. The advantages shown in FIGS. 3A-3B are not mutually exclusive.

DETAILED DESCRIPTION

Figure 1:
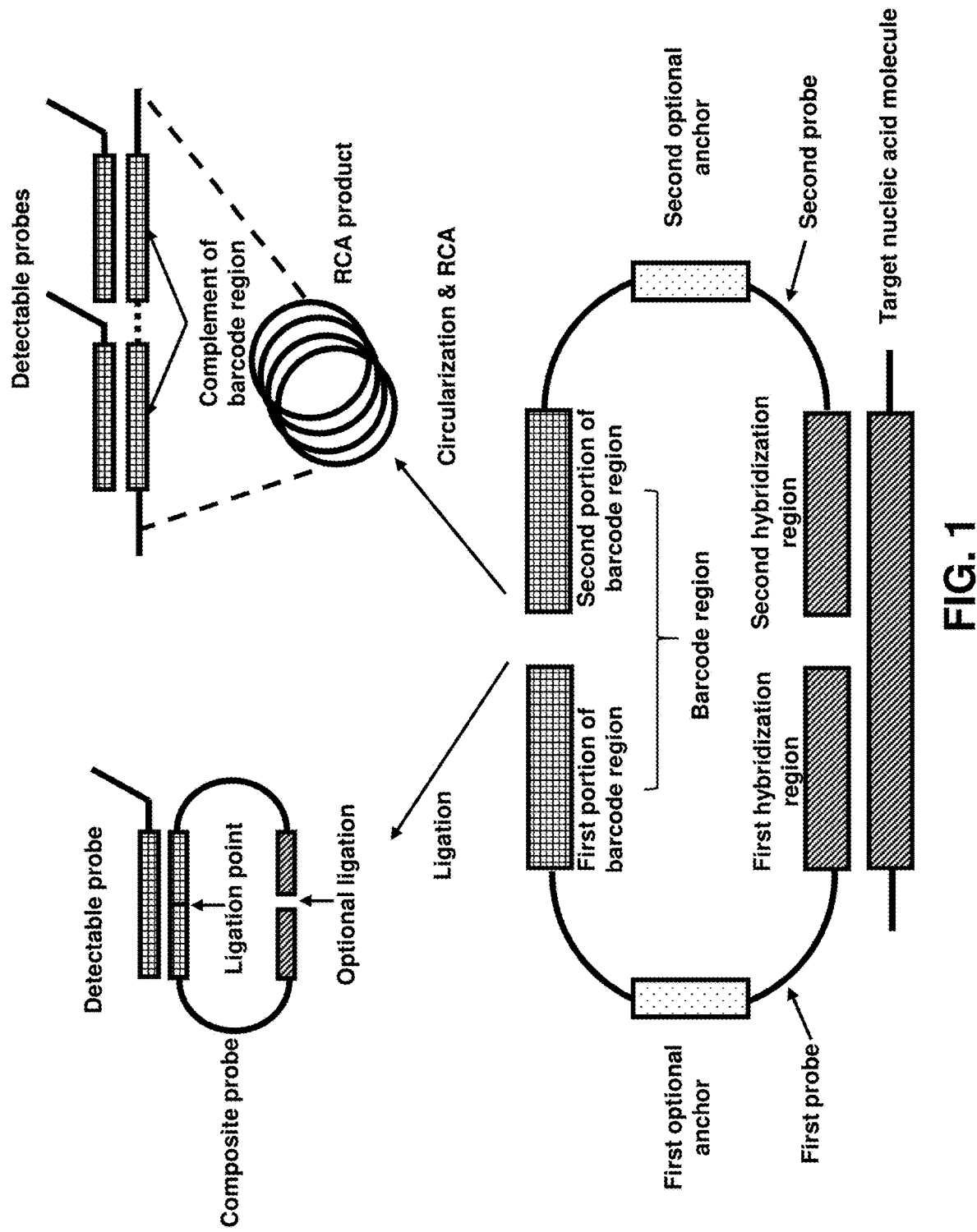
FIG. 1 shows exemplary probes and methods of using the probes to detect a target nucleic acid molecule (e.g., RNA or DNA). The first and second probes comprise the first and second hybridization regions, respectively, that hybridize to the target nucleic acid molecule. The first and second probes further comprise the first and second portions, respectively, of the barcode region.

All publications, comprising patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

The section headings used herein are for organizational purposes only and are not to be construed as limiting the subject matter described.

I. Overview

Probing RNA with padlock or other circularizable ligation probes has been and still is a challenge. This is because the ligation efficiency and/or specificity (e.g., ligase fidelity, that is, discrimination against ligating mismatched base pairs) of currently available ligases on RNA templates are less than satisfactory. Although certain ligases can produce RNA template-dependent ligation products (e.g., circularized padlock probes), they also produce template-independent ligation products at a high rate. For instance, SplintR® Ligase, also known as PBCV-1 DNA Ligase or *Chlorella* virus DNA Ligase, efficiently catalyzes the ligation of adjacent, single-stranded DNA splinted by a complementary RNA strand. However, SplintR® ligase has a high template-independent ligation efficiency and may not discriminate mismatched sequences while it ligates nucleic acid ends hybridized to an RNA template. In some instance, the low ligase fidelity can lead to high levels of false positive probe ligation events. For example, a ligated (e.g., circularized) probe may be formed from a split probe pair, e.g., a pair of probes hybridizing to a target nucleic acid. When two or more separate probe pairs are used (e.g., each probe pair targeting a different analyte and the probes in each pair are to be ligated), the low ligase fidelity can lead to the formation of chimeras, e.g., where a probe from the probe pair targeting Gene X is ligated to a probe from the probe pair targeting Gene Y instead of another probe from the probe pair targeting Gene X, forming a mismatched ligated probe. In some instances, the incorrectly hybridized probe pair or chimeric ligation product thereof cannot be easily removed or filtered out in in situ assays. For example, circularized probes comprising chimeric probe pairs may be locked around the ligation templates (e.g., RNA) and topologically linked so they cannot be washed away, e.g., under stringent conditions, allowing the incorrectly ligated probe pairs to remain in the sample. The chimeric circularized probes can produce signals that are subjected to decoding (e.g., detection), and it may not be possible to distinguish a true positive signal (e.g., a signal associated with ligation products of probes targeting Gene X) from a false positive signal (e.g., a signal associated with ligation products of a mismatched probe targeting Gene X and probe targeting Gene Y).

In some embodiments, the chimeric circularized probes and/or products thereof cannot be removed from the biological sample while leaving the correct circularized probes and/or products thereof in the sample for detection and analysis. In some embodiments, once generated, the chimeric circularized probes and/or products thereof cannot be selectively washed away. In other embodiments, once detected, signals associated with the chimeric circularized probes and/or products thereof cannot be easily filtered out by comparing to a reference such as a known nucleic acid sequence.

In some embodiments, disclosed herein are methods and compositions for reducing the detection of false positive signals when probing a nucleic acid (e.g., RNA) with circularizable probes. In some embodiments, using a method disclosed herein, it is less likely to generate chimeric circularized probes and/or products thereof compared to known methods. In some embodiments, using a method disclosed herein, it is less likely to detect a false positive signal associated with chimeric circularized probes and/or products thereof compared to known methods. In some embodiments, the probe designs provided herein may ameliorate the low ligase specificity or fidelity, e.g., by enabling the removal and/or filtering out of incorrectly ligated products (e.g., chimeras) and signals associated therewith in the detection/decoding step. In some embodiments, the removal and/or filtering out of chimeric ligation products can be done without increasing the actual ligase specificity or fidelity. In some instances, the overall detection specificity is increased using probes disclosed herein, even when a low fidelity ligase (e.g., a SplintR® ligase) is used to ligate one or more probes to form a circularized probe.

In some embodiments, a method disclosed herein comprises the use of a probe set comprising double split ("split split") probes. The probe set may comprise at least two or more probes. In some embodiments, the probe set comprises at least two or more probes wherein both a hybridization region and a barcode region are split between the first probe and the second probe. In some embodiments, the probe set comprises two probes each comprising a hybridization region (e.g., a target recognition site), and the two hybridization regions are configured to be ligated to each other using a sequence in the target nucleic acid as template. In some embodiments, the probe set comprises a first probe comprising a hybridization region on the 3' end or the 5' end, and a second probe comprising a hybridization region on the 5' end or the 3' end. In some embodiments, the two probes each comprises a portion of a barcode region, such as a split part of a barcode sequence (e.g., FIG. 5, lower left) or a split combination of barcode sequences (e.g., FIG. 5, lower right) to be detected using sequencing-by-hybridization (SBH). In some embodiments, the probe set comprises a first probe comprising a first portion of a barcode region on the 3' end or the 5' end, and a second probe comprising a second portion of the barcode region on the 5' end or the 3' end. In some embodiments, a ligation product and RCA product thereof that is generated from only one probe of the probe set carries only a portion of the barcode region (e.g., a partial SBH barcode sequence). In some embodiments, ligation of probes that should not be ligated together (e.g., false ligation of probes from two probe pairs targeting different analytes) generates an incorrect barcode sequence (e.g., a chimeric SBH barcode sequence) that does not exist in the barcode pool (e.g., a predetermined or pre-associated set of barcodes and analytes). In some embodiments, the ligation product or RCA product thereof comprises a barcode sequence (e.g., a partial or chimeric barcode sequence) or complement thereof that cannot be decoded using SBH. In some embodiments, the ligation product or RCA product thereof comprises a barcode sequence (e.g., a partial or chimeric barcode sequence) or complement thereof that does not generate a detectable SBH signal. In some embodiments, the ligation product or RCA product thereof comprises a barcode sequence (e.g., a partial or chimeric barcode sequence) or complement thereof that can be rendered "invisible" during SBH detection and/or decoding. In some embodiments, signals associated with the incorrect barcode sequence (e.g., a partial or chimeric barcode sequence) can be filtered out during SBH detection and/or decoding. In some embodiments, false positive ligations, such as ligations of wrong or mismatched probe pairs and/or only a subset of a probe set that are due to template-independent or non-discriminative ligation (e.g., by a ligase or chemical ligation) are rendered "invisible" in the detection/decoding step, thus detecting only true positives in the detection/decoding step. In some instances, the overall detection specificity is increased using probes each with a portion of a barcode region disclosed herein as compared to probes where the barcode region is not split among two or more probes.

In some embodiments, probe ligation specificity, e.g., the fidelity or specificity of an enzymatic or chemical ligation reaction, may but does not need to be increased. In some embodiments, probe ligation specificity may be low while still achieving high overall detection specificity using a method disclosed herein. In some embodiments, false positive ligation events may but do not need to be suppressed. As such, in some aspects, methods and probe designs disclosed herein allow the use of ligases in a wide range of ligase fidelity for in situ assays, including those involving RNA-templated ligation of probes. For instance, using a probe design disclosed herein, a ligase having high ligation efficiency on RNA templates but high template-independent ligation rate may be used for in situ detection of RNA with high assay specificity, since signals associated with partial or chimeric barcode sequences in template-independent ligation products can be filtered out, thereby minimizing the effect of false positives on the detection and analysis of true positive signals. In some embodiments, the detection specificity increases as the number of probes in a probe set targeting an analyte increases. In some embodiments, the detection specificity increases as the number of probe sets each targeting a different analyte increases. In some embodiments, the increasing complexity of probes and/or probe sets allows the generation of non-existing probe pairs that are invisible, thereby further increasing detection specificity. In some cases, the greater number of detection probes used may also allow an increase in the ability of the provided methods to increase detection specificity.

II. Samples, Analytes, and Target Sequences

A. Samples and Sample Processing

A sample disclosed herein can be or derived from any biological sample. In some embodiments, a sample herein is one in which analysis of target molecules and their position in two- or three-dimensional space is desired. Methods and compositions disclosed herein may be used for analyzing a biological sample, which may be obtained from a subject using any of a variety of techniques including, but not limited to, biopsy, surgery, and laser capture microscopy (LCM), and generally includes cells and/or other biological material from the subject. A biological sample can also be obtained from non-mammalian organisms (e.g., a plant, an insect, an arachnid, a nematode, a fungus, or an amphibian). A biological sample can also be obtained from a eukaryote, such as a tissue sample, a patient derived organoid (PDO) or patient derived xenograft (PDX). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic individuals, individuals that have or are suspected of having a disease (e.g., a patient with a disease such as cancer) or a predisposition to a disease, and/or individuals in need of therapy or suspected of needing therapy.

The biological sample can include any number of macromolecules, for example, cellular macromolecules and organelles (e.g., mitochondria and nuclei). The biological sample can be obtained as a tissue sample, such as a tissue section, biopsy, a core biopsy, needle aspirate, or fine needle aspirate. The sample can be a fluid sample, such as a blood sample, urine sample, or saliva sample, and cells and cellular components therein may be analyzed after placing the cells or cellular components on a substrate. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions. In some embodiments, the biological sample may comprise cells which are deposited on a surface and the cells can be isolated from a bodily sample, e.g., blood, plasma, serum, urine, saliva, mucosal excretions, sputum, stool, and tears.

Cell-free biological samples can include extracellular polynucleotides. Extracellular polynucleotides can be isolated from a bodily sample, e.g., blood, plasma, serum, urine, saliva, mucosal excretions, sputum, stool, and tears.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells. Biological samples can also include fetal cells and immune cells.

Biological samples can include target molecules (e.g., protein, RNA, and/or DNA) in a 3D matrix. In some embodiments, amplicons (e.g., rolling circle amplification products) derived from or associated with analytes (e.g., protein, RNA, and/or DNA) can be embedded in a 3D matrix. In some embodiments, a 3D matrix may comprise a network of natural molecules and/or synthetic molecules that are chemically and/or enzymatically linked, e.g., by crosslinking. In some embodiments, a 3D matrix may comprise a synthetic polymer. In some embodiments, a 3D matrix comprises a hydrogel.

The biological sample within the 3D matrix may be cleared of proteins and/or lipids that are not targets of interest. For example, the biological sample can be cleared of proteins (also called "deproteination") by enzymatic proteolysis. The clearing step may be performed before or after covalent immobilization of any target molecules or derivatives thereof.

In some cases, the clearing step is performed after covalent immobilization of target molecules (e.g., RNA or DNA), primers, derivatives of target molecules (e.g., cDNA or amplicons), or probes (e.g., circularizable probes, intermediate probes, or adapters) to a synthetic 3D matrix. Performing the clearing step after immobilization can enable any subsequent nucleic acid hybridization reactions to be performed under conditions where the sample has been substantially deproteinated, as by enzymatic proteolysis ("protein clearing"). This method can have the benefit of removing ribosomes and other RNA- or nucleic-acid-target-binding proteins from the target molecule (while maintaining spatial location), where the protein component may impede or inhibit probe binding.

The clearing step can comprise removing non-targets from the 3D matrix. The clearing step can comprise degrading the non-targets. The clearing step can comprise exposing the sample to an enzyme (e.g., a protease) able to degrade a protein. The clearing step can comprise exposing the sample to a detergent.

Proteins may be cleared from the sample using enzymes, denaturants, chelating agents, chemical agents, and the like, which may break down the proteins into smaller components and/or amino acids. These smaller components may be easier to remove physically, and/or may be sufficiently small or inert such that they do not significantly affect the background. Similarly, lipids may be cleared from the sample using surfactants or the like. In some cases, one or more of these agents are used, e.g., simultaneously or sequentially.

Non-limiting examples of suitable enzymes include proteinases such as proteinase K, proteases or peptidases, or digestive enzymes such as trypsin, pepsin, or chymotrypsin. Non-limiting examples of suitable denaturants include guanidine HCl, acetone, acetic acid, urea, or lithium perchlorate. Non-limiting examples of chemical agents able to denature proteins include solvents such as phenol, chloroform, guanidinium isocyananate, urea, formamide, etc. Non-limiting examples of surfactants include Triton X-100 (polyethylene glycol p-(1,1,3,3-tetramethylbutyl)-phenyl ether), SDS (sodium dodecyl sulfate), Igepal CA-630, or poloxamers. Non-limiting examples of chelating agents include ethylenediaminetetraacetic acid (EDTA), citrate, or polyaspartic acid. In some embodiments, compounds such as these may be applied to the sample to clear proteins, lipids, and/or other components. For instance, a buffer solution (e.g., containing Tris or tris(hydroxymethyl)aminomethane) may be applied to the sample, then removed.

In some cases, nucleic acids that are not target molecules of interest may also be cleared. These non-target nucleic acids may not be captured and/or immobilized to the 3D matrix, and therefore can be removed with an enzyme to degrade nucleic acid molecules. Non-limiting examples of DNA enzymes that may be used to remove DNA include DNase I, dsDNase, a variety of restriction enzymes, etc. Non-limiting examples of techniques to clear RNA include RNA enzymes such as RNase A, RNase T, or RNase H, or chemical agents, e.g., via alkaline hydrolysis (for example, by increasing the pH to greater than 10). Non-limiting examples of systems to remove sugars or extracellular matrix include enzymes such as chitinase, heparinases, or other glycosylases. Non-limiting examples of systems to remove lipids include enzymes such as lipidases, chemical agents such as alcohols (e.g., methanol or ethanol), or detergents such as Triton X-100 or sodium dodecyl sulfate. In this way, the background of the sample may be removed, which may facilitate analysis of the nucleic acid probes or other targets, e.g., using fluorescence microscopy, or other techniques as described herein.

In some embodiments, a sample disclosed herein may be provided on a substrate. In some embodiments, a substrate herein can be any support that is insoluble in aqueous liquid and which allows for positioning of biological samples, analytes, features, and/or reagents (e.g., probes) on the support. In some embodiments, a biological sample can be attached to a substrate. Attachment of the biological sample can be irreversible or reversible, depending upon the nature of the sample and subsequent steps in the analytical method. In certain embodiments, the sample can be attached to the substrate reversibly by applying a suitable polymer coating to the substrate, and contacting the sample to the polymer coating. The sample can then be detached from the substrate, e.g., using an organic solvent that at least partially dissolves the polymer coating. Hydrogels are examples of polymers that are suitable for this purpose.

In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay. Except where indicated otherwise, the preparative or processing steps described below can generally be combined in any manner and in any order to appropriately prepare or process a particular sample for and/or analysis.

(i) Tissue Sectioning

A biological sample can be harvested from a subject (e.g., via surgical biopsy, whole subject sectioning) or grown in vitro on a growth substrate or culture dish as a population of cells, and prepared for analysis as a tissue slice or tissue section. Grown samples may be sufficiently thin for analysis without further processing steps. Alternatively, grown samples, and samples obtained via biopsy or sectioning, can be prepared as thin tissue sections using a mechanical cutting apparatus such as a vibrating blade microtome. As another alternative, in some embodiments, a thin tissue section can be prepared by applying a touch imprint of a biological sample to a suitable substrate material.

The thickness of the tissue section can be a fraction of (e.g., less than 0.9, 0.8, 0.7, 0.6, 0.5, 0.4, 0.3, 0.2, or 0.1) the maximum cross-sectional dimension of a cell. However, tissue sections having a thickness that is larger than the maximum cross-section cell dimension can also be used. For example, cryostat sections can be used, which can be, e.g., 10-20 µm thick.

More generally, the thickness of a tissue section typically depends on the method used to prepare the section and the physical characteristics of the tissue, and therefore sections having a wide variety of different thicknesses can be prepared and used. For example, the thickness of the tissue section can be at least 0.1, 0.2, 0.3, 0.4, 0.5, 0.7, 1.0, 1.5, 2, 3, 4, 5, 6, 7, 8, 9, 10, 12, 13, 14, 15, 20, 30, 40, or 50 µm. Thicker sections can also be used if desired or convenient, e.g., at least 70, 80, 90, or 100 µm or more. Typically, the thickness of a tissue section is between 1-100 µm, 1-50 µm, 1-30 µm, 1-25 µm, 1-20 µm, 1-15 µm, 1-10 µm, 2-8 µm, 3-7 µm, or 4-6 µm, but as mentioned above, sections with thicknesses larger or smaller than these ranges can also be analysed.

Multiple sections can also be obtained from a single biological sample. For example, multiple tissue sections can be obtained from a surgical biopsy sample by performing serial sectioning of the biopsy sample using a sectioning blade. Spatial information among the serial sections can be preserved in this manner, and the sections can be analysed successively to obtain three-dimensional information about the biological sample.

(ii) Freezing

In some embodiments, the biological sample (e.g., a tissue section as described above) can be prepared by deep freezing at a temperature suitable to maintain or preserve the integrity (e.g., the physical characteristics) of the tissue structure. The frozen tissue sample can be sectioned, e.g., thinly sliced, onto a substrate surface using any number of suitable methods. For example, a tissue sample can be prepared using a chilled microtome (e.g., a cryostat) set at a temperature suitable to maintain both the structural integrity of the tissue sample and the chemical properties of the nucleic acids in the sample. Such a temperature can be, e.g., less than −15° C., less than −20° C., or less than −25° C.

(iii) Fixation and Postfixation

In some embodiments, the biological sample can be prepared using formalin-fixation and paraffin-embedding (FFPE), which are established methods. In some embodiments, cell suspensions and other non-tissue samples can be prepared using formalin-fixation and paraffin-embedding. Following fixation of the sample and embedding in a paraffin or resin block, the sample can be sectioned as described above. Prior to analysis, the paraffin-embedding material can be removed from the tissue section (e.g., deparaffinization) by incubating the tissue section in an appropriate solvent (e.g., xylene) followed by a rinse (e.g., 99.5% ethanol for 2 minutes, 96% ethanol for 2 minutes, and 70% ethanol for 2 minutes).

As an alternative to formalin fixation described above, a biological sample can be fixed in any of a variety of other fixatives to preserve the biological structure of the sample prior to analysis. For example, a sample can be fixed via immersion in ethanol, methanol, acetone, paraformaldehyde (PFA)-Triton, and combinations thereof.

In some embodiments, acetone fixation is used with fresh frozen samples, which can include, but are not limited to, cortex tissue, mouse olfactory bulb, human brain tumor, human post-mortem brain, and breast cancer samples. When acetone fixation is performed, pre-permeabilization steps (described below) may not be performed. Alternatively, acetone fixation can be performed in conjunction with permeabilization steps.

In some embodiments, the methods provided herein comprises one or more post-fixing (also referred to as postfixation) steps. In some embodiments, one or more post-fixing step is performed after contacting a sample with a polynucleotide disclosed herein, e.g., one or more probes. In some embodiments, one or more post-fixing step is performed after a hybridization complex comprising a probe and a target is formed in a sample. In some embodiments, one or more post-fixing step is performed prior to a ligation reaction disclosed herein, such as the ligation to circularize a probe or probe set.

In some embodiments, one or more post-fixing step is performed after contacting a sample with a binding or labelling agent (e.g., an antibody or antigen binding fragment thereof) for a non-nucleic acid analyte such as a protein analyte. The labelling agent can comprise a nucleic acid molecule (e.g., reporter oligonucleotide) comprising a sequence corresponding to the labelling agent and therefore corresponds to (e.g., uniquely identifies) the analyte. In some embodiments, the labelling agent can comprise a reporter oligonucleotide comprising one or more barcode sequences.

A post-fixing step may be performed using any suitable fixation reagent disclosed herein, for example, 3% (w/v) paraformaldehyde in DEPC-PBS.

(iv) Embedding

As an alternative to paraffin embedding described above, a biological sample can be embedded in any of a variety of other embedding materials to provide structural substrate to the sample prior to sectioning and other handling steps. In some cases, the embedding material can be removed, e.g., prior to analysis of tissue sections obtained from the sample. Suitable embedding materials include, but are not limited to, waxes, resins (e.g., methacrylate resins), epoxies, and agar.

In some embodiments, the biological sample can be embedded in a matrix (e.g., a hydrogel matrix). In some aspects, the embedding material can be applied to the sample one or more times. Embedding the sample in this manner typically involves contacting the biological sample with a hydrogel such that the biological sample becomes surrounded by the hydrogel. For example, the sample can be embedded by contacting the sample with a suitable polymer material, and activating the polymer material to form a hydrogel. In some embodiments, the hydrogel is formed such that the hydrogel is internalized within the biological sample.

In some embodiments, the biological sample is immobilized in the hydrogel via cross-linking of the polymer material that forms the hydrogel. Cross-linking can be performed chemically and/or photochemically, or alternatively by any other hydrogel-formation method.

The composition and application of the hydrogel-matrix to a biological sample typically depends on the nature and preparation of the biological sample (e.g., sectioned, non-sectioned, type of fixation). As one example, where the biological sample is a tissue section, the hydrogel-matrix can include a monomer solution and an ammonium persulfate (APS) initiator/tetramethylethylenediamine (TEMED) accelerator solution. As another example, where the biological sample consists of cells (e.g., cultured cells or cells disassociated from a tissue sample), the cells can be incubated with the monomer solution and APS/TEMED solutions. For cells, hydrogel-matrix gels are formed in compartments, including but not limited to devices used to culture, maintain, or transport the cells. For example, hydrogel-matrices can be formed with monomer solution plus APS/TEMED added to the compartment to a depth ranging from about 0.1 μm to about 2 mm.

Additional methods and aspects of hydrogel embedding of biological samples are described for example in Chen et al., *Science* 347(6221):543-548, 2015, US2016/0024555, US2019/0276881, US2020/0071751, US2021/0292834, US2021/0230692, and US2021/0310052, the entire contents of which are incorporated herein by reference. A method disclosed herein may comprise embedding tissue or cell samples within conductive hydrogels. U.S. Pat. Publ. No. 2011/0256183 (Frank et al.), U.S. Pat. No. 10,138,509 (Church et al.), U.S. Pat. No. 10,545,075 (Deisseroth et al.) and U.S. Pat. Publ. No. 2019/0233878 (Delaney, et al.) which are herein incorporated by reference, describe hydrogels and their use for embedding tissues and cells.

(v) Staining and Immunohistochemistry (IHC)

To facilitate visualization, biological samples can be stained using a wide variety of stains and staining techniques. In some embodiments, for example, a sample can be stained using any number of stains and/or immunohistochemical reagents. One or more staining steps may be performed to prepare or process a biological sample for an assay described herein or may be performed during and/or after an assay. In some embodiments, the sample can be contacted with one or more nucleic acid stains, membrane stains (e.g., cellular or nuclear membrane), cytological stains, or combinations thereof. In some examples, the stain may be specific to proteins, phospholipids, DNA (e.g., dsDNA, ssDNA), RNA, an organelle or compartment of the cell. The sample may be contacted with one or more labeled antibodies (e.g., a primary antibody specific for the analyte of interest and a labeled secondary antibody specific for the primary antibody). In some embodiments, cells in the sample can be segmented using one or more images taken of the stained sample.

In some embodiments, the stain is performed using a lipophilic dye. In some examples, the staining is performed with a lipophilic carbocyanine or aminostyryl dye, or analogs thereof (e.g, DiI, DiO, DiR, DiD). Other cell membrane stains may include FM and RH dyes or immunohistochemical reagents specific for cell membrane proteins. In some examples, the stain may include but not limited to, acridine orange, Bismarck brown, carmine, coomassie blue, cresyl violet, DAPI, eosin, ethidium bromide, acid fuchsine, haematoxylin, Hoechst stains, iodine, methyl green, methylene blue, neutral red, Nile blue, Nile red, osmium tetroxide, ruthenium red, propidium iodide, rhodamine (e.g., rhodamine B), or safranine or derivatives thereof. In some embodiments, the sample may be stained with haematoxylin and eosin (H&E).

The sample can be stained using hematoxylin and eosin (H&E) staining techniques, using Papanicolaou staining techniques, Masson's trichrome staining techniques, silver staining techniques, Sudan staining techniques, and/or using Periodic Acid Schiff (PAS) staining techniques. PAS staining is typically performed after formalin or acetone fixation. In some embodiments, the sample can be stained using Romanowsky stain, including Wright's stain, Jenner's stain, Can-Grunwald stain, Leishman stain, and Giemsa stain.

In some embodiments, biological samples can be destained. Any suitable methods of destaining or discoloring a biological sample may be utilized, and generally depend on the nature of the stain(s) applied to the sample. For example, in some embodiments, one or more immunofluorescent stains are applied to the sample via antibody coupling. Such stains can be removed using techniques such as cleavage of disulfide linkages via treatment with a reducing agent and detergent washing, chaotropic salt treatment, treatment with antigen retrieval solution, and treatment with an acidic glycine buffer. Methods for multiplexed staining and destaining are described, for example, in Bolognesi et al., *J. Histochem. Cytochem.* 2017; 65(8): 431-444, Lin et al., *Nat Commun.* 2015; 6:8390, Pirici et al., *J. Histochem. Cytochem.* 2009; 57:567-75, and Glass et al., *J. Histochem. Cytochem.* 2009; 57:899-905, the entire contents of each of which are incorporated herein by reference.

(vi) Isometric Expansion

In some embodiments, a biological sample embedded in a matrix (e.g., a hydrogel) can be isometrically expanded. Isometric expansion methods that can be used include hydration, a preparative step in expansion microscopy, as described in Chen et al., *Science* 347(6221):543-548, 2015.

Isometric expansion can be performed by anchoring one or more components of a biological sample to a gel, followed by gel formation, proteolysis, and swelling. In some embodiments, analytes in the sample, products of the analytes, and/or probes associated with analytes in the sample can be anchored to the matrix (e.g., hydrogel). Isometric expansion of the biological sample can occur prior to immobilization of the biological sample on a substrate, or after the biological sample is immobilized to a substrate. In some embodiments, the isometrically expanded biological sample can be removed from the substrate prior to contacting the substrate with probes disclosed herein.

In general, the steps used to perform isometric expansion of the biological sample can depend on the characteristics of the sample (e.g., thickness of tissue section, fixation, cross-linking), and/or the analyte of interest (e.g., different conditions to anchor RNA, DNA, and protein to a gel).

In some embodiments, proteins in the biological sample are anchored to a swellable gel such as a polyelectrolyte gel. An antibody can be directed to the protein before, after, or in conjunction with being anchored to the swellable gel. DNA and/or RNA in a biological sample can also be anchored to the swellable gel via a suitable linker. Examples of such linkers include, but are not limited to, 6-((Acryloyl) amino) hexanoic acid (Acryloyl-X SE) (available from ThermoFisher Scientific™, Waltham, MA), Label-IT Amine (available from MirusBio, Madison, WI) and Label X (described for example in Chen et al., *Nat. Methods* 13:679-684, 2016, the entire contents of which are incorporated herein by reference).

Isometric expansion of the sample can increase the spatial resolution of the subsequent analysis of the sample. The increased resolution in spatial profiling can be determined by comparison of an isometrically expanded sample with a sample that has not been isometrically expanded.

In some embodiments, a biological sample is isometrically expanded to a size at least 2×, 2.1×, 2.2×, 2.3×, 2.4×, 2.5×, 2.6×, 2.7×, 2.8×, 2.9×, 3×, 3.1×, 3.2×, 3.3×, 3.4×, 3.5×, 3.6×, 3.7×, 3.8×, 3.9×, 4×, 4.1×, 4.2×, 4.3×, 4.4×, 4.5×, 4.6×, 4.7×, 4.8×, or 4.9× its non-expanded size. In some embodiments, the sample is isometrically expanded to at least 2× and less than 20× of its non-expanded size.

(vii) Crosslinking and De-crosslinking

In some embodiments, the biological sample is reversibly or irreversibly cross-linked prior to, during, or after an assay step disclosed herein. A cross-linking agent includes a chemical agent, or even light, that facilitates the attachment of one molecule to another molecule. Cross-linking agents can be protein-nucleic acid cross-linking agents, nucleic acid-nucleic acid cross-linking agents, and/or protein-protein cross-linking agents. In some embodiments, a cross-linking agent is a reversible cross-linking agent. In some embodiments, a cross-linking agent is a non-reversible cross-linking agent.

In some embodiments, the sample to be analyzed is contacted with a protein-nucleic acid cross-linking agent, a nucleic acid-nucleic acid cross-linking agent, a protein-protein cross-linking agent or any combination thereof. In some examples, a cross-linker is a reversible cross-linker, such that the cross-linked molecules can be easily separated. In some examples, a cross-linker is a non-reversible cross-linker, such that the cross-linked molecules cannot be easily separated. In some examples, a cross-linker is light, such as UV light. In some examples, a cross linker is light activated. These cross-linkers include formaldehyde, disuccinimidyl glutarate, UV-254, psoralens and their derivatives such as aminomethyltrioxsalen, glutaraldehyde, ethylene glycol bis [succinimidylsuccinate], and other compounds, including those described in the Thermo Scientific Pierce Cross-linking Technical Handbook, Thermo Scientific (2009) as available on the world wide web at piercenet.com/files/1601673_Cross-link_HB_Intl.pdf.

In some embodiments, target molecules can be present within a three dimensional matrix material and covalently attached to the three dimensional matrix material such that the relative position of each target molecule is fixed, e.g., immobilized, within the three dimensional matrix material. In this manner, a three-dimensional matrix of covalently bound target molecules of any desired sequence is provided. Each target molecule has its own three dimensional coordinates within the matrix material and each target molecule represents information. In this manner, a large amount of information can be stored in a three dimensional matrix.

In some embodiments, a cross-linkable probe is used to anchor target molecules to a three dimensional matrix such that the relative position of each target molecule is fixed. In embodiments, the sample is contacted with a poly-dT anchor probe to bind and anchor polyadenylated (polyA) RNAs to the matrix. In some embodiments, the anchor probe (e.g., the poly-dT anchor probe) comprises a terminal acrydite moiety or other crosslinkable moiety, which can be covalently incorporated into the matrix (e.g., during matrix polymerization). In some embodiments, the poly-dT anchor probe can be about 10 to 20 nucleotides in length (e.g., about 15-nucleotides in length). In some embodiments, the anchor probe can comprise locked-nucleic acid bases to stabilize the hybridization of the poly-dT anchor probe to polyA tails of the RNAs.

According to a further aspect, the target molecules can be amplified products of an analyte, such as amplicons produced within the three dimensional matrix material. The amplicons can then be covalently attached to the matrix, for example, by copolymerization or cross-linking. This results in a structurally stable and chemically stable three dimensional matrix of target molecules. According to this aspect, the three dimensional matrix of target molecules allows for prolonged information storage and read-out cycles. Furthermore, the position of the target molecules in the sample can be stable.

In some aspects, the analytes, polynucleotides and/or amplification product (e.g., amplicon) of an analyte or a probe bound thereto can be anchored to a polymer matrix. For example, the polymer matrix can be a hydrogel. In some embodiments, the polymer matrix comprises functional moieties. In some embodiments, one or more of the polynucleotide probe(s) and/or amplification product (e.g., amplicon) thereof can be modified to contain functional groups that can be used as an anchoring site to attach the polynucleotide probes and/or amplification product to a polymer matrix. In some embodiments, crosslinking chemistry may be used to anchor functional moieties of the one or more of the polynucleotide probe(s) and/or amplification product (e.g., amplicon) to other molecules and/or to the polymer matrix. For example, any suitable functional moieties can be used, such as an amine, acrydite, alkyne, biotin, azide, and thiol. In some embodiments for crosslinking, the functional moiety may be cross-linked to modified dNTP or dUTP or both. In some cases, a combination of anchoring approaches (e.g., functional moieties) can be used, e.g., to anchor one or more types of molecules to the polymer matrix.

In some embodiments, the anchoring may comprise using an acrylamide group or click chemistry moiety. In some aspects, one or more of the polynucleotide probe(s) and/or amplification product (e.g., amplicon) thereof can comprise modified nucleotides that may have the functional group directly (e.g., acrylamide, click chemistry) or be further modified (e.g., amine modified with an NHS ester chemistry) to contain the functional group. In some embodiments, click reaction chemistry may be used to couple one or more of the target molecules (or a product or derivative thereof), polynucleotide probe(s), and/or amplification product (e.g., amplicon) to the matrix (e.g., hydrogel). Any suitable click reaction and click reactive groups may be used. In some cases, a molecule may be tethered via a click reaction to a click reactive group functionalized hydrogel matrix (e.g., click gel). For example, the 5'azidomethyl-dUTP can be incorporated into a product or derivative of the target molecule, polynucleotide probe(s), and/or amplification product (e.g., amplicon) and then immobilized to the hydrogel matrix functionalized with alkyne groups. In some embodiments, a buffer can be used for click reaction catalyzation, e.g., a Cu(I)-catalyzed alkyne-azide cycloaddition (abbreviated as CuAAC) click reaction catalyzing buffer, which catalyzes the alkyne-azide bond in the click reaction.

In some embodiments, a product or derivative of the target molecule, polynucleotide probe(s), and/or amplification product (e.g., amplicon) may be functionalized by adding nucleotide triphosphate analogs comprising functional moieties for immobilization. In some examples, the nucleotide triphosphate analogs include, but are not limited to, amino-allyl dUTP, 5-TCO-PEG4-dUTP, C8-Alkyne-dUTP, 5-Azidomethyl-dUTP, 5-Vinyl-dUTP, 5-Ethynyl dUTP, and other nucleotide triphosphate analogs comprising a functional moiety for immobilization by cross-linking, or forming a chemical bond between the molecule and the matrix.

In some embodiments, the matrix comprises a cellular or synthetic matrix that contains chemical moieties (e.g., reactive groups) that can react with the functional moieties in the product or derivative of the target molecule, polynucleotide probe(s), and/or amplification product (e.g., amplicon) through functionalization reactions. For example, aminoallyl dUTP may be cross-linked to endogenous free amine groups present in proteins and other biomolecules present within the endogenous or exogenous cellular matrix, or present in a modified synthetic hydrogel matrix, such as an amine-functionalized polyacrylamide hydrogel formed by copolymerization of polyacrylamide and N-(3-aminopropyl)-methacrylamide. In some cases, nucleoside analogs containing azide functional moieties may be cross-linked to a synthetic hydrogel matrix comprising alkyne functional moieties, such as that formed by copolymerization of acrylamide and propargyl acrylamide.

In some embodiments, the biological sample is immobilized in a hydrogel via cross-linking of the polymer material that forms the hydrogel. Cross-linking can be performed chemically and/or photochemically, or alternatively by any other hydrogel-formation method. A hydrogel may include a macromolecular polymer gel including a network. Within the network, some polymer chains can optionally be cross-linked, although cross-linking does not always occur.

In some embodiments, a hydrogel can include hydrogel subunits, such as, but not limited to, acrylamide, bis-acrylamide, polyacrylamide and derivatives thereof, poly(ethylene glycol) and derivatives thereof (e.g. PEG-acrylate (PEG-DA), PEG-RGD), gelatin-methacryloyl (GelMA), methacrylated hyaluronic acid (MeHA), polyaliphatic polyurethanes, polyether polyurethanes, polyester polyurethanes, polyethylene copolymers, polyamides, polyvinyl alcohols, polypropylene glycol, polytetramethylene oxide, polyvinyl pyrrolidone, polyacrylamide, poly(hydroxyethyl acrylate), and poly(hydroxyethyl methacrylate), collagen, hyaluronic acid, chitosan, dextran, agarose, gelatin, alginate, protein polymers, methylcellulose, and the like, and combinations thereof.

In some embodiments, a hydrogel includes a hybrid material, e.g., the hydrogel material includes elements of both synthetic and natural polymers. Examples of suitable hydrogels are described, for example, in U.S. Pat. Nos. 6,391,937, 9,512,422, and 9,889,422, and in U.S. Patent Application Publication Nos. 2017/0253918, 2018/0052081 and 2010/0055733, the entire contents of each of which are incorporated herein by reference.

In some embodiments, the hydrogel can form the substrate. In some embodiments, the substrate includes a hydrogel and one or more second materials. In some embodiments, the hydrogel is placed on top of one or more second materials. For example, the hydrogel can be pre-formed and then placed on top of, underneath, or in any other configuration with one or more second materials. In some embodiments, hydrogel formation occurs after contacting one or more second materials during formation of the substrate. Hydrogel formation can also occur within a structure (e.g., wells, ridges, projections, and/or markings) located on a substrate.

In some embodiments, hydrogel formation on a substrate occurs before, contemporaneously with, or after probes are provided to the sample. For example, hydrogel formation can be performed on the substrate already containing the probes.

In some embodiments, hydrogel formation occurs within a biological sample. In some embodiments, a biological sample (e.g., tissue section) is embedded in a hydrogel. In some embodiments, hydrogel subunits are infused into the biological sample, and polymerization of the hydrogel is initiated by an external or internal stimulus.

In embodiments in which a hydrogel is formed within a biological sample, functionalization chemistry can be used. In some embodiments, functionalization chemistry includes hydrogel-tissue chemistry (HTC). Any hydrogel-tissue backbone (e.g., synthetic or native) suitable for HTC can be used for anchoring biological macromolecules and modulating functionalization. Non-limiting examples of methods using HTC backbone variants include CLARITY, PACT, ExM, SWITCH and ePACT. In some embodiments, hydrogel formation within a biological sample is permanent. For example, biological macromolecules can permanently adhere to the hydrogel allowing multiple rounds of interrogation. In some embodiments, hydrogel formation within a biological sample is reversible.

In some embodiments, additional reagents are added to the hydrogel subunits before, contemporaneously with, and/or after polymerization. For example, additional reagents can include but are not limited to oligonucleotides (e.g., probes), endonucleases to fragment DNA, fragmentation buffer for DNA, DNA polymerase enzymes, dNTPs used to amplify the nucleic acid and to attach the barcode to the amplified fragments. Other enzymes can be used, including without limitation, RNA polymerase, transposase, ligase, proteinase K, and DNAse. Additional reagents can also include reverse transcriptase enzymes, including enzymes with terminal transferase activity, primers, and switch oligonucleotides. In some embodiments, optical labels are added to the hydrogel subunits before, contemporaneously with, and/or after polymerization.

In some embodiments, HTC reagents are added to the hydrogel before, contemporaneously with, and/or after polymerization. In some embodiments, a cell labelling agent is added to the hydrogel before, contemporaneously with, and/or after polymerization. In some embodiments, a cell-penetrating agent is added to the hydrogel before, contemporaneously with, and/or after polymerization.

Hydrogels embedded within biological samples can be cleared using any suitable method. For example, electrophoretic tissue clearing methods can be used to remove biological macromolecules from the hydrogel-embedded sample. In some embodiments, a hydrogel-embedded sample is stored before or after clearing of hydrogel, in a medium (e.g., a mounting medium, methylcellulose, or other semi-solid mediums).

In some embodiments, a method disclosed herein comprises de-crosslinking the reversibly cross-linked biological sample. The de-crosslinking does not need to be complete. In some embodiments, only a portion of crosslinked molecules in the reversibly cross-linked biological sample are de-crosslinked and allowed to migrate.

(viii) Tissue Permeabilization and Treatment

In some embodiments, a biological sample can be permeabilized to facilitate transfer of species (such as probes) into the sample. If a sample is not permeabilized sufficiently, the amount of species (such as probes) in the sample may be too low to enable adequate analysis. Conversely, if the tissue sample is too permeable, the relative spatial relationship of the analytes within the tissue sample can be lost. Hence, a balance between permeabilizing the tissue sample enough to obtain good signal intensity while still maintaining the spatial resolution of the analyte distribution in the sample is desirable.

In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X-100™ or Tween-20™), and enzymes (e.g., trypsin, proteases). In some embodiments, the biological sample can be incubated with a cellular permeabilizing agent to facilitate permeabilization of the sample. Additional methods for sample permeabilization are described, for example, in Jamur et al., Method Mol. Biol. 588:63-66, 2010, the entire contents of which are incorporated herein by reference. Any suitable method for sample permeabilization can generally be used in connection with the samples described herein.

In some embodiments, the biological sample can be permeabilized by adding one or more lysis reagents to the sample. Examples of suitable lysis agents include, but are not limited to, bioactive reagents such as lysis enzymes that are used for lysis of different cell types, e.g., gram positive or negative bacteria, plants, yeast, mammalian, such as lysozymes, achromopeptidase, lysostaphin, labiase, kitalase, lyticase, and a variety of other commercially available lysis enzymes.

Other lysis agents can additionally or alternatively be added to the biological sample to facilitate permeabilization. For example, surfactant-based lysis solutions can be used to lyse sample cells. Lysis solutions can include ionic surfactants such as, for example, sarcosyl and sodium dodecyl sulfate (SDS). More generally, chemical lysis agents can include, without limitation, organic solvents, chelating agents, detergents, surfactants, and chaotropic agents.

In some embodiments, the biological sample can be permeabilized by non-chemical permeabilization methods. Non-chemical permeabilization methods that can be used include, but are not limited to, physical lysis techniques such as electroporation, mechanical permeabilization methods (e.g., bead beating using a homogenizer and grinding balls to mechanically disrupt sample tissue structures), acoustic permeabilization (e.g., sonication), and thermal lysis techniques such as heating to induce thermal permeabilization of the sample.

Additional reagents can be added to a biological sample to perform various functions prior to analysis of the sample. In some embodiments, DNase and RNase inactivating agents or inhibitors such as proteinase K, and/or chelating agents such as EDTA, can be added to the sample. For example, a method disclosed herein may comprise a step for increasing accessibility of a nucleic acid for binding, e.g., a denaturation step to opening up DNA in a cell for hybridization by a probe. For example, proteinase K treatment may be used to free up DNA with proteins bound thereto.

(ix) Selective Enrichment of RNA Species

In some embodiments, where RNA is the analyte, one or more RNA analyte species of interest can be selectively enriched. For example, one or more species of RNA of interest can be selected by addition of one or more oligonucleotides to the sample. In some embodiments, the additional oligonucleotide is a sequence used for priming a reaction by an enzyme (e.g., a polymerase). For example, one or more primer sequences with sequence complementarity to one or more RNAs of interest can be used to amplify the one or more RNAs of interest, thereby selectively enriching these RNAs.

Alternatively, one or more species of RNA can be down-selected (e.g., removed) using any of a variety of methods. For example, probes can be administered to a sample that selectively hybridize to ribosomal RNA (rRNA), thereby reducing the pool and concentration of rRNA in the sample. Additionally and alternatively, duplex-specific nuclease (DSN) treatment can remove rRNA (see, e.g., Archer, et al, Selective and flexible depletion of problematic sequences from RNA-seq libraries at the cDNA stage, *BMC Genomics,* 15 401, (2014), the entire contents of which are incorporated herein by reference). Furthermore, hydroxyapatite chromatography can remove abundant species (e.g., rRNA) (see, e.g., Vandernoot, V. A., cDNA normalization by hydroxyapatite chromatography to enrich transcriptome diversity in RNA-seq applications, Biotechniques, 53(6) 373-80, (2012), the entire contents of which are incorporated herein by reference).

A biological sample may comprise one or a plurality of analytes of interest. Methods for performing multiplexed assays to analyze two or more different analytes in a single biological sample are provided.

B. Analytes

The methods and compositions disclosed herein can be used to detect and analyze a wide variety of different analytes. In some aspects, an analyte can include any biological substance, structure, moiety, or component to be analyzed. In some embodiments, any of the target nucleic acid molecules described herein can correspond to an analyte. For instance, a target nucleic acid molecule can be an endogenous nucleic acid analyte (e.g., DNA or RNA), a product of an endogenous nucleic acid analyte, a probe that directly or indirectly binds to an endogenous nucleic acid analyte, or a product of a probe that directly or indirectly binds to an endogenous nucleic acid analyte. In some aspects, an analyte can include any biological substance, structure, moiety, or component to be analyzed. In some aspects, a target disclosed herein may similarly include any analyte of interest. In some examples, a target or analyte can be directly or indirectly detected.

Analytes can be derived from a specific type of cell and/or a specific subcellular region. For example, analytes can be derived from cytosol, from cell nuclei, from mitochondria, from microsomes, and more generally, from any other compartment, organelle, or portion of a cell. Permeabilizing agents that specifically target certain cell compartments and organelles can be used to selectively release analytes from cells for analysis, and/or allow access of one or more reagents (e.g., probes for analyte detection) to the analytes in the cell or cell compartment or organelle.

The analyte may include any biomolecule or chemical compound, including a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g. an affinity binding partner) can be developed. Such a specific binding partner may be a nucleic acid probe (for a nucleic acid analyte) and may lead directly to the generation of a RCA template. Alternatively, the specific binding partner may be coupled to a nucleic acid, which may be detected using an RCA strategy, e.g. in an assay which uses or generates a circular nucleic acid molecule which can be the RCA template.

Analytes of particular interest may include nucleic acid molecules, such as DNA (e.g. genomic DNA, mitochondrial DNA, plastid DNA, viral DNA, etc.) and RNA (e.g. mRNA, microRNA, rRNA, snRNA, viral RNA, etc.), and synthetic and/or modified nucleic acid molecules, (e.g. including nucleic acid domains comprising or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof, or a lipid or carbohydrate molecule, or any molecule which comprise a lipid or carbohydrate component. The analyte may be a single molecule or a complex that contains two or more molecular subunits, e.g. including but not limited to protein-DNA complexes, which may or may not be covalently bound to one another, and which may be the same or different. Thus in addition to cells or microorganisms, such a complex analyte may also be a protein complex or protein interaction. Such a complex or interaction may thus be a homo- or hetero-multimer. Aggregates of molecules, e.g. proteins may also be target analytes, for example aggregates of the same protein or different proteins. The analyte may also be a complex between proteins or peptides and nucleic acid molecules such as DNA or RNA, e.g. interactions between proteins and nucleic acids, e.g. regulatory factors, such as transcription factors, and DNA or RNA.

(i) Endogenous Analytes

In some embodiments, a target molecule herein corresponds to an analyte that is endogenous to a biological sample and can include nucleic acid analytes and non-nucleic acid analytes. Methods and compositions disclosed herein can be used to analyze nucleic acid analytes (e.g., using a nucleic acid probe or probe set such as a first and second probe that directly or indirectly hybridizes to a nucleic acid analyte) and/or non-nucleic acid analytes (e.g., using a labelling agent that comprises a reporter oligonucleotide and binds directly or indirectly to a non-nucleic acid analyte) in any suitable combination.

Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments. In some embodiments, the analyte is inside a cell or on a cell surface, such as a transmembrane analyte or one that is attached to the cell membrane. In some embodiments, the analyte can be an organelle (e.g., nuclei or mitochondria). In some embodiments, the analyte is an extracellular analyte, such as a secreted analyte. Exemplary analytes include, but are not limited to, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction.

Examples of nucleic acid analytes include DNA analytes such as single-stranded DNA (ssDNA), double-stranded DNA (dsDNA), genomic DNA, methylated DNA, specific methylated DNA sequences, fragmented DNA, mitochondrial DNA, in situ synthesized PCR products, and RNA/DNA hybrids. The DNA analyte can be a transcript of another nucleic acid molecule (e.g., DNA or RNA such as mRNA) present in a tissue sample.

Examples of nucleic acid analytes also include RNA analytes such as various types of coding and non-coding RNA. Examples of the different types of RNA analytes include messenger RNA (mRNA), including a nascent RNA, a pre-mRNA, a primary-transcript RNA, and a processed RNA, such as a capped mRNA (e.g., with a 5' 7-methyl guanosine cap), a polyadenylated mRNA (poly-A tail at the 3' end), and a spliced mRNA in which one or more introns have been removed. Also included in the analytes disclosed herein are non-capped mRNA, a non-polyadenylated mRNA, and a non-spliced mRNA. The RNA analyte can be a transcript of another nucleic acid molecule (e.g., DNA or RNA such as viral RNA) present in a tissue sample. Examples of a non-coding RNAs (ncRNA) that is not translated into a protein include transfer RNAs (tRNAs) and ribosomal RNAs (rRNAs), as well as small non-coding RNAs such as microRNA (miRNA), small interfering RNA (siRNA), Piwi-interacting RNA (piRNA), small nucleolar RNA (snoRNA), small nuclear RNA (snRNA), extracellular RNA (exRNA), small Cajal body-specific RNAs (scaR-NAs), and the long ncRNAs such as Xist and HOTAIR. The RNA can be small (e.g., less than 200 nucleic acid bases in length) or large (e.g., RNA greater than 200 nucleic acid bases in length). Examples of small RNAs include 5.8S ribosomal RNA (rRNA), 5S rRNA, tRNA, miRNA, siRNA, snoRNAs, piRNA, tRNA-derived small RNA (tsRNA), and small rDNA-derived RNA (srRNA). The RNA can be double-stranded RNA or single-stranded RNA. The RNA can be circular RNA. The RNA can be a bacterial rRNA (e.g., 16s rRNA or 23s rRNA).

In some embodiments described herein, an analyte may be a denatured nucleic acid, wherein the resulting denatured nucleic acid is single-stranded. The nucleic acid may be denatured, for example, optionally using formamide, heat, or both formamide and heat. In some embodiments, the nucleic acid is not denatured for use in a method disclosed herein.

In certain embodiments, an analyte can be extracted from a live cell. Processing conditions can be adjusted to ensure that a biological sample remains live during analysis, and analytes are extracted from (or released from) live cells of the sample. Live cell-derived analytes can be obtained only once from the sample, or can be obtained at intervals from a sample that continues to remain in viable condition.

Methods and compositions disclosed herein can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample or within an individual feature of the substrate.

In any embodiment described herein, the analyte comprises a target sequence. In some embodiments, the target sequence may be endogenous to the sample, generated in the sample, added to the sample, or associated with an analyte in the sample. In some embodiments, the target sequence is a single-stranded target sequence. In some embodiments, the analytes comprises one or more single-stranded target sequences. In one aspect, a first single-stranded target sequence is not identical to a second single-stranded target sequence. In another aspect, a first single-stranded target sequence is identical to one or more second single-stranded target sequence. In some embodiments, the one or more second single-stranded target sequence is comprised in the same analyte (e.g., nucleic acid) as the first single-stranded target sequence. Alternatively, the one or more second single-stranded target sequence is comprised in a different analyte (e.g., nucleic acid) from the first single-stranded target sequence.

(ii) Labelling Agents

In some embodiments, provided herein are methods and compositions for analyzing endogenous analytes (e.g., RNA, ssDNA, and cell surface or intracellular proteins and/or metabolites) in a sample using one or more labelling agents. In some embodiments, an analyte labelling agent may include an agent that interacts with an analyte (e.g., an endogenous analyte in a sample). In some embodiments, the labelling agents can comprise a reporter oligonucleotide that is indicative of the analyte or portion thereof interacting with the labelling agent. For example, the reporter oligonucleotide may comprise a barcode sequence that permits identification of the labelling agent. In some cases, the sample contacted by the labelling agent can be further contacted with a probe (e.g., a single-stranded probe sequence), that hybridizes to a reporter oligonucleotide of the labelling agent, in order to identify the analyte associated with the labelling agent. In some embodiments, the analyte labelling agent comprises an analyte binding moiety and a labelling agent barcode domain comprising one or more barcode sequences, e.g., a barcode sequence that corresponds to the analyte binding moiety and/or the analyte. An analyte binding moiety barcode includes to a barcode that is associated with or otherwise identifies the analyte binding moiety. In some embodiments, by identifying an analyte binding moiety by identifying its associated analyte binding moiety barcode, the analyte to which the analyte binding moiety binds can also be identified. An analyte binding moiety barcode can be a nucleic acid sequence of a given length and/or sequence that is associated with the analyte binding moiety. An analyte binding moiety barcode can generally include any of the variety of aspects of barcodes described herein.

In some embodiments, the method comprises one or more post-fixing (also referred to as post-fixation) steps after contacting the sample with one or more labelling agents.

In the methods and systems described herein, one or more labelling agents capable of binding to or otherwise coupling to one or more features may be used to characterize analytes, cells and/or cell features. In some instances, cell features include cell surface features. Analytes may include, but are not limited to, a protein, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, a gap junction, an adherens junction, or any combination thereof. In some instances, cell features may include intracellular analytes, such as proteins, protein modifications (e.g., phosphorylation status or other post-translational modifications), nuclear proteins, nuclear membrane proteins, or any combination thereof.

In some embodiments, a binder or an analyte binding moiety may include any molecule or moiety capable of binding to an analyte (e.g., a biological analyte, e.g., a macromolecular constituent). A labelling agent may include, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The labelling agents can include (e.g., are attached to) a reporter oligonucleotide that is indicative of the cell surface feature to which the binding group binds. For example, the reporter oligonucleotide may comprise a barcode sequence that permits identification of the labelling agent. For example, a labelling agent that is specific to one type of cell feature (e.g., a first cell surface feature) may have coupled thereto a first reporter oligonucleotide, while a labelling agent that is specific to a different cell feature (e.g., a second cell surface feature) may have a different reporter oligonucleotide coupled thereto. For a description of exemplary labelling agents, reporter oligonucleotides, and methods of use, see, e.g., U.S. Pat. No. 10,550,429; U.S. Pat. Pub. 20190177800; and U.S. Pat. Pub. 20190367969, which are each incorporated by reference herein in their entirety.

In some embodiments, an analyte binding moiety includes one or more antibodies or antigen binding fragments thereof. The antibodies or antigen binding fragments including the analyte binding moiety can specifically bind to a target analyte. In some embodiments, the analyte is a protein (e.g., a protein on a surface of the biological sample (e.g., a cell) or an intracellular protein). In some embodiments, a plurality of analyte labelling agents comprising a plurality of analyte binding moieties bind a plurality of analytes present in a biological sample. In some embodiments, the plurality of analytes includes a single species of analyte (e.g., a single species of polypeptide). In some embodiments in which the plurality of analytes includes a single species of analyte, the analyte binding moieties of the plurality of analyte labelling agents are the same. In some embodiments in which the plurality of analytes includes a single species of analyte, the analyte binding moieties of the plurality of analyte labelling agents are the different (e.g., members of the plurality of analyte labelling agents can have two or more species of analyte binding moieties, wherein each of the two or more species of analyte binding moieties binds a single species of analyte, e.g., at different binding sites). In some embodiments, the plurality of analytes includes multiple different species of analyte (e.g., multiple different species of polypeptides).

In other instances, e.g., to facilitate sample multiplexing, a labelling agent that is specific to a particular cell feature may have a first plurality of the labelling agent (e.g., an antibody or lipophilic moiety) coupled to a first reporter oligonucleotide and a second plurality of the labelling agent coupled to a second reporter oligonucleotide.

In some aspects, these reporter oligonucleotides may comprise nucleic acid barcode sequences that permit identification of the labelling agent which the reporter oligonucleotide is coupled to. The selection of oligonucleotides as the reporter may provide advantages of being able to generate significant diversity in terms of sequence, while also being readily attachable to most biomolecules, e.g., antibodies, etc., as well as being detectable.

Attachment (coupling) of the reporter oligonucleotides to the labelling agents may be achieved through any of a variety of direct or indirect, covalent or non-covalent associations or attachments. For example, oligonucleotides may be covalently attached to a portion of a labelling agent (such a protein, e.g., an antibody or antibody fragment) using chemical conjugation techniques (e.g., Lightning-Link® antibody labelling kits available from Innova Biosciences), as well as other non-covalent attachment mechanisms, e.g., using biotinylated antibodies and oligonucleotides (or beads that include one or more biotinylated linker, coupled to oligonucleotides) with an avidin or streptavidin linker. Antibody and oligonucleotide biotinylation techniques are available. See, e.g., Fang, et al., "Fluoride-Cleavable Biotinylation Phosphoramidite for 5'-end-Labelling and Affinity Purification of Synthetic Oligonucleotides," Nucleic Acids Res. Jan. 15, 2003; 31(2):708-715, which is entirely incorporated herein by reference for all purposes. Likewise, protein and peptide biotinylation techniques have been developed and are readily available. See, e.g., U.S. Pat. No. 6,265,552, which is entirely incorporated herein by reference for all purposes. Furthermore, click reaction chemistry may be used to couple reporter oligonucleotides to labelling agents. Commercially available kits, such as those from Thunderlink® and Abcam, and techniques common in the art may be used to couple reporter oligonucleotides to labelling agents as appropriate. In another example, a labelling agent is indirectly (e.g., via hybridization) coupled to a reporter oligonucleotide comprising a barcode sequence that identifies the label agent. For instance, the labelling agent may be directly coupled (e.g., covalently bound) to a hybridization oligonucleotide that comprises a sequence that hybridizes with a sequence of the reporter oligonucleotide. Hybridization of the hybridization oligonucleotide to the reporter oligonucleotide couples the labelling agent to the reporter oligonucleotide. In some embodiments, the reporter oligonucleotides are releasable from the labelling agent, such as upon application of a stimulus. For example, the reporter oligonucleotide may be attached to the labeling agent through a labile bond (e.g., chemically labile, photolabile, thermally labile, etc.) as generally described for releasing molecules from supports elsewhere herein. In some instances, the reporter oligonucleotides described herein may include one or more functional sequences that can be used in subsequent processing.

In some cases, the labelling agent can comprise a reporter oligonucleotide and a label. A label can be fluorophore, a radioisotope, a molecule capable of a colorimetric reaction, a magnetic particle, or any other suitable molecule or compound capable of detection. The label can be conjugated to a labelling agent (or reporter oligonucleotide) either directly or indirectly (e.g., the label can be conjugated to a molecule that can bind to the labelling agent or reporter oligonucleotide). In some cases, a label is conjugated to a first oligonucleotide that is complementary (e.g., hybridizes) to a sequence of the reporter oligonucleotide.

In some embodiments, multiple different species of analytes (e.g., polypeptides) from the biological sample can be subsequently associated with the one or more physical properties of the biological sample. For example, the multiple different species of analytes can be associated with locations of the analytes in the biological sample. Such information (e.g., proteomic information when the analyte binding moiety(ies) recognizes a polypeptide(s)) can be used in association with other spatial information (e.g., genetic information from the biological sample, such as DNA sequence information, transcriptome information (e.g., sequences of transcripts), or both). For example, a cell surface protein of a cell can be associated with one or more physical properties of the cell (e.g., a shape, size, activity, or a type of the cell). The one or more physical properties can be characterized by imaging the cell. The cell can be bound by an analyte labelling agent comprising an analyte binding moiety that binds to the cell surface protein and an analyte binding moiety barcode that identifies that analyte binding moiety. Results of protein analysis in a sample (e.g., a tissue sample or a cell) can be associated with DNA and/or RNA analysis in the sample.

(iii) Products of Endogenous Analyte and/or Labelling Agent

In some embodiments, a target molecule herein is a product of an endogenous analyte and/or a labelling agent in a biological sample. In some embodiments, provided herein are methods and compositions for analyzing one or more products of an endogenous analyte and/or a labelling agent in a biological sample. In some embodiments, an endogenous analyte (e.g., a viral or cellular DNA or RNA) or a product (e.g., a hybridization product, a ligation product, an extension product (e.g., by a DNA or RNA polymerase), a replication product, a transcription/reverse transcription product, and/or an amplification product) or derivative thereof is analyzed. In some embodiments, a labelling agent (or a reporter oligonucleotide attached thereto) that directly or indirectly binds to an analyte in the biological sample is analyzed. In some embodiments, a product (e.g., a hybridization product, a ligation product, an extension product (e.g., by a DNA or RNA polymerase), a replication product, a transcription/reverse transcription product, and/or an amplification product) or derivative of a labelling agent that directly or indirectly binds to an analyte in the biological sample is analyzed.

a. Hybridization

In some embodiments, a product of an endogenous analyte and/or a labelling agent is a hybridization product comprising the pairing of substantially complementary or complementary nucleic acid sequences within two different molecules, one of which is the endogenous analyte or the labelling agent (e.g., reporter oligonucleotide attached thereto). The other molecule can be another endogenous molecule or another labelling agent such as a probe. Pairing can be achieved by any process in which a nucleic acid sequence joins with a substantially or fully complementary sequence through base pairing to form a hybridization complex. For purposes of hybridization, two nucleic acid sequences are "substantially complementary" if at least 60% (e.g., at least 70%, at least 80%, or at least 90%) of their individual bases are complementary to one another.

Various intermediate probes and intermediate probe sets can be hybridized to an endogenous analyte and/or a labelling agent (e.g., a reporter oligonucleotide attached thereto) and each probe may comprise one or more barcode sequences. Exemplary barcoded probes or probe sets may be based on a padlock probe, a gapped padlock probe, a SNAIL (Splint Nucleotide Assisted Intramolecular Ligation) probe set, a PLAYR (Proximity Ligation Assay for RNA) probe set, a PLISH (Proximity Ligation in situ Hybridization) probe set, RNA-templated ligation probes, L-shaped probes (e.g., a probe comprising a target-hybridizing sequence and a 5' or 3' overhang upon hybridization to its target sequence), or U-shaped probes (e.g., a probe comprising a target-hybridizing sequence and a 5' overhang and a 3' overhang upon hybridization to its target sequence). The specific probe or probe set design can vary. In some embodiments, a probe set (e.g., the first probe and the second probe that are connected to form the composite probe) described in Section III is hybridized to a sequence of a target nucleic acid molecule (e.g., an endogenous analyte molecule) in the biological sample.

b. Ligation

In some embodiments, a product of an endogenous analyte and/or a labelling agent is a ligation product that can be detected by any of the probes provided herein. In some embodiments, the ligation product is formed between two or more endogenous analytes. In some embodiments, the ligation product is formed between an endogenous analyte and a labelling agent. In some embodiments, the ligation product is formed between two or more labelling agent. In some embodiments, the ligation product is an intramolecular ligation of an endogenous analyte. In some embodiments, the ligation product is an intramolecular ligation of a labelling agent, for example, the circularization of a circularizable probe or probe set upon hybridization to a target sequence. The target sequence can be comprised in an endogenous analyte (e.g., nucleic acid such as genomic DNA or mRNA) or a product thereof (e.g., cDNA from a cellular mRNA transcript), or in a labelling agent (e.g., the reporter oligonucleotide) or a product thereof. In some embodiments, a probe set (e.g., the first probe and the second probe that are connected to form the composite probe) described in Section III hybridized to a sequence of a target nucleic acid molecule (e.g., an endogenous analyte molecule) in the biological sample is ligated to generate a circular template for generating an amplification product. In some embodiments, a method provided herein comprises generating a circular template (e.g., a composite probe disclosed in Section III) from two or more probe molecules and a 5' end sequence of a probe molecule and a 3' end sequence of another probe molecule are ligated. In some embodiments, generating a circular template comprises two or more ligation events, at least one of which is performed using the target nucleic acid as a template for ligation, and at least another ligation event is performed using a splint that is distinct from the target nucleic acid. The splint may but does not need to comprise a region that hybridizes to the target nucleic acid. In some embodiments, after the circular template is generated, the splint (or a portion thereof) and/or the target nucleic acid (or a portion thereof) can be used to prime rolling circle amplification using the circular template as a template.

In some embodiments, provided herein is a probe or probe set capable of DNA-templated ligation, such as from a cDNA molecule. See, e.g., U.S. Pat. No. 8,551,710, which is hereby incorporated by reference in its entirety. In some embodiments, provided herein is a probe or probe set capable of RNA-templated ligation. See, e.g., U.S. Pat. Pub. 2020/0224244 which is hereby incorporated by reference in its entirety.

c. Primer Extension and Amplification

In some embodiments, a product is a primer extension product of an analyte, a labelling agent, a probe or probe set bound to the analyte (e.g., a probe bound to genomic DNA, mRNA, or cDNA), or a probe or probe set bound to the labelling agent (e.g., a probe bound to one or more reporter oligonucleotides from the same or different labelling agents).

A primer is generally a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A 'primer' may, in some cases, refer to a primer binding sequence. A primer extension reaction generally refers to any method where two nucleic acid sequences become linked (e.g., hybridized) by an overlap of their respective terminal complementary nucleic acid sequences (e.g., for example, 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

In some embodiments, a product of an endogenous analyte and/or a labelling agent is an amplification product of one or more polynucleotides, for instance, a circular probe or circularizable probe or probe set. In some embodiments, the amplifying is achieved by performing rolling circle amplification (RCA). In other embodiments, a primer that hybridizes to the circular probe or circularized probe is added and used as such for amplification. In some embodiments, the RCA comprises a linear RCA, a branched RCA, a dendritic RCA, or any combination thereof.

In some embodiments, the amplification is performed at a temperature between or between about 20° C. and about 60° C. In some embodiments, the amplification is performed at a temperature between or between about 30° C. and about 40° C. In some aspects, the amplification step, such as the rolling circle amplification (RCA) is performed at a temperature between at or about 25° C. and at or about 50° C., such as at or about 25° C., 27° C., 29° C., 31° C., 33° C., 35° C., 37° C., 39° C., 41C, 43° C., 45° C., 47° C., or 49° C.

In some embodiments, a product herein includes a molecule or a complex generated in a series of reactions, e.g., hybridization, ligation, extension, replication, transcription/reverse transcription, and/or amplification (e.g., rolling circle amplification), in any suitable combination. For example, a product comprising a target sequence for a probe disclosed herein may be a hybridization complex formed of a cellular nucleic acid in a sample and an exogenously added nucleic acid probe. The exogenously added nucleic acid probe may be optionally ligated to a cellular nucleic acid molecule or another exogenous nucleic acid molecule. In other examples, a product comprising a target sequence for a probe disclosed herein may be an RCA product of a circularizable probe or probe set which hybridizes to a cellular nucleic acid molecule (e.g., genomic DNA or mRNA) or product thereof (e.g., a transcript such as cDNA, a DNA-templated ligation product of two probes, or an RNA-templated ligation product of two probes). In other examples, a product comprising a target sequence for a probe disclosed herein may be a probe hybridizing to an RCA product. The probe may comprise an overhang that does not hybridize to the RCA product but hybridizes to another probe (e.g., a probe comprising a second overhang for attachment of one or more modified nucleotides).

C. Target Sequences and Barcodes

A target sequence for a probe or probe set (e.g., first or second probe) disclosed herein may be comprised in any analyte disclose herein, including an endogenous analyte (e.g., a viral or cellular nucleic acid), a labelling agent (e.g., a reporter oligonucleotide attached thereto), or a product of an endogenous analyte and/or a labelling agent.

In some aspects, one or more of the target sequences includes one or more barcode(s), e.g., at least two, three, four, five, six, seven, eight, nine, ten, or more barcodes. Barcodes can spatially-resolve molecular components found in biological samples, for example, within a cell or a tissue sample. A barcode can be attached to an analyte or to another moiety or structure (e.g., a probe) in a reversible or irreversible manner. A barcode can be added to, for example, a fragment of a deoxyribonucleic acid (DNA) or ribonucleic acid (RNA) before or during sequence determination of nucleic acid molecules in the sample. Barcodes can allow for identification and/or quantification of individual reads (e.g., a barcode can be or can include a unique molecular identifier or "UMI"). In some aspects, a barcode comprises about 4, 5, 6, 7, 8, 9, 10, 11, 12, 13, 14, 15, 16, 17, 18, 19, 20, 21, 22, 23, 24, 25, 26, 27, 28, 29, 30, or more than 30 nucleotides.

In some embodiments, a barcode includes two or more sub-barcodes that together function as a single barcode. For example, a polynucleotide barcode can include two or more polynucleotide sequences (e.g., sub-barcodes) that are separated by one or more non-barcode sequences. In some embodiments, the one or more barcode(s) can also provide a platform for targeting functionalities, such as oligonucleotides, oligonucleotide-antibody conjugates, oligonucleotide-streptavidin conjugates, modified oligonucleotides, affinity purification, detectable moieties, enzymes, enzymes for detection assays or other functionalities, and/or for detection and identification of the polynucleotide.

In any of the embodiments herein, barcodes can be analyzed (e.g., detected or sequenced) using any suitable methods or techniques, including those described herein, such as in situ sequencing, targeted in situ sequencing, fluorescent in situ sequencing (FISSEQ), sequencing by synthesis (SBS), sequencing by ligation (SBL), sequencing by hybridization (SBH), or spatially-resolved transcript amplicon readout mapping (STARmap). In any of the embodiments herein, the methods provided herein can include analyzing the barcodes by sequential hybridization and detection with a plurality of labelled probes (e.g., detection oligos).

In some embodiments, in a barcode sequencing method, barcode sequences are detected for identification of other molecules including nucleic acid molecules (DNA or RNA) longer than the barcode sequences themselves, as opposed to direct sequencing of the longer nucleic acid molecules. In some embodiments, a N-mer barcode sequence comprises $4^N$ complexity given a sequencing read of N bases, and a much shorter sequencing read may be required for molecular identification compared to non-barcode sequencing methods such as direct sequencing. For example, 1024 molecular species may be identified using a 5-nucleotide barcode sequence (45=1024), whereas 8 nucleotide barcodes can be used to identify up to 65,536 molecular species, a number greater than the total number of distinct genes in the human genome. In some embodiments, the barcode sequences corresponding to the target molecules are detected, rather than endogenous sequences, which can be an efficient readout in terms of information per cycle of sequencing. Because the barcode sequences are pre-determined, they can also be designed to feature error detection and correction mechanisms, see, e.g., U.S. Pat. Pub. 20190055594 and U.S. Pat. Pub. 20210164039, which are hereby incorporated by reference in their entirety.

III. Nucleic Acid Probes

Disclosed herein in some aspects are nucleic acid probes and/or probe sets (e.g., polynucleotide probes and/or probe sets) that are introduced into a cell or used to otherwise contact a biological sample such as a tissue sample. The probes (e.g., the first probe, the second probe, and/or the composite probe disclosed herein) may comprise any of a variety of entities that can hybridize to a nucleic acid, typically by Watson-Crick base pairing, such as DNA, RNA, LNA, PNA, etc. The nucleic acid probe typically contains a targeting sequence that is able to directly or indirectly bind to at least a portion of a target nucleic acid. The nucleic acid probe may be able to bind to a specific target nucleic acid (e.g., an mRNA, or other nucleic acids as discussed herein). In some embodiments, the nucleic acid probes may be detected using a detectable label, and/or by using secondary nucleic acid probes able to bind to the nucleic acid probes. In some embodiments, the nucleic acid probes (e.g., primary probes and/or secondary probes) are compatible with one or more biological and/or chemical reactions. For instance, a nucleic acid probe disclosed herein can serve as a template or primer for a polymerase, a template or substrate for a ligase, a substrate for a click chemistry reaction, and/or a substrate for a nuclease (e.g., endonuclease or exonuclease for cleavage or digestion).

In some embodiments, provided herein is a nucleic acid probe set (e.g., split primary probe) comprising at least two or more probes (e.g., a first probe and a second probe) that can be joined to form a composite probe (e.g., a circularized probe). In some embodiments, the probe set comprises at least two or more probes wherein both a hybridization region (e.g., complementary to target sequences in a target nucleic acid molecule) and a barcode region are split between the first probe and the second probe (e.g., as shown in FIG. 1). In some embodiments, the probe set comprises a first probe comprising a hybridization region on the 3' end, and a second probe comprising a hybridization region on the 5' end. In some embodiments, the two probes each comprise a portion of a barcode region, such as a split portion of a barcode sequence or a split combination of barcode sequences to be detected using sequencing-by-hybridization (SBH). In some embodiments, the probe set comprises a first probe comprising a first portion of a barcode region on the 5' end, and a second probe comprising a second portion of the barcode region on the 3' end. In some embodiments, the probe set comprises a first probe comprising a first portion of a barcode region on the 5' end and a hybridization region on the 3' end, and a second probe comprising a hybridization region on the 5' end and a second portion of the barcode region on the 3' end.

In some embodiments, more than one type of secondary nucleic acid probes may be contacted with a sample, e.g., simultaneously or sequentially in any suitable order, such as in sequential probe hybridization/unhybridization cycles. In some embodiments, the secondary probes may comprise probes that bind to a product (e.g., an RCA product) of a composite probe formed from the first and second probes targeting an analyte. In some embodiments, the secondary probes may comprise a detectable probe (e.g., an intermediate probe such as an L-shaped probe) that hybridizes to an RCA product of a composite probe at a sequence corresponding to both the first portion of the barcode region and the second portion of the barcode region. In some embodiments, more than one type of secondary probes may be contacted with a sample, e.g., simultaneously or sequentially in any suitable order, such as in sequential probe hybridization/unhybridization cycles. In some embodiments, more than one type of higher order nucleic acid probes may be contacted with a sample, e.g., simultaneously or sequentially in any suitable order, such as in sequential probe hybridization/unhybridization cycles. In some embodiments, more than one type of detectably labeled nucleic acid probes may be contacted with a sample, e.g., simultaneously or sequentially in any suitable order, such as in sequential probe hybridization/unhybridization cycles. In some embodiments, the detectably labeled probes may comprise probes that bind to one or more primary probes (e.g., first and/or second probe), one or more secondary probes, one or more higher order probes, one or more intermediate probes between a primary/second/higher order probes, and/or one or more detectably or non-detectably labeled probes (e.g., as in the case of a hybridization chain reaction (HCR), a branched DNA reaction (bDNA), or the like). In some embodiments, at least 2, at least 5, at least 10, at least 25, at least 50, at least 75, at least 100, at least 300, at least 1,000, at least 3,000, at least 10,000, at least 30,000, at least 50,000, at least 100,000, at least 250,000, at least 500,000, or at least 1,000,000 distinguishable nucleic acid probes (e.g., primary, secondary, higher order probes, and/or detectably labeled probes) can be contacted with a sample, e.g., simultaneously or sequentially in any suitable order. Between any of the probe contacting steps disclosed herein, the method may comprise one or more intervening reactions and/or processing steps, such as modifications of a target nucleic acid, modifications of a probe or product thereof (e.g., via hybridization, ligation, extension, amplification, cleavage, digestion, branch migration, primer exchange reaction, click chemistry reaction, crosslinking, attachment of a detectable label, activating photo-reactive moieties, etc.), removal of a probe or product thereof (e.g., cleaving off a portion of a probe and/or unhybridizing the entire probe), signal modifications (e.g., quenching, masking, photo-bleaching, signal enhancement (e.g., via FRET), signal amplification, etc.), signal removal (e.g., cleaving off or permanently inactivating a detectable label), crosslinking, de-crosslinking, and/or signal detection.

The target-binding sequence (sometimes also referred to as the hybridization region, targeting region/sequence or the recognition region/sequence) of a probe may be positioned anywhere within the probe. For instance, the hybridization region of a composite primary probe (e.g., first or second probe) that binds to a target nucleic acid can be 5' or 3' to any barcode sequence in the probe. In some embodiments, the hybridization region may comprise a sequence that is substantially complementary to a portion of a target nucleic acid. In some embodiments, the portions may be at least 50%, at least 60%, at least 70%, at least 75%, at least 80%, at least 85%, at least 90%, at least 92%, at least 94%, at least 95%, at least 96%, at least 97%, at least 98%, at least 99%, or 100% complementary.

The hybridization region of a primary probe set (e.g., first or second probe) may be determined with reference to a target nucleic acid (e.g., a cellular RNA or a reporter oligonucleotide of a labelling agent for a cellular analyte) that is present or suspected of being present in a sample. In some embodiments, more than one target-binding sequence or hybridization region can be used to identify a particular analyte comprising or associated with a target nucleic acid. The more than one target-binding sequence or hybridization region can be in the same probe or in different probes. For instance, multiple probes can be used, sequentially and/or simultaneously, that can bind to (e.g., hybridize to) different regions of the same target nucleic acid. In some embodiments, a hybridization region is split between a first probe and a second probe. In other examples, a probe may comprise hybridization regions that can bind to different target nucleic acid sequences, e.g., various intron and/or exon sequences of the same gene (for detecting splice variants, for example), or sequences of different genes, e.g., for detecting a product that comprises the different target nucleic acid sequences, such as a genome rearrangement (e.g., inversion, transposition, translocation, insertion, deletion, duplication, and/or amplification).

After contacting the nucleic acid probes with a sample, the probes may be directly detected by determining detectable labels (if present), and/or detected by using one or more other probes that bind directly or indirectly to the probes or products thereof. The one or more other probes may comprise a detectable label. For instance, a primary nucleic acid probe or probe set (e.g., comprising a first probe and a second probe) can bind to a target nucleic acid in the sample, and a secondary nucleic acid probe can be introduced to bind to an amplification product of the primary nucleic acid probe or probe set, where the secondary nucleic acid probe or a product thereof can then be detected using detectably labeled probes. Higher order probes that directly or indirectly bind to the secondary nucleic acid probe or product thereof may also be used, and the higher order probes or products thereof can then be detected using detectably labeled probes.

In some embodiments, the detection may be spatial, e.g., in two or three dimensions. In some embodiments, the detection may be quantitative, e.g., the amount or concentration of a primary nucleic acid probe (and of a target nucleic acid) may be determined. In some embodiments, the primary probes, secondary probes, higher order probes, and/or detectably labeled probes may comprise any of a variety of entities able to hybridize a nucleic acid, e.g., DNA, RNA, LNA, and/or PNA, etc., depending on the application.

A secondary nucleic acid probe may contain a recognition sequence able to bind to or hybridize with a composite probe formed from the first and second probes or a product thereof, e.g., at a barcode sequence or portion(s) thereof of the composite probe formed from the first and second probes, or at a complement of the barcode sequence or portion(s) thereof (e.g., in the case of the secondary probe hybridizing to an RCA product of the primary probe). In some embodiments, a secondary nucleic acid probe may bind to a combination of barcode sequences (which may be continuous or spaced from one another) in a composite probe formed from the first and second probes or a product thereof. In some embodiments, a secondary nucleic acid probe may bind to a combination of barcode sequences in the first and second probe or a product generated using the first and second probe as template. In some embodiments, a secondary nucleic acid probe may bind to a barcode sequence in the first probe or the second probe or a product generated using the composite probe as template. In some embodiments, the binding is specific, or the binding may be such that a recognition sequence preferentially binds to or hybridizes with only one of the barcode sequences or complements thereof that are present. The secondary nucleic acid probe may also contain one or more detectable labels. If more than one secondary nucleic acid probe is used, the detectable labels may be the same or different.

The recognition sequences may be of any length, and multiple recognition sequences in the same or different secondary nucleic acid probes may be of the same or different lengths. If more than one recognition sequence is used, the recognition sequences may independently have the same or different lengths. For instance, the recognition sequence may be at least 4, at least 5, least 6, least 7, least 8, least 9, at least 10, least 11, least 12, least 13, least 14, at least 15, at least 16, at least 17, at least 18, least 19, at least 20, at least 25, at least 30, at least 35, at least 40, or at least 50 nucleotides in length. In some embodiments, the recognition sequence may be no more than 48, no more than 40, no more than 32, no more than 24, no more than 16, no more than 12, no more than 10, no more than 8, or no more than 6 nucleotides in length. Combinations of any of these are also possible, e.g., the recognition sequence may have a length of between 5 and 8, between 6 and 12, or between 7 and 15 nucleotides, etc. In one embodiment, the recognition sequence is of the same length as a barcode sequence or complement thereof of a primary nucleic acid probe or a product thereof. In some embodiments, the recognition sequence may be at least 50%, at least 60%, at least 70%, at least 75%, at least 80%, at least 85%, at least 90%, at least 92%, at least 94%, at least 95%, at least 96%, at least 97%, at least 98%, at least 99%, or at least 100% complementary to the barcode sequence or complement thereof.

In some embodiments, a nucleic acid probe, such as a composite probe formed from the first and second probes or a secondary nucleic acid probe, may also comprise 1, 2, 3, 4, 5, 6, 7, 8, 9, 10, 11, 12, 13, 14, 15 or more, 20 or more, 32 or more, 40 or more, or 50 or more barcode sequences. The barcode sequences may be positioned anywhere within the nucleic acid probe. In some embodiments, the split barcode region disclosed herein may comprise 1, 2, 3, 4, 5, 6, 7, 8, 9, 10, 11, 12, 13, 14, 15 or more barcode sequences. If more than one barcode sequences are present, the barcode sequences may be positioned next to each other, and/or interspersed with other sequences. In some embodiments, two or more of the barcode sequences may also at least partially overlap. In some embodiments, two or more of the barcode sequences in the same probe do not overlap. In some embodiments, all of the barcode sequences in the same probe are separated from one another by at least a phosphodiester bond (e.g., they may be immediately adjacent to each other but do not overlap), such as 1, 2, 3, 4, 5, 6, 7, 8, 9, 10 or more nucleotides apart.

The barcode sequence(s) in the split barcode region disclosed herein may be of any length. If more than one barcode sequence is used, the barcode sequences may independently have the same or different lengths, such as at least 5, at least 10, at least 15, at least 20, at least 25, at least 30, at least 35, at least 40, at least 50 nucleotides in length. In some embodiments, the barcode sequence may be no more than 120, no more than 112, no more than 104, no more than 96, no more than 88, no more than 80, no more than 72, no more than 64, no more than 56, no more than 48, no more than 40, no more than 32, no more than 24, no more than 16, or no more than 8 nucleotides in length. Combinations of any of these are also possible, e.g., the barcode sequence may be between 5 and 10 nucleotides, between 8 and 15 nucleotides, etc.

The barcode sequence(s) in the split barcode region disclosed herein may be arbitrary or random. In certain cases, the barcode sequences are chosen so as to reduce or minimize homology with other components in a sample, e.g., such that the barcode sequences do not themselves bind to or hybridize with other nucleic acids suspected of being within the cell or other sample. In some embodiments, between a particular barcode sequence and another sequence (e.g., a cellular nucleic acid sequence in a sample or other barcode sequences in probes added to the sample), the homology may be less than 10%, less than 8%, less than 7%, less than 6%, less than 5%, less than 4%, less than 3%, less than 2%, or less than 1%. In some embodiments, the homology may be less than 20, 19, 18, 17, 16, 15, 14, 13, 12, 11, 10, 9, 8, 7, 6, 5, 4, 3, or 2 bases, and in some embodiments, the bases are consecutive bases.

In some embodiments, the number of distinct barcode sequences in a population of first/second probe pairs disclosed herein is less than the number of distinct targets (e.g., nucleic acid analytes and/or protein analytes) of the nucleic acid probes, and yet the distinct targets may still be uniquely identified from one another, e.g., by encoding a probe with a different combination of barcode sequences. However, not all possible combinations of a given set of barcode sequences need be used. For instance, each probe may contain 1, 2, 3, 4, 5, 6, 7, 8, 9, 10, 11, 12, 13, 14, 15, etc. or more barcode sequences. In some embodiments, a population of nucleic acid probes may each contain the same number of barcode sequences, although in other cases, there may be different numbers of barcode sequences present on the various probes.

In some embodiments, a primary probe set comprises a first and second probe which together comprises a barcode region split among the two probes. In some cases, the first probe comprises a first portion of a barcode region and the second probe comprises a second portion of the barcode region. In some aspects, when the first and second probe hybridizes to the target nucleic acid and are connected or joined to form the composite probe, the split barcode region of the probe pair forms a complete barcode region. In some embodiments, a first probe may contain a first hybridization region and a first barcode sequence, and a second, different probe may contain a second hybridization region (that is different from the first hybridization region in the first probe), and a second barcode sequence. In some cases, the first and second portions of a barcode region may each comprises one or more barcode sequences as described herein. In some cases, the first and second portions of a barcode region joined together forms a barcode sequence as described herein.

In some embodiments, the first and second portions of the barcode region of the first and second probe, respectively, may comprise the same or different barcode sequences. As an illustrative example, a first probe may contain a first hybridization region, a first barcode sequence, and a second barcode sequence, while a second, different probe may contain a second hybridization region (that is different from the first hybridization region in the first probe), the same first barcode sequence as in the first probe, but a third barcode sequence instead of the second barcode sequence. Such probes may thereby be distinguished by determining the various barcode sequence combinations present or associated with a given probe at a given location in a sample.

In some embodiments, the nucleic acid probes disclosed herein may be made using only 2 or only 3 of the 4 bases, such as leaving out all the "G"s and/or leaving out all of the "C"s within the probe. Sequences lacking either "G"s or "C"s may form very little secondary structure, and can contribute to more uniform, faster hybridization in certain embodiments.

In some embodiments, a nucleic acid probe disclosed herein may contain a detectable label such as a fluorophore. In some embodiments, one or more probes of a plurality of nucleic acid probes used in an assay may lack a detectable label, while one or more other probes in the plurality each comprises a detectable label selected from a limited pool of distinct detectable labels (e.g., red, green, yellow, and blue fluorophores), and the absence of detectable label may be used as a separate "color." As such, detectable labels are not required in all cases. In some embodiments, a primary nucleic acid probe or probe set (e.g., a first and second probe) disclosed herein lacks a detectable label. While a detectable label may be incorporated into an amplification product of the primary nucleic acid probe or probe set (e.g., a first and second probe), such as via incorporation of a modified nucleotide into an RCA product of a circularizable or circularized probe, the amplification product in some embodiments is not detectably labeled. In some embodiments, a probe that binds to the composite probe formed from the first and second probes or a product thereof (e.g., a secondary nucleic acid probe that binds to a sequence of the barcode region or complement thereof or product thereof) comprises a detectable label and may be used to detect the composite probe formed from the first and second probes or product thereof. In some embodiments, a secondary nucleic acid probe disclosed herein lacks a detectable label, and a detectably labeled probe that binds to the secondary nucleic acid probe or a product thereof (e.g., at a barcode sequence or complement thereof in the secondary nucleic acid probe or product thereof) can be used to detect the second nucleic acid probe or product thereof. In some embodiments, signals associated with the detectably labeled probes can be used to detect one or more barcode sequences in the secondary probe and/or one or more barcode sequences in the composite probe formed from the first and second probes, e.g., by using sequential hybridization of detectably labeled probes, sequencing-by-ligation, and/or sequencing-by-hybridization. In some embodiments, the barcode sequences (e.g., in the composite probe formed from the first and second probes) are used to combinatorially encode a plurality of analytes of interest. As such, signals associated with the detectably labeled probes at particular locations in a biological sample can be used to generate distinct signal signatures that each corresponds to an analyte in the sample, thereby identifying the analytes at the particular locations, e.g., for in situ spatial analysis of the sample.

In some embodiments, a nucleic acid probe herein comprises one or more other components, such as one or more primer binding sequences (e.g., to allow for enzymatic amplification of probes), enzyme recognition sequences (e.g., for endonuclease cleavage), or the like. The components of the nucleic acid probe may be arranged in any suitable order.

In some aspects, analytes are targeted by a primary probe set (e.g., a first and second probe), which is barcoded through the incorporation of a barcode region comprising one or more barcode sequences (e.g., sequences that can be detected or otherwise "read") that are separate from a sequence (e.g., hybridization region) in a primary probe that directly or indirectly binds the targeted analyte. In some aspects, the primary probes are in turn targeted by secondary probes, which are also barcoded through the incorporation of one or more barcode sequences that are separate from a recognition sequence in a secondary probe that directly or indirectly binds a primary probe or a product thereof. In some embodiments, a secondary probe may bind to a barcode sequence in the composite probe formed from the first and second probes. In some embodiments, a secondary probe may bind to a complement of the barcode sequence in an RCA product generated using the composite probe formed from the first and second probes as a template. In some aspects, tertiary probes and optionally even higher order probes may be used to target the secondary probes, e.g., at a barcode sequence or complement thereof in a secondary probe or product thereof. In some embodiments, the tertiary probes and/or even higher order probes may comprise one or more barcode sequences and/or one or more detectable labels. In some embodiments, a tertiary probe is a detectably labeled probe that hybridizes to a barcode sequence (or complement thereof) of a secondary probe (or product thereof). In some embodiments, through the detection of signals associated with detectably labeled probes in a sample, the location of one or more analytes in the sample and the identity of the analyte(s) can be determined. In some embodiments, the presence/absence, absolute or relative abundance, an amount, a level, a concentration, an activity, and/or a relation with another analyte of a particular analyte can be analyzed in situ in the sample.

In some embodiments, provided herein are probes, probe sets, and assay methods to couple target nucleic acid detection, signal amplification (e.g., through nucleic acid amplification such as RCA, and/or hybridization of a plurality of detectably labeled probes, such as in hybridization chain reactions and the like), and decoding of the barcodes.

In some aspects, a primary probe set, a secondary probe, and/or a higher order probe can be selected from the group consisting of a circular probe, a circularizable probe, and a linear probe. In some embodiments, a circular probe can be one that is pre-circularized prior to hybridization to a target nucleic acid and/or one or more other probes. In some embodiments, a circularizable probe can be one that can be circularized upon hybridization to a target nucleic acid and/or one or more other probes such as a splint. In some embodiments, a linear probe can be one that comprises a target recognition sequence and a sequence that does not hybridize to a target nucleic acid, such as a 5' overhang, a 3' overhang, and/or a linker or spacer (which may comprise a nucleic acid sequence or a non-nucleic acid moiety). In some embodiments, the sequence (e.g., the 5' overhang, 3' overhang, and/or linker or spacer) is non-hybridizing to the target nucleic acid but may hybridize to one another and/or one or more other probes, such as detectably labeled probes.

Specific probe designs can vary depending on the application. For instance, a primary probe set, a secondary probe, and/or a higher order probe disclosed herein can require gap filling to circularize upon hybridization to a template (e.g., a target nucleic acid and/or a probe such as a splint). In some embodiments, a primary probe set, a secondary probe, and/or a higher order probe disclosed herein can be a gapped probe (e.g., one that require gap filling to circularize upon hybridization to a template), an L-shaped probe (e.g., one that comprises a target recognition sequence and a 5' or 3' overhang upon hybridization to a target nucleic acid or a probe), a U-shaped probe (e.g., one that comprises a target recognition sequence, a 5' overhang, and a 3' overhang upon hybridization to a target nucleic acid or a probe), a V-shaped probe (e.g., one that comprises at least two target recognition sequences and a linker or spacer between the target recognition sequences upon hybridization to a target nucleic acid or a probe), a probe or probe set for proximity ligation (such as those described in U.S. Pat. Nos. 7,914,987 and 8,580,504 incorporated herein by reference in their entireties, and probes for Proximity Ligation Assay (PLA) for the simultaneous detection and quantification of nucleic acid molecules and protein-protein interactions), or any suitable combination thereof. In some embodiments, a primary probe set, a secondary probe, and/or a higher order probe disclosed herein can comprise a probe that is ligated to itself or another probe using DNA-templated and/or RNA-templated ligation. In some embodiments, the first and second probes of the primary probe set can be ligated using DNA-templated and/or RNA-templated ligation. In some embodiments, a primary probe, a secondary probe, and/or a higher order probe disclosed herein can be a DNA molecule and can comprise one or more other types of nucleotides, modified nucleotides, and/or nucleotide analogues, such as one or more ribonucleotides. In some embodiments, the first and/or second probes of the primary probe set are DNA molecules. In some embodiments, the first and/or second probes of the primary probe set comprise ribonucleotides. In some embodiments, the ligation can be a DNA ligation on a DNA template. In some embodiments, the ligation can be a DNA ligation on an RNA template, and the probes can comprise RNA-templated ligation probes. In some embodiments, the first and/or second probes of the primary probe set are RNA molecules or comprise one or more ribonucleotides. In some embodiments, a primary probe, a secondary probe, and/or a higher order probe disclosed herein can comprise a circularizable probe (e.g., a padlock-like probe) or probe set. Any suitable combination of the probe designs described herein can be used.

In some embodiments, the probe set (e.g., first and second probe) descried herein may be a circularizable probe or probe set, or indeed more generally circularizable reporter molecules, may be used to generate a RCA template which is used to generate the RCA product. In some embodiments, the probe or reporter is in the form of a linear molecule having ligatable ends which may be circularized by ligating the ends together directly or indirectly to each other, or to the respective ends of an intervening ("gap") oligonucleotide or to an extended 3' end of the circularizable RCA template. A circularizable template may also be provided in two or more parts, namely two or more molecules (e.g., oligonucleotides) which may be ligated together to form a circle. When said RCA template is circularizable it is circularized by ligation prior to RCA. Ligation may be templated using a ligation template. In some cases, the target analyte may provide the ligation template, or it may be separately provided. The circularizable RCA template (e.g., composite probe) will comprise at its respective 3' and 5' ends regions of complementarity to corresponding cognate complementary regions (or binding sites) in the ligation template, which may be adjacent where the ends are directly ligated to each other, or non-adjacent, with an intervening "gap" sequence, where indirect ligation is to take place.

In some embodiments, the ends of the first and second probes may be brought into proximity to each other by hybridization to adjacent sequences on a target nucleic acid molecule (such as a target analyte), which acts as a ligation template, thus allowing the ends to be ligated together to form a circular nucleic acid molecule, allowing the circularized probe (e.g., composite probe) to act as a template for an RCA reaction. In such an example the terminal sequences of the first and second probes which hybridize to the target nucleic acid molecule will be specific to the target analyte in question, and will be replicated repeatedly in the RCA product. They may therefore act as a marker sequence indicative of that target analyte. Accordingly, it can be seen that the marker sequence in the RCA product may be equivalent to a sequence present in the target analyte itself. Alternatively, a marker sequence (e.g. tag or barcode sequence) may be provided in the non-target complementary parts of the first and second probes. In still a further embodiment, the marker sequence may be present in the gap oligonucleotide which is hybridized between the respective hybridized ends of the first and second probes, where they are hybridized to non-adjacent sequences in the target molecule. Such gap-filling probes are akin to molecular inversion probes.

In some aspects, the first and the second probes can be linear nucleic acid molecules capable of hybridizing to a target nucleic acid molecule (such as a target analyte) and being circularized. In some cases, the hybridization regions of first and the second probes may hybridize to the target nucleic acid molecule at sites which are proximate but not directly adjacent to each other, resulting in a gap between the two ends. Accordingly, it may be necessary to supply a polymerase and a source of nucleotides, or an additional gap-filling oligonucleotide, in order to fill the gap between the two ends of the first and second probes between the first and second hybridization regions, such that it can be connected.

In some embodiments, the probes disclosed herein may comprise one or more regions that are capable of invading and displacing one or more other regions of the probes. Such probes are of particular utility in the detection of single nucleotide polymorphisms. The detection method of the present disclosure may, therefore, be used in the detection of a single nucleotide polymorphism, or indeed any variant base, in the target nucleic acid sequence. Probes for use in such a method may be designed such that the 3' ligatable end of the first probe is complementary to and capable of hybridizing to the nucleotide in the target molecule which is of interest (the variant nucleotide), and the nucleotide at the 3' end of a 5' additional sequence (5' flap) at the 5' end of the second probe is complementary to the same said nucleotide, but is prevented from hybridizing thereto by a 3' ligatable end (e.g., it is a displaced nucleotide). Cleavage of the second probe to remove the additional sequence provides a 5' ligatable end, which may be ligated to the 3' ligatable end of the first probe if the 3' ligatable end is hybridized correctly to (e.g., is complementary to) the target nucleic acid molecule. Probes designed according to this principle (e.g., as described in Krzywkowski et al., *Nucleic Acids Research* 45, e161, 2017 and US 2020/0224244, which are incorporated herein by reference) provide a high degree of discrimination between different variants at the position of interest, as only probes in which the 3' ligatable end is complementary to the nucleotide at the position of interest may participate in a ligation reaction.

In some embodiments, a nucleic acid probe disclosed herein can be pre-assembled from multiple components, e.g., prior to contacting the nucleic acid probe with a target nucleic acid or a sample. In some embodiments, a nucleic acid probe disclosed herein can be assembled during and/or after contacting a target nucleic acid or a sample with multiple components. In some embodiments, a nucleic acid probe disclosed herein is assembled in situ in a sample. In some embodiments, the multiple components can be contacted with a target nucleic acid or a sample in any suitable order and any suitable combination. For instance, a first probe and a second probe can be contacted with a target nucleic acid, to allow binding between the first and/or second probes with the target nucleic acid. Optionally a reaction involving the first and second probe and/or the target nucleic acid, between the probes, and/or between either one or both probes and the target nucleic acid can be performed, such as hybridization, ligation, primer extension and/or amplification, chemical or enzymatic cleavage, click chemistry, or any combination thereof. In some embodiments, any additional components can be added prior to, during, or after the reaction. In some embodiments, the nucleic acid probes can be assembled in situ in a stepwise manner, each step with the addition of one or more components, or in a dynamic process where all components are assembled together. One or more removing steps, e.g., by washing the sample such as under stringent conditions, may be performed at any point during the assembling process to remove or destabilize undesired intermediates and/or components at that point and increase the chance of accurate probe assembly and specific target binding of the assembled probe (e.g., composite probe formed from the first and second probes).

IV. Probe Ligation and Signal Amplification

In any of the embodiments disclosed herein, a probe may comprise a split analyte-specific region such as a split barcode region and/or a gene-specific adapter. For instance, a barcode region may be provided in two or more probes that can be assembled (e.g., via ligation) into a particular probe or probe set comprising the barcode sequences in the barcode region. Detectable probes for detecting the barcode sequence(s) can be designed such that only the correctly assembled probe is detected, while incorrect probes containing incomplete or chimeric barcode sequences or regions are not detected.

For instance, in sequencing by hybridization (SBH) assays, probing RNA with padlock or other circularizable ligation probes is still challenging. This is because currently available ligases are either not very efficient on RNA (e.g. more efficient on DNA) or very unspecific (e.g. produces a lot of template independent ligation products). For example, SplintR® ligase can be very efficient in ligating DNA ends templated by RNA but also has a very high template independent ligation efficiency and does not discriminate sequences while it ligates. When two or more separate probes pairs are used, this can lead to false probe pairs (also called chimeras). For in situ experiments, these false probe pairs cannot be washed away because the circularized probes are locked around the RNA and topologically linked. In these methods, every circularized probe can produce a signal that can be decoded, and it is not possible to distinguish a true positive event from a false positive event.

In some embodiments, provided herein are improved methods and compositions for reducing the detection of false positive events, such as ligation events in SBH. In some aspects, the method disclosed herein can be used for proximity assays for nucleic acid analytes and/or non-nucleic acid analytes (e.g. protein). In some embodiments, one analyte can be associated with a first probe or probe set with a first portion of the barcode (e.g., a SBH barcode), the other analyte can be associated with a second probe or probe set with a second portion of the barcode (e.g., a SBH barcode). In some embodiments, a detectable signal will be generated only when the analytes (e.g., protein) are in true proximities. In some embodiments, the method disclosed herein can be used for non-RCA based assays. In some embodiments, the method disclosed herein can be used for HCR application. In some embodiments, the method disclosed herein can be used for multiplexed FISH applications.

In some aspects, the provided methods involve analyzing, e.g., detecting or determining, one or more sequences present in the composite probes (e.g., connected first and second probes) and/or in a product or derivative thereof. In some cases, the analysis is performed on one or more images captured, and may comprise processing the image(s) and/or quantifying signals observed. For example, the analysis may comprise processing information of one or more cell types, one or more types of biomarkers, a number or level of a biomarker, and/or a number or level of cells detected in a particular region of the sample. In some embodiments, the analysis comprises detecting a sequence e.g., a barcode present in the sample. In some embodiments, the analysis includes quantification of puncta (e.g., if amplification products are detected). In some cases, the analysis includes determining whether particular cells and/or signals are present that correlate with one or more biomarkers from a particular panel. In some embodiments, the obtained information may be compared to a positive and negative control, or to a threshold of a feature to determine if the sample exhibits a certain feature or phenotype. In some cases, the information may comprise signals from a cell, a region, and/or comprise readouts from multiple detectable labels. In some case, the analysis further includes displaying the information from the analysis or detection step. In some embodiments, software may be used to automate the processing, analysis, and/or display of data.

In some embodiments, a method disclosed herein may also comprise one or more signal amplification components. In some embodiments, the present disclosure relates to the detection of nucleic acids sequences in situ using probe hybridization and generation of amplified signals associated with the probes, wherein background signal is reduced and sensitivity is increased.

A. Probe Ligation

In some embodiments, the probe or at least one probe in the probe set comprises a split barcode region disclosed herein, as well as a split hybridization region that hybridizes to a target nucleic acid. In some embodiments, in addition to forming a correctly ligated hybridization region, the split barcode region must correctly pair with another split barcode region (e.g., in another probe) in order to form a barcode region that is detectable, whereas incorrect or mismatched probe pairs ("chimeras") are undetectable. Detectable probes can be designed such that they only detect correctly formed barcode regions and not chimeric barcode regions. In some embodiments, sequences from a first probe and a second probe together forms a barcode region that is detectable, e.g., using a method disclosed herein in Section V.

FIG. 1 shows upon hybridization to the target nucleic acid molecule, the first and second probes can be ligated via the first and second portions to form the composite probe, in which the first and second hybridization regions can be ligated to circularize the composite probe. Ligation of the first and second portions of the barcode region and ligation of the first and second hybridization regions can be catalyzed by the same ligase or by different ligases, and can occur simultaneously (e.g., in the same reaction volume) or in any suitable order.

In some embodiments, upon hybridization to the target nucleic acid molecule, the first and second probes can be connected (e.g., through ligation) via the first and second portions of the barcode region to form the composite probe. The composite probe can be detected using a detectable probe that hybridizes to a sequence of the barcode region, which may comprise one or more barcode sequences, such as barcode sequences corresponding to the target nucleic acid molecule or a sequence thereof. In some embodiments, the detectable probe can hybridize to the barcode region at both a sequence corresponding to the first portion of the barcode region and a sequence corresponding to the second portion of the barcode region. In some embodiments, the detectable probe can hybridize to a sequence complementary to the first portion of the barcode region and a sequence complementary to the second portion of the barcode region. A rolling circle amplification (RCA) product can be generated from the composite probe or a probe that hybridizes to the composite probe. The RCA product can be detected using a detectable probe that hybridizes to a sequence of the complement of the barcode region in the RCA product. Signals associated with the detectable probe can be analyzed to detect the target nucleic acid molecule or a sequence thereof in the sample.

In some embodiments, the ends of the first hybridization region and the second hybridization region can be ligated using enzymatic ligation or chemical ligation, with or without gap filling prior to ligation. In some embodiments, the ends of the first hybridization region and the second hybridization region can be ligated using template-dependent ligation or template-independent ligation, with or without gap filling prior to ligation. In some embodiments, the ends of the first hybridization region and the second hybridization region can be ligated using click chemistry. In some embodiments, the ends of the first hybridization region and the second hybridization region can be ligated using a ligase having a DNA-templated ligase activity, e.g., when the target nucleic acid molecule comprises DNA such as a reporter oligonucleotide of a labelling agent (e.g., as shown in FIGS. 2A-2E). In some embodiments, the ends of the first hybridization region and the second hybridization region can be ligated using a ligase having an RNA-templated ligase activity, e.g., when the target nucleic acid molecule comprises RNA such as when the target nucleic acid molecule is an mRNA. In some embodiments, the ends of the first hybridization region and the second hybridization region comprise a terminal DNA base and/or a terminal RNA base. For instance, the first hybridization region can comprise a 5' DNA base while the second hybridization region comprises a 3' RNA base, or the first hybridization region can comprise a 3' RNA base while the second hybridization region comprises a 5' DNA base. In some embodiments, the ends of the first hybridization region and the second hybridization region can be ligated using a ligase having an RNA-templated DNA ligase activity and/or an RNA-templated RNA ligase activity. In some embodiments, the ends of the first hybridization region and the second hybridization region can be ligated using a ligase selected from the group consisting of a *Chlorella* virus DNA ligase (PBCV DNA ligase), a T4 RNA ligase, a T4 DNA ligase, and a single-stranded DNA (ssDNA) ligase. In some embodiments, the ends of the first hybridization region and the second hybridization region can be ligated using a PBCV-1 DNA ligase or variant or derivative thereof, a T4 RNA ligase 2 (T4 Rnl2) or variant or derivative thereof, or a CircLigase™ or variant or derivative thereof, optionally wherein the CircLigase™ is CircLigase™ I or CircLigase™ II. In some embodiments, the first and second portions of the barcode region can be ligated using the same ligase that is used to ligate the first and second hybridization regions. Alternatively, in some embodiments, the first and second portions of the barcode region can be ligated using a ligase that is different from the ligase used to ligate the first and second hybridization regions.

In some embodiments, the ends of the first and second portions of the barcode region can be ligated using template-dependent ligation or template-independent ligation, with or without gap filling prior to ligation. In some embodiments, the ends of the first and second portions of the barcode region can be ligated using click chemistry. In some embodiments, the ends of the first and second portions of the barcode region can be ligated using a ligase selected from the group consisting of a *Chlorella* virus DNA ligase (PBCV DNA ligase), a T4 DNA ligase, and a single-stranded DNA (ssDNA) ligase, optionally wherein the ssDNA ligase is a CircLigase™ or variant or derivative thereof, optionally wherein the CircLigase™ is CircLigase™ I or CircLigase™ II. In some embodiments, the ends of the first and second portions of the barcode region can be ligated using a splint that hybridizes to (i) the first portion or a subportion thereof (e.g., a sequence thereof) and (ii) the second portion or a subportion thereof (e.g., a sequence thereof), optionally wherein the splint is a DNA molecule. In some embodiments, the splint is a single-stranded DNA molecule.

In some embodiments, the ligation involves chemical ligation. In some embodiments, the ligation involves template dependent ligation. In some embodiments, the ligation involves template independent ligation. In some embodiments, the ligation involves enzymatic ligation.

In some embodiments, the enzymatic ligation involves use of a ligase. In some aspects, the ligase used herein comprises an enzyme that is commonly used to join polynucleotides together or to join the ends of a single polynucleotide. An RNA ligase, a DNA ligase, or another variety of ligase can be used to ligate two nucleotide sequences together. Ligases comprise ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases comprise bacterial ligases such as E. coli DNA ligase, Tth DNA ligase, Thermococcus sp. (strain 9° N) DNA ligase (9° N™ DNA ligase, New England Biolabs®), Taq DNA ligase, Ampligase™ (Epicentre Biotechnologies®) and phage ligases such as T3 DNA ligase, T4 DNA ligase and T7 DNA ligase and mutants thereof. In some embodiments, the ligase is a T4 RNA ligase. In some embodiments, the ligase is a splintR® ligase. In some embodiments, the ligase is a single stranded DNA ligase. In some embodiments, the ligase is a T4 DNA ligase. In some embodiments, the ligase is a ligase that has an DNA-splinted DNA ligase activity. In some embodiments, the ligase is a ligase that has an RNA-splinted DNA ligase activity.

In some embodiments, the ligation herein is a direct ligation. In some embodiments, the ligation herein is an indirect ligation. "Direct ligation" means that the ends of the polynucleotides hybridize immediately adjacently to one another to form a substrate for a ligase enzyme resulting in their ligation to each other (intramolecular ligation). Alternatively, "indirect" means that the ends of the polynucleotides hybridize non-adjacently to one another, e.g., separated by one or more intervening nucleotides or "gaps". In some embodiments, said ends are not ligated directly to each other, but instead occurs either via the intermediacy of one or more intervening (so-called "gap" or "gap-filling" (oligo) nucleotides) or by the extension of the 3' end of a probe to "fill" the "gap" corresponding to said intervening nucleotides (intermolecular ligation). In some cases, the gap of one or more nucleotides between the hybridized ends of the polynucleotides may be "filled" by one or more "gap" (oligo)nucleotide(s) which are complementary to a splint or target nucleic acid. The gap may be a gap of 1 to 60 nucleotides or a gap of 1 to 40 nucleotides or a gap of 3 to 40 nucleotides. In specific embodiments, the gap may be a gap of about 1, 2, 3, 4, 5, 6, 7, 8, 9 or 10 or more nucleotides, of any integer (or range of integers) of nucleotides in between the indicated values. In some embodiments, the gap between said terminal regions may be filled by a gap oligonucleotide or by extending the 3' end of a polynucleotide. In some cases, ligation involves ligating the ends of the probe to at least one gap (oligo)nucleotide, such that the gap (oligo)nucleotide becomes incorporated into the resulting polynucleotide. In some embodiments, the ligation herein is preceded by gap filling. In other embodiments, the ligation herein does not require gap filling.

In some embodiments, ligation of the polynucleotides produces polynucleotides with melting temperature higher than that of unligated polynucleotides. Thus, in some aspects, ligation stabilizes the hybridization complex containing the ligated polynucleotides prior to subsequent steps, comprising amplification and detection.

In some aspects, a high fidelity ligase, such as a thermostable DNA ligase (e.g., a Taq DNA ligase), is used. Thermostable DNA ligases are active at elevated temperatures, allowing further discrimination by incubating the ligation at a temperature near the melting temperature ($T_m$) of the DNA strands. This selectively reduces the concentration of annealed mismatched substrates (expected to have a slightly lower $T_m$ around the mismatch) over annealed fully base-paired substrates. Thus, high-fidelity ligation can be achieved through a combination of the intrinsic selectivity of the ligase active site and balanced conditions to reduce the incidence of annealed mismatched dsDNA.

In some embodiments, the ligation herein is a proximity ligation of ligating two (or more) nucleic acid sequences that are in proximity with each other, e.g., through enzymatic means (e.g., a ligase). In some embodiments, proximity ligation can include a "gap-filling" step that involves incorporation of one or more nucleic acids by a polymerase, based on the nucleic acid sequence of a template nucleic acid molecule, spanning a distance between the two nucleic acid molecules of interest (see, e.g., U.S. Pat. No. 7,264,929, the entire contents of which are incorporated herein by reference). A wide variety of different methods can be used for proximity ligating nucleic acid molecules, including (but not limited to) "sticky-end" and "blunt-end" ligations. Additionally, single-stranded ligation can be used to perform proximity ligation on a single-stranded nucleic acid molecule. Sticky-end proximity ligations involve the hybridization of complementary single-stranded sequences between the two nucleic acid molecules to be joined, prior to the ligation event itself. Blunt-end proximity ligations generally do not include hybridization of complementary regions from each nucleic acid molecule because both nucleic acid molecules lack a single-stranded overhang at the site of ligation.

Figure 2E:
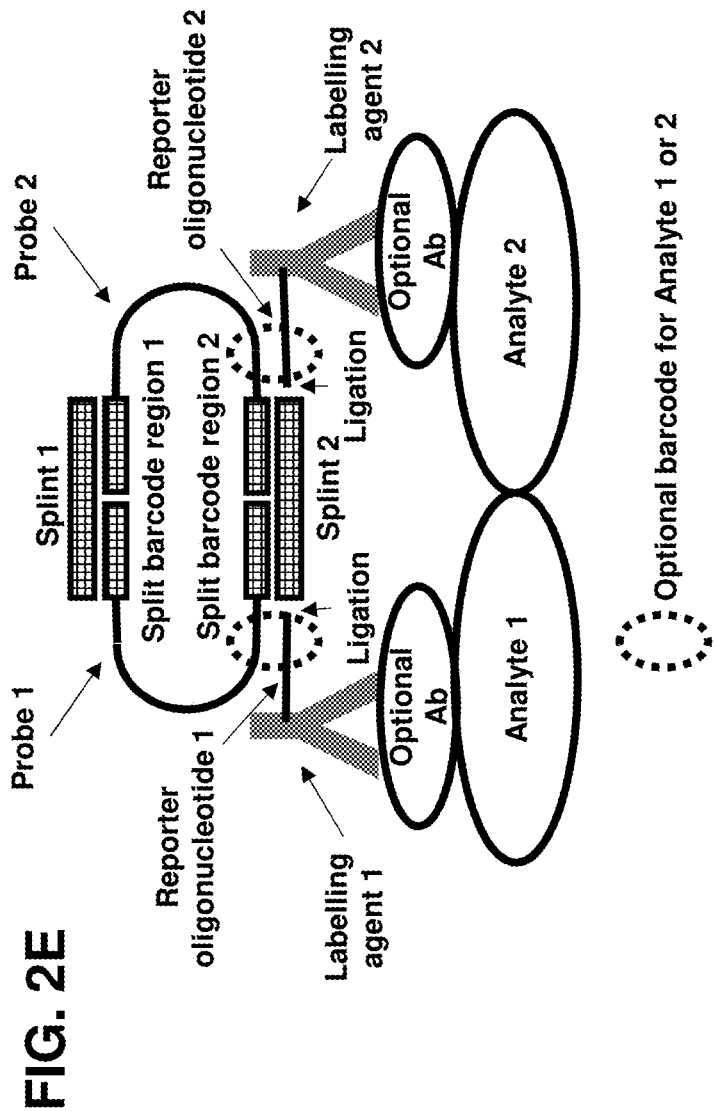

FIGS. 2A-2F show using one or more labelling agents each comprising a binder (e.g., an antibody or antigen binding portion thereof) and a reporter oligonucleotide for detecting analytes in situ. In some embodiments, the labelling agent comprises a binder (e.g., an antibody or antigen binding portion thereof) and a reporter oligonucleotide. The binder can directly or indirectly bind to an analyte, such as through one or more secondary antibodies ("Optional Ab") that bind to a primary antibody. Probes comprising split barcode regions can hybridize to the reporter oligonucleotide and be ligated to form a composite probe (e.g., a circularized probe). The composite probe or a product thereof (e.g., an RCA product) can be detected as shown in FIG. 1. In some embodiments, the reporter oligonucleotide comprises a sequence corresponding to the labelling agent and therefore corresponds to (e.g., uniquely identifies) an analyte (e.g., a protein analyte) or cell feature that the labelling agent labels. In some embodiments, the labelling agent can comprise a reporter oligonucleotide comprising one or more barcode sequences. Thus, the reporter oligonucleotide can be a nucleic acid analyte disclosed herein, and can be analyzed using any methods disclosed herein. For example, as shown in FIG. 2A, a pair of split probes may be used to analyze a reporter oligonucleotide of a labelling agent which directly or indirectly binds to an analyte, e.g., a protein analyte. The split probes can be ligated (e.g., circularized) using the reporter oligonucleotide as a template for the ligation of hybridizing regions and/or using a splint (not shown) as a template for the ligation of barcodes in the split barcode region.

Figure 2F:
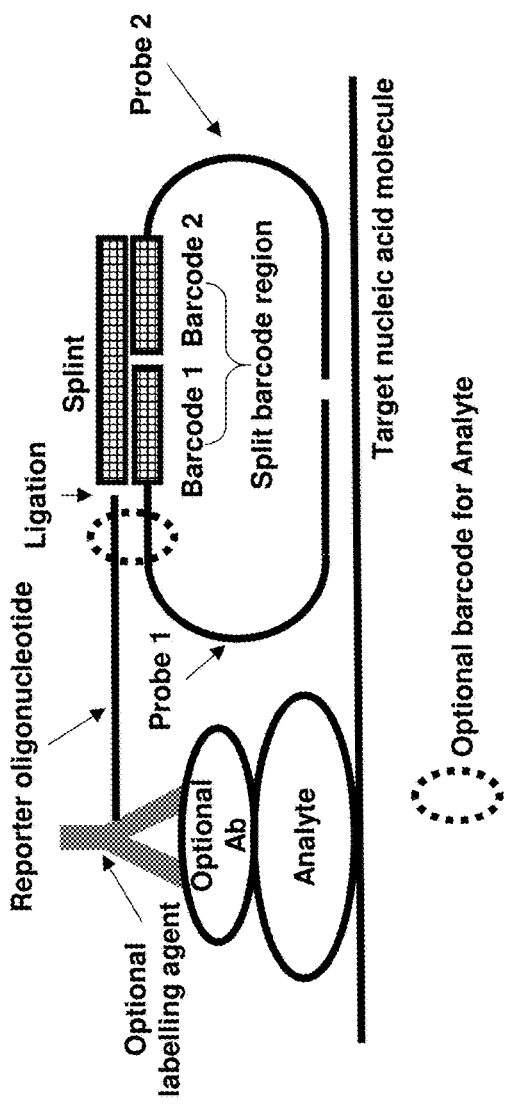
Figure 2G:
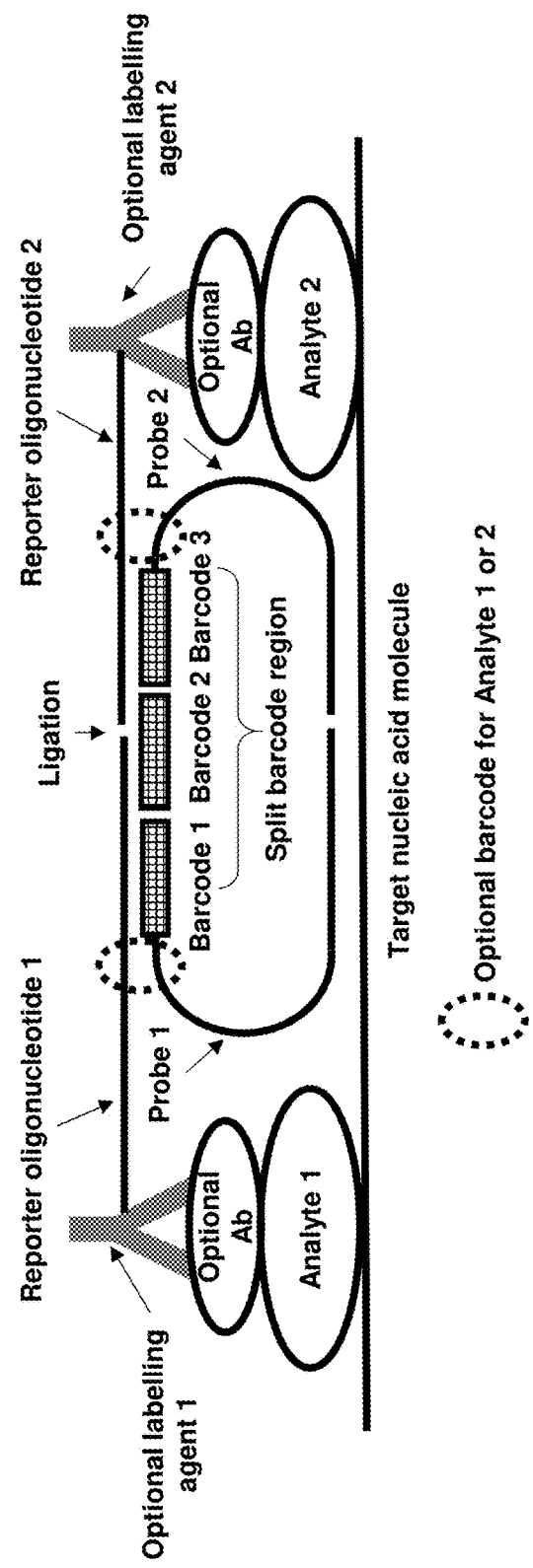

In some embodiments, an analyte (a nucleic acid analyte or non-nucleic acid analyte) can be specifically bound by two labelling agents (e.g., antibodies) each of which is attached to a reporter oligonucleotide (e.g., DNA) that can participate in proximity ligation, e.g., using a split probe pair shown in FIG. 2B or FIG. 2E, or a split probe pair and a connector shown in FIG. 2C or FIG. 2D. Interactions among molecules (e.g., between a protein and a nucleic acid, or among three or more proteins and/or nucleic acids) may also be detected using probes disclosed herein, for instance, as shown in FIGS. 2F-2G. For example, a proximity ligation reaction can include reporter oligonucleotides attached to pairs of antibodies that can be joined by ligation if the antibodies have been brought in proximity to each other, e.g., by binding the same target protein (complex), and the DNA ligation products that form are then used to template PCR amplification, as described for example in Soderberg et al., *Methods*. (2008), 45(3): 227-32, the entire contents of which are incorporated herein by reference. In some embodiments, a proximity ligation reaction can include reporter oligonucleotides attached to antibodies that each bind to one member of a binding pair or complex, for example, for analyzing a binding between members of the binding pair or complex. For detection of analytes using oligonucleotides in proximity, see, e.g., U.S. Patent Application Publication No. 2002/0051986, the entire contents of which are incorporated herein by reference. In some embodiments, two analytes in proximity can be specifically bound by two labelling agents (e.g., antibodies) each of which is attached to a reporter oligonucleotide (e.g., DNA) that can participate, when in proximity when bound to their respective targets, in ligation, replication, and/or sequence decoding reactions.

In FIG. 2B, the split barcode region can be ligated using a splint (not shown), and a duplex between the first hybridization region and the first reporter oligonucleotide (Reporter oligonucleotide 1) and a duplex between the second hybridization region and the second reporter oligonucleotide (Reporter oligonucleotide 2) can be ligated using blunt end ligation or sticky end ligation. Splinted ligation of the split barcode region and ligation of the blunt ends or sticky ends can be catalyzed by the same ligase or by different ligases. For instance, a T4 DNA ligase can be used to catalyze both the splinted ligation and the blunt end or sticky end ligation. Once the split probe pair is circularized, the splint can be used as a primer for RCA. Alternatively, a separate primer (e.g., one that hybridizes to a non-analyte specific region of the circularized probe) can be used to prime RCA. FIG. 2E shows a split probe pair comprising two split barcode regions (Split barcode region 1 and Split barcode region 2) can be used to detect interaction between analytes (Analyte 1 and Analyte 2). The split barcode regions can be ligated using Splint 1 and Splint 2, respectively. Split barcode region 1 and Split barcode region 2 can be the same or different. According, Splint 1 and Splint 2 can also be the same or different. The duplex between Reporter oligonucleotide 1 and Probe 1 and/or the duplex between Reporter oligonucleotide 2 and Probe 2 may comprise a barcode sequence corresponding to Analyte 1 or 2 (or a specific binder to Analyte 1 or 2), respectively. Reporter oligonucleotide 1 and Reporter oligonucleotide 2 can be ligated to Splint 2 using Probe 1 and Probe 2, respectively, as a template. Any two or more of the four splinted ligations (two in the barcode regions and two between the reporter oligonucleotides and Splint 2) can be catalyzed by the same ligase or by different ligases, e.g., a T4 DNA ligase. In FIG. 2C and FIG. 2D, a connector can be used to template ligation between the reporter oligonucleotides (FIG. 2C) or to connect two ligations templated on the reporter oligonucleotides (FIG. 2D). The splint for split barcode ligation is not shown, and any two or more of the splinted ligations in FIG. 2C and FIG. 2D can be catalyzed by the same ligase or by different ligases, e.g., a T4 DNA ligase.

In some embodiments, interactions between one or more non-nucleic acid analytes (e.g., proteins) and one or more nucleic acid molecules (e.g., DNA or RNA) can be analyzed using split probe pairs disclosed herein. FIG. 2F shows an example of detecting an interaction between an analyte and a target nucleic acid molecule. The reporter oligonucleotide can be directly or indirectly linked to the analyte. For instance, the analyte can be a protein covalently conjugated to the reporter oligonucleotide. Alternatively, the reporter oligonucleotide can be covalently conjugated to a binder (e.g., an antibody) which directly or indirectly binds to the protein. The reporter oligonucleotide may hybridize to Probe 1, e.g., at an optional barcode corresponding to the analyte (e.g., protein) or a specific binder thereof. The split barcode region may comprise Barcode 1 and Barcode 2 as shown in the figure. Barcode 1 in Probe 1 and/or the optional barcode for the analyte (e.g., protein) can correspond to the analyte or a specific binder thereof, whereas Barcode 2 in Probe 2 can correspond to the target nucleic acid molecule. A hybridization complex comprising the split probe pair, the splint, and the reporter oligonucleotide forms when the analyte (e.g., protein) and the target nucleic acid molecule directly or indirectly interact and/or are in proximity with each other. Washes can be performed to remove nonspecifically hybridized molecules. Any two or all of the ligations in FIG. 2F can be catalyzed by the same ligase or by different ligases, e.g., a T4 DNA ligase. Once the split probes are circularized, the splint or a separate primer can be used to prime RCA using the circularized probe as a template. Detection of signals associated with the RCA product in situ can be used to analyze an interaction between the analyte and the target nucleic acid based on proximity. FIG. 2G shows an example of detecting interactions among Analyte 1 (e.g., Protein 1), Analyte 2 (e.g., Protein 2), and a target nucleic acid molecule (e.g., DNA or RNA). Reporter oligonucleotide 1 may hybridize to Probe 1, e.g., at an optional barcode corresponding to the Analyte 1 (e.g., Protein 1) or a specific binder thereof. Likewise, Reporter oligonucleotide 2 may hybridize to Probe 2, e.g., at an optional barcode corresponding to the Analyte 2 (e.g., Protein 2) or a specific binder thereof. The split barcode region may comprise Barcode 1, Barcode 2, and Barcode 3 as shown in the figure or more than three barcodes (not shown). Any one of the barcodes can be used to template ligation of the reporter oligonucleotides, which in turn serve as templates for splinted ligation between barcodes in the split barcode region. Any two or all of the ligations in FIG. 2G can be catalyzed by the same ligase or by different ligases, e.g., a T4 DNA ligase. Once the split probes are circularized, the ligated reporter oligonucleotides can be cleaved and the cleaved oligonucleotide can be used to prime RCA. Alternatively, a separate primer can be used to prime RCA using the circularized probe as a template. Detection of signals associated with the RCA product in situ can be used to analyze an interaction among the analytes and the target nucleic acid based on proximity. In any of FIGS. 2B-2G, Analyte 1 and Analyte 2 can be nucleic acid or non-nucleic acid analytes, e.g., proteins. Analyte 1 and Analyte 2 can be separate molecules, for example, two proteins capable of non-covalent interactions with each other to form a complex, such as a receptor/ligand pair or two subunits of an enzyme. Alternatively, Analyte 1 and Analyte 2 can be in the same molecule. For example, Analyte 1 and Analyte 2 can be two domains in the same protein.

In some embodiments, a method disclosed herein may comprise one or more signal amplification components, such as RCA, HCR, etc. In other embodiments, a method disclosed herein may not comprise a signal amplification component.

B. Rolling Circle Amplification (RCA)

In some embodiments, a probe (e.g., composite probe formed by connecting a first and second probe) disclosed herein is amplified through rolling circle amplification. In some embodiments, the composite probe may contain one or more barcodes. In some embodiments, the barcodes are bound by detection primary probes, which do not need to be fluorescent, but that include a target-binding portion (e.g., for hybridizing to one or more primary probes) and multiple other barcodes (e.g., secondary barcodes, versus the primary barcodes on the primary probes). In some embodiments, the barcodes of the detection primary probes are targeted by detectably labeled detection oligonucleotides, such as fluorescently labeled oligos. In some embodiments, one or more decoding schemes are used to decode the signals, such as fluorescence, for sequence determination. Exemplary decoding schemes are described in Eng et al., "Transcriptome-scale Super-Resolved Imaging in Tissues by RNA SeqFISH+," *Nature* 568(7751):235-239 (2019); Chen et al., "Spatially resolved, highly multiplexed RNA profiling in single cells," *Science;* 348(6233):aaa6090 (2015); U.S. Pat. No. 10,457,980 B2; US 2016/0369329 A1; WO 2018/026873 A1; US2020/0080139 A1; US20210017587 A1; and US 2017/0220733 A1, all of which are incorporated by reference in their entirety. In some embodiments, these assays enable signal amplification, combinatorial decoding, and error correction schemes at the same time.

In some embodiments, the method comprises using the composite probe formed from the first and second probes hybridized to the nucleic acid of interest in an amplification reaction (e.g., RCA). In some embodiments, the RCA comprises a linear RCA. In some embodiments, the RCA comprises a branched RCA. In some embodiments, the RCA comprises a dendritic RCA. In some embodiments, the RCA comprises any combination of the foregoing. In some embodiments, the circular nucleic acid is a construct formed using ligation. In some embodiments, the circular construct is formed using template primer extension followed by ligation. In some embodiments, the circular construct is formed using a combination of any of the foregoing. In some embodiments, the ligation is a DNA-DNA templated ligation. In some embodiments, the ligation is an RNA-RNA templated ligation. Exemplary RNA-templated ligation probes and methods are described in US 2020/0224244 which is incorporated herein by reference in its entirety. In some embodiments, the ligation is a RNA-DNA templated ligation. In some embodiments, a splint is provided as a template for ligation. In some embodiments, the splint is single stranded.

In some embodiments, a probe disclosed herein (e.g., a first or second probe or a composite probe) can comprise a 5' flap which may be recognized by a structure-specific cleavage enzyme, e.g. an enzyme capable of recognizing the junction between single-stranded 5' overhang and a DNA duplex, and cleaving the single-stranded overhang. It will be understood that the branched three-strand structure which is the substrate for the structure-specific cleavage enzyme may be formed by 5' end of one probe part and the 3' end of another probe part when both have hybridized to the target nucleic acid molecule, as well as by the 5' and 3' ends of a one-part probe. Enzymes suitable for such cleavage include Flap endonucleases (FENS), which are a class of enzymes having endonucleolytic activity and being capable of catalyzing the hydrolytic cleavage of the phosphodiester bond at the junction of single- and double-stranded DNA. Thus, in some embodiment, cleavage of the additional sequence 5' to the first target-specific binding site is performed by a structure-specific cleavage enzyme, e.g. a Flap endonuclease. Suitable Flap endonucleases are described in Ma et al. 2000. JBC 275, 24693-24700 and in US 2020/0224244 and may include *P. furiosus* (Pfu), *A. fulgidus* (Afu), *M. jannaschii* (Mja) or *M. thermoautotrophicum* (Mth). In other embodiments an enzyme capable of recognizing and degrading a single-stranded oligonucleotide having a free 5' end may be used to cleave an additional sequence (5' flap) from a structure as described above. Thus, an enzyme having 5' nuclease activity may be used to cleave a 5' additional sequence. Such 5' nuclease activity may be 5' exonuclease and/or 5' endonuclease activity. A 5' nuclease enzyme is capable of recognizing a free 5' end of a single-stranded oligonucleotide and degrading said single-stranded oligonucleotide. A 5' exonuclease degrades a single-stranded oligonucleotide having a free 5' end by degrading the oligonucleotide into constituent mononucleotides from its 5' end. A 5' endonuclease activity may cleave the 5' flap sequence internally at one or more nucleotides. Further, a 5' nuclease activity may take place by the enzyme traversing the single-stranded oligonucleotide to a region of duplex once it has recognized the free 5' end, and cleaving the single-stranded region into larger constituent nucleotides (e.g. dinucleotides or trinucleotides), or cleaving the entire 5' single-stranded region, e.g. as described in Lyamichev et al. 1999. *PNAS* 96, 6143-6148 for Taq DNA polymerase and the 5' nuclease thereof. Preferred enzymes having 5' nuclease activity include Exonuclease VIII, or a native or recombinant DNA polymerase enzyme from *Thermus aquaticus* (Taq), *Thermus thermophilus* or *Thermus flavus*, or the nuclease domain therefrom.

Following formation of the circular composite probe nucleic acid, in some instances, an amplification primer is added. In other instances, the amplification primer is added with the primary and/or secondary probes. In some instances, the amplification primer may also be complementary to the target nucleic acid and the composite probe. In some embodiments, a washing step is performed to remove any unbound probes, primers, etc. In some embodiments, the wash is a stringency wash. Washing steps can be performed at any point during the process to remove non-specifically bound probes, probes that have ligated, etc.

In some instances, upon addition of a DNA polymerase in the presence of appropriate dNTP precursors and other cofactors, the amplification primer is elongated by replication of multiple copies of the template. The amplification step can utilize isothermal amplification or non-isothermal amplification. In some embodiments, after the formation of the hybridization complex and any subsequent circularization (such as ligation of the first and second probe to form the composite probe), the circular composite probe is rolling-circle amplified to generate a RCA product (e.g., amplicon) containing multiple copies of the composite probe.

Suitable examples of DNA polymerases that can be used include, but are not limited to: *E. coli* DNA polymerase I, Bsu DNA polymerase, Bst DNA polymerase, Taq DNA polymerase, VENT™ DNA polymerase, DEEPVENT™ DNA polymerase, LongAmp® Taq DNA polymerase, LongAmp® Hot Start Taq DNA polymerase, Crimson LongAmp® Taq DNA polymerase, Crimson Taq DNA polymerase, OneTaq® DNA polymerase, OneTaq® QuickLoad® DNA polymerase, Hemo KlenTaq® DNA polymerase, REDTaq® DNA polymerase, Phusion® DNA polymerase, Phusion® High-Fidelity DNA polymerase, Platinum™ Pfx DNA polymerase, AccuPrime™ Pfx DNA polymerase, Phi29 DNA polymerase, Klenow fragment, Pwo DNA polymerase, Pfu DNA polymerase, T4 DNA polymerase and T7 DNA polymerase enzymes.

In some embodiments, rolling circle amplification products are generated using a polymerase selected from the group consisting of Phi29 DNA polymerase, Phi29-like DNA polymerase, M2 DNA polymerase, B103 DNA polymerase, GA-1 DNA polymerase, phi-PRD1 polymerase, Vent™ DNA polymerase, Deep Vent™ DNA polymerase, Vent (exo-) DNA polymerase, KlenTaq® DNA polymerase, DNA polymerase I, Klenow fragment of DNA polymerase I, DNA polymerase III, T3 DNA polymerase, T4 DNA polymerase, T5 DNA polymerase, T7 DNA polymerase, Bst polymerase, rBST DNA polymerase, N29 DNA polymerase, TopoTaq DNA polymerase, T7 RNA polymerase, SP6 RNA polymerase, T3 RNA polymerase, and a variant or derivative thereof.

In some embodiments, upon addition of a DNA polymerase in the presence of appropriate dNTP precursors and other cofactors, a primer is elongated to produce multiple copies of the circular RCA template. This amplification step can comprise isothermal amplification and/or non-isothermal amplification. In some embodiments, after the formation of the hybridization complex and association of the amplification probe or primer, the hybridization complex is rolling-circle amplified to generate a complementary DNA amplicon (e.g., a concatemer or nanoball) containing multiple copies of a sequence complementary to the circular template. Techniques for rolling circle amplification (RCA) include but are not limited to linear RCA, a branched RCA, a dendritic RCA, or any combination thereof. (See, e.g., Baner et al, Nucleic Acids Research, 26:5073-5078, 1998; Lizardi et al, Nature Genetics 19:226, 1998; Mohsen et al., Acc Chem Res. 2016 Nov. 15; 49(11): 2540-2550; Schweitzer et al. Proc. Natl Acad. Sci. USA 97:101 13-1 19, 2000; Faruqi et al, BMC Genomics 2:4, 2000; Nallur et al, Nucl. Acids Res. 29:e118, 2001; Dean et al. Genome Res. 1 1:1095-1099, 2001; Schweitzer et al, Nature Biotech. 20:359-365, 2002; U.S. Pat. Nos. 6,054,274, 6,291,187, 6,323,009, 6,344,329 and 6,368,801). Exemplary polymerases for use in RCA comprise DNA polymerase such phi29 ($\varphi^{29}$) polymerase, Klenow fragment, *Bacillus stearothermophilus* DNA polymerase (BST), T4 DNA polymerase, T7 DNA polymerase, or DNA polymerase I. In some aspects, DNA polymerases that have been engineered or mutated to have desirable characteristics can be employed. In some embodiments, the polymerase is phi29 DNA polymerase.

In some aspects, during the amplification step, modified nucleotides can be added to the reaction to incorporate the modified nucleotides in the amplification product (e.g., nanoball). Exemplary of the modified nucleotides comprise amine-modified nucleotides. In some aspects of the methods, for example, for anchoring or cross-linking of the generated amplification product (e.g., nanoball) to a scaffold, to cellular structures and/or to other amplification products (e.g., other nanoballs). In some examples, the scaffold also contains modifications or functional groups that can react with or incorporate the modifications or functional groups of the probe set or amplification product. In some examples, the scaffold can comprise oligonucleotides, polymers or chemical groups, to provide a matrix and/or support structures. In some aspects, the amplification products comprises a modified nucleotide, such as an amine-modified nucleotide. In some embodiments, the amine-modified nucleotide comprises an acrylic acid N-hydroxysuccinimide moiety modification. Examples of other amine-modified nucleotides comprise, but are not limited to, a 5-Aminoallyl-dUTP moiety modification, a 5-Propargylamino-dCTP moiety modification, a N6-6-Aminohexyl-dATP moiety modification, or a 7-Deaza-7-Propargylamino-dATP moiety modification.

In some aspects, the polynucleotides and/or amplification product (e.g., amplicon) can be anchored to a polymer matrix. For example, the polymer matrix can be a hydrogel. In some embodiments, one or more of the polynucleotide probe(s) can be modified to contain functional groups that can be used as an anchoring site to attach the polynucleotide probes and/or amplification product to a polymer matrix, such as a 3D matrix. Exemplary modification and polymer matrix that can be employed in accordance with the provided embodiments comprise those described in, for example, US 2016/0024555, US 2018/0251833 and US 2017/0219465. The 3D matrix may comprise a plurality of nucleic acids covalently or non-covalently attached thereto. The 3D matrix can be a gel matrix. The 3D matrix can be a hydrogel matrix. The 3D matrix can preserve an absolute or relative 3D position of the plurality of nucleic acid molecules. Methods for embedding a sample in a matrix have been described in, e.g., US2019/0276881, US2020/0071751, US2021/0292834, US2021/0230692, and US2021/0310052, which are incorporated herein by reference in their entirety.

In some cases, a matrix-forming material may be used to form the 3D matrix. The matrix-forming material may be polymerizable monomers or polymers, or cross-linkable polymers. The matrix-forming material may be polyacrylamide, acrylamide monomers, cellulose, alginate, polyamide, agarose, dextran, or polyethylene glycol. The matrix-forming materials can form a matrix by polymerization and/or crosslinking of the matrix-forming materials using methods specific for the matrix-forming materials and methods, reagents, and conditions. The matrix-forming material may form a polymeric matrix. The matrix-forming material may form a polyelectrolyte gel. The matrix-forming material may form a hydrogel gel matrix.

The matrix-forming material may form a 3D matrix including the plurality of nucleic acids while maintaining the spatial relationship of the nucleic acids. In this aspect, the plurality of nucleic acids can be immobilized within the matrix material. The plurality of nucleic acids may be immobilized within the matrix material by co-polymerization of the nucleic acids with the matrix-forming material. The plurality of nucleic acids may also be immobilized within the matrix material by crosslinking of the nucleic acids to the matrix material or otherwise cross-linking with the matrix-forming material. The plurality of nucleic acids may also be immobilized within the matrix by covalent attachment or through ligand-protein interaction to the matrix.

The matrix can be porous thereby allowing the introduction of reagents into the matrix at the site of a nucleic acid for amplification of the nucleic acid. A porous matrix may be made according to various methods. For example, a polyacrylamide gel matrix can be copolymerized with acrydite-modified streptavidin monomers and biotinylated DNA molecules, using a suitable acrylamide:bis-acrylamide ratio to control the cross-linking density. Additional control over the molecular sieve size and density can be achieved by adding additional cross-linkers such as functionalized polyethylene glycols.

The 3D matrix may be sufficiently optically transparent or may have optical properties suitable for sequence determination chemistries and deep three-dimensional imaging for high throughput information readout.

The amplification products may be immobilized within the matrix generally at the location of the nucleic acid being amplified, thereby creating a localized colony of amplicons. The amplification products may be immobilized within the matrix by steric factors. The amplification products may also be immobilized within the matrix by covalent or noncovalent bonding. In this manner, the amplification products may be considered to be attached to the matrix. By being immobilized to the matrix, such as by covalent bonding or cross-linking, the size and spatial relationship of the original amplicons is maintained. By being immobilized to the matrix, such as by covalent bonding or cross-linking, the amplification products are resistant to movement or unraveling under mechanical stress.

In some aspects, the amplification products are copolymerized and/or covalently attached to the surrounding matrix thereby preserving their spatial relationship and any information inherent thereto. For example, if the amplification products are those generated from DNA or RNA within a cell embedded in the matrix, the amplification products can also be functionalized to form covalent attachment to the matrix preserving their spatial information within the cell thereby providing a subcellular localization distribution pattern. In some embodiments, the provided methods involve embedding the one or more polynucleotide probe sets and/or the amplification products in the presence of hydrogel subunits to form one or more hydrogel-embedded amplification products. In some embodiments, the hydrogel-tissue chemistry described comprises covalently attaching nucleic acids to in situ synthesized hydrogel for tissue clearing, enzyme diffusion, and multiple-cycle sequence determination while an existing hydrogel-tissue chemistry method cannot. In some embodiments, to enable amplification product embedding in the tissue-hydrogel setting, amine-modified nucleotides are comprised in the amplification step (e.g., RCA), functionalized with an acrylamide moiety using acrylic acid N-hydroxysuccinimide esters, and copolymerized with acrylamide monomers to form a hydrogel.

In some embodiments, the RCA template may comprise the target analyte, or a part thereof, where the target analyte is a nucleic acid, or it may be provided or generated as a proxy, or a marker, for the analyte. As noted above, RCA-based detection system can be used to detect different analytes, e.g., where the signal is provided by generating an RCA product from a circular RCA template which is provided or generated in the assay, and the RCA product is detected to detect the analyte. The RCA product may thus be regarded as a reporter which is detected to detect the target analyte. However, the RCA template may also be regarded as a reporter for the target analyte; the RCA product is generated based on the RCA template, and comprises complementary copies of the RCA template. The RCA template determines the signal which is detected, and is thus indicative of the target analyte. As will be described in more detail below, the RCA template may be a probe, or a part or component of a probe, or may be generated from a probe, or it may be a component of a detection assay (e.g., a reagent in a detection assay), which is used as a reporter for the assay, or a part of a reporter, or signal-generation system. The RCA template used to generate the RCA product may thus be a circular (e.g. circularized) reporter nucleic acid molecule, namely from any RCA-based detection assay which uses or generates a circular nucleic acid molecule as a reporter for the assay.

Following amplification, the sequence of the amplicon (e.g., RCA product) or a portion thereof, is determined or otherwise analyzed, for example by using detectably labeled probes and imaging. The sequencing or analysis of the amplification products can comprise sequencing by hybridization, sequencing by ligation, and/or fluorescent in situ sequencing, and/or wherein the in situ hybridization comprises sequential fluorescent in situ hybridization. In some instances, a sequence of the RCA product is detected using, e.g., the secondary and higher order probes and detection oligonucleotides described herein.

FIG. 1 shows exemplary probes and methods of using the probes to detect a target nucleic acid molecule (e.g., RNA or DNA). A sample comprising the target nucleic acid molecule (e.g., a cellular nucleic acid or a reporter oligonucleotide of a labelling agent) can be contacted with the first probe and the second probe simultaneously or in any suitable order. The first and second probes comprise the first and second hybridization regions, respectively, that hybridize to the target nucleic acid molecule. The first and second probes further comprise the first and second portions, respectively, of the barcode region. Upon hybridization to the target nucleic acid molecule, the first and second probes can be connected (e.g., ligated) via the first and second portions to form the composite probe, in which the first and second hybridization regions can be optionally connected to circularize the composite probe. The composite probe can be detected using a detectable probe that hybridizes to a sequence of the barcode region, which may comprise one or more barcode sequences corresponding to the target nucleic acid molecule. A rolling circle amplification (RCA) product can be generated from the composite probe or a probe that hybridizes to the composite probe. The RCA product can be detected using a detectable probe that hybridizes to a sequence of the complement of the barcode region in the RCA product. The detectable probe can be labelled with a detectable label (e.g., fluorophore) and/or be detected using a detectably-labelled probe that hybridizes to a sequence (e.g., in a 3' overhang or a 5' overhang) of the detectable probe. Signals associated with the detectable probe can be analyzed to detect the target nucleic acid molecule in the sample. The target nucleic acid molecule can be a reporter oligonucleotide as shown in FIG. 2.

In some embodiments, a splint hybridizes to the barcode region more stably when the splint comprises complementary sequences to both (i) the first portion or a subportion thereof and (ii) the second portion or a subportion thereof, as compared to when the splint comprises a mismatch with (i) the first portion or a subportion thereof and/or (ii) the second portion or a subportion thereof. In some embodiments, the method comprises removing the splint comprising a mismatch with (i) the first portion or a subportion thereof and/or (ii) the second portion or a subportion thereof, whereas under the same conditions, the splint complementary to both (i) the first portion or a subportion thereof and (ii) the second portion or a subportion thereof remains stably hybridized to the barcode region for subsequent ligation.

Figure 3A:
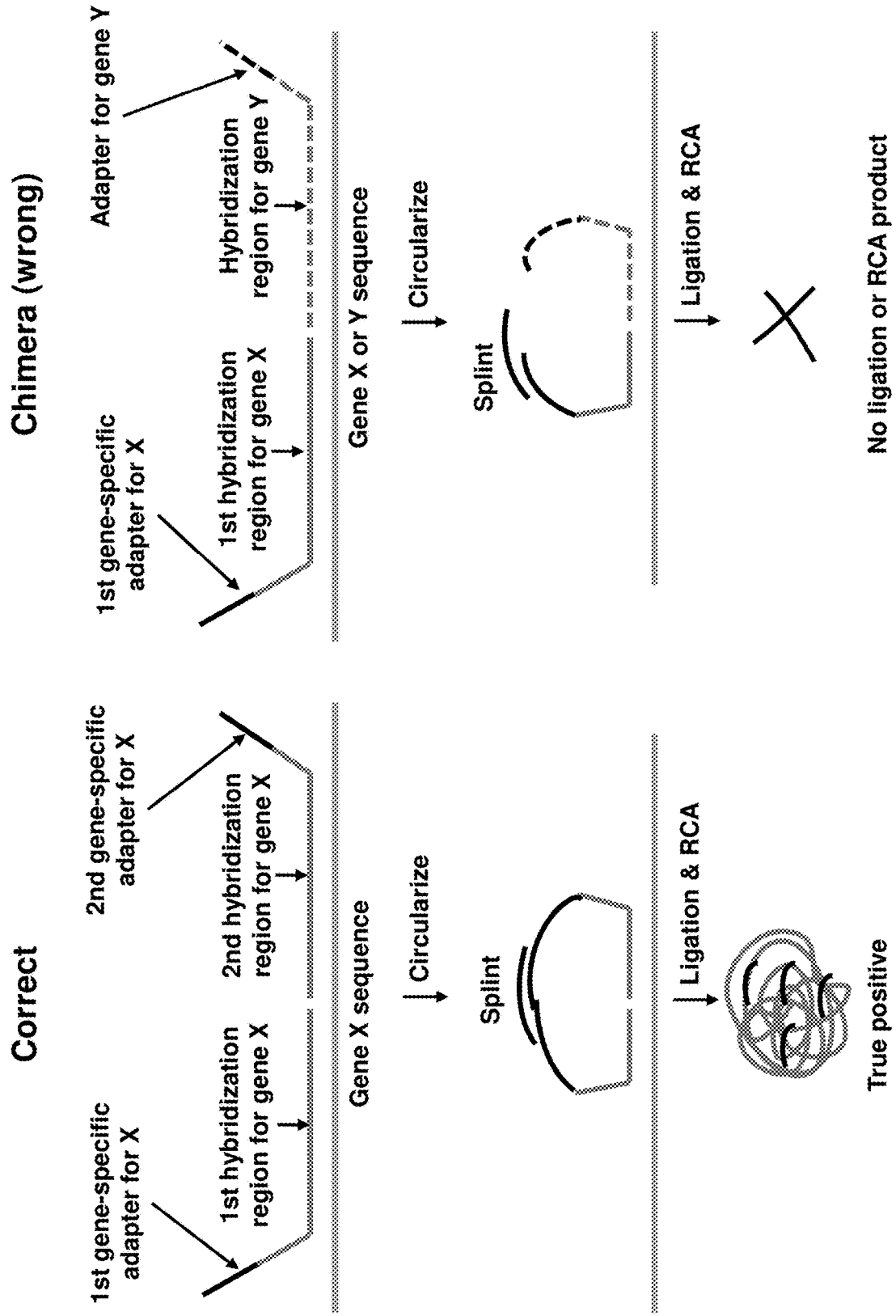
FIGS. 3A-3B illustrate that probes comprising split gene-specific sequences (e.g., gene-specific adapters and/or barcode sequences) can be used to improve detection specificity.
Figure 3B:
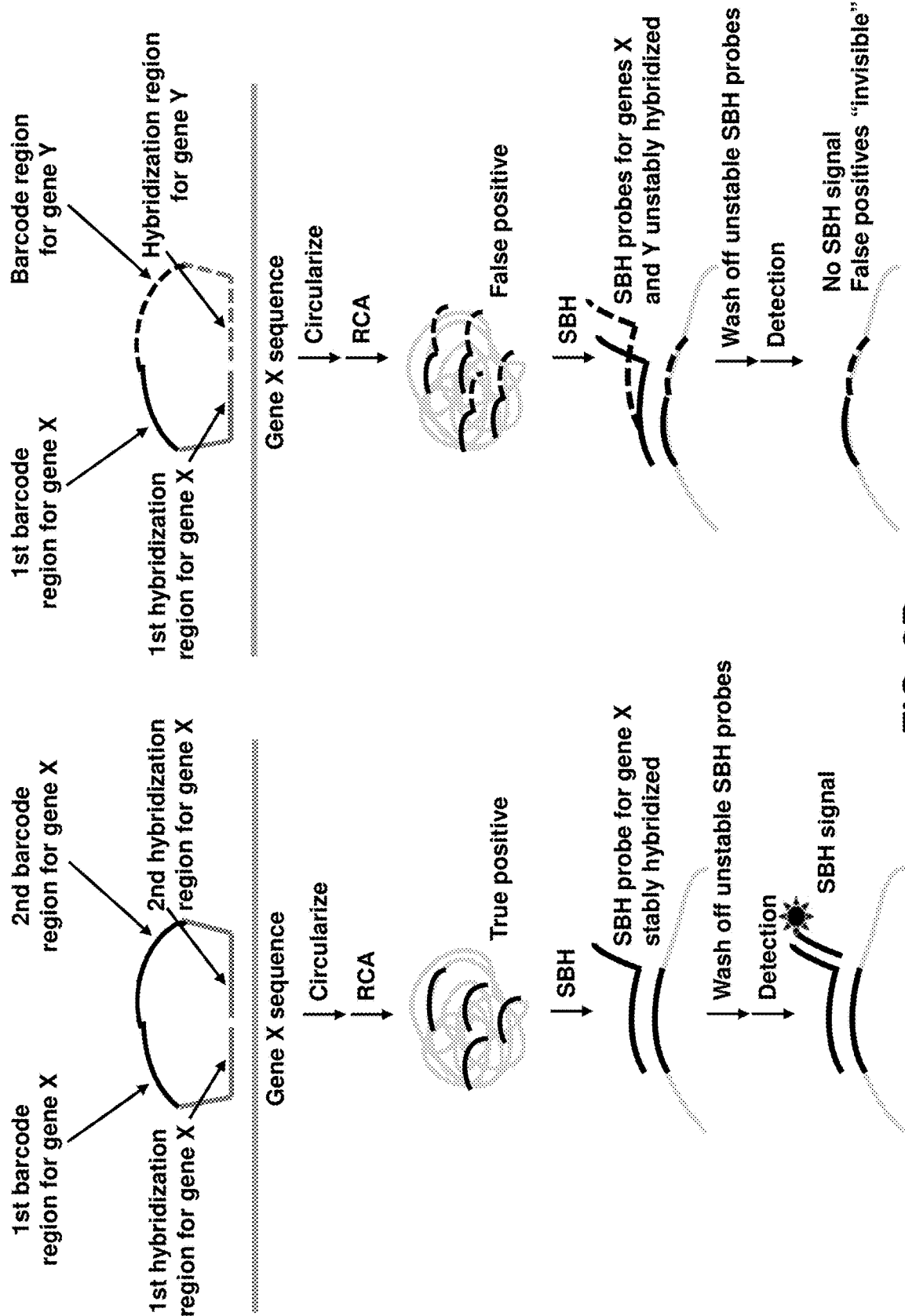

FIGS. 3A-3B illustrate that probes comprising split gene-specific sequences (e.g., gene-specific adapters and/or barcode sequences) can be used to improve detection specificity. FIG. 3A shows an example of using probes comprising gene-specific adapters to reduce formation of chimeric probes which may give false positive signals. Upon correct hybridization of the first and second hybridization regions to a Gene X sequence (e.g., mRNA), the first and second Gene X-specific adapters can be ligated using a splint that hybridizes to the Gene X-specific adapters. The ligated Gene X-specific probes can be circularized and subjected to RCA and give a true positive signal, thereby detecting the Gene X sequence (FIG. 3A, left panel). Sometimes a Gene Y probe may incorrectly hybridize next to a Gene X probe. Since the Gene X probe comprises a Gene X-specific adapter while the Gene Y probe comprises a Gene Y-specific adapter, neither a Gene X-specific splint nor a Gene Y-specific splint (not shown) is able to bring the ends of the probes in proximity for ligation. False positive signals may be reduced, since no Gene X/Gene Y chimeric probe ligation or RCA product is generated (FIG. 3A, right panel). FIG. 3B shows an example of using probes comprising split barcode sequences to reduce detection of false positive signals. False positive signals can be rendered "invisible" in case chimeric probes and/or RCA products do form, for instance, due to low hybridization specificity and/or low ligase fidelity. Since only the true positive signals are detected, the presence of the chimeric products would not interfere with detection of barcode sequences, for instance, for sequencing-by-hybridization (SBH).

The advantages shown in FIGS. 3A-3B are not mutually exclusive. For instance, the probes in FIG. 3B, left panel, can reduce the formation of Gene X/Gene Y chimeric probe ligation when gene-specific splints are used to template ligation. In some cases, there may be a high probability of chimeric probe formation due to the reagents used (e.g., ligases with high ligation efficiency but low fidelity). For instance, the hybridization regions can be ligated using an RNA-templated ligase such as SplintR®, and the barcode regions can be ligated using template-independent ligation (e.g., using CircLigase™). FIG. 3B, right panel, shows false positive signals due to chimeric probe formation can be filtered out.

Figure 4:
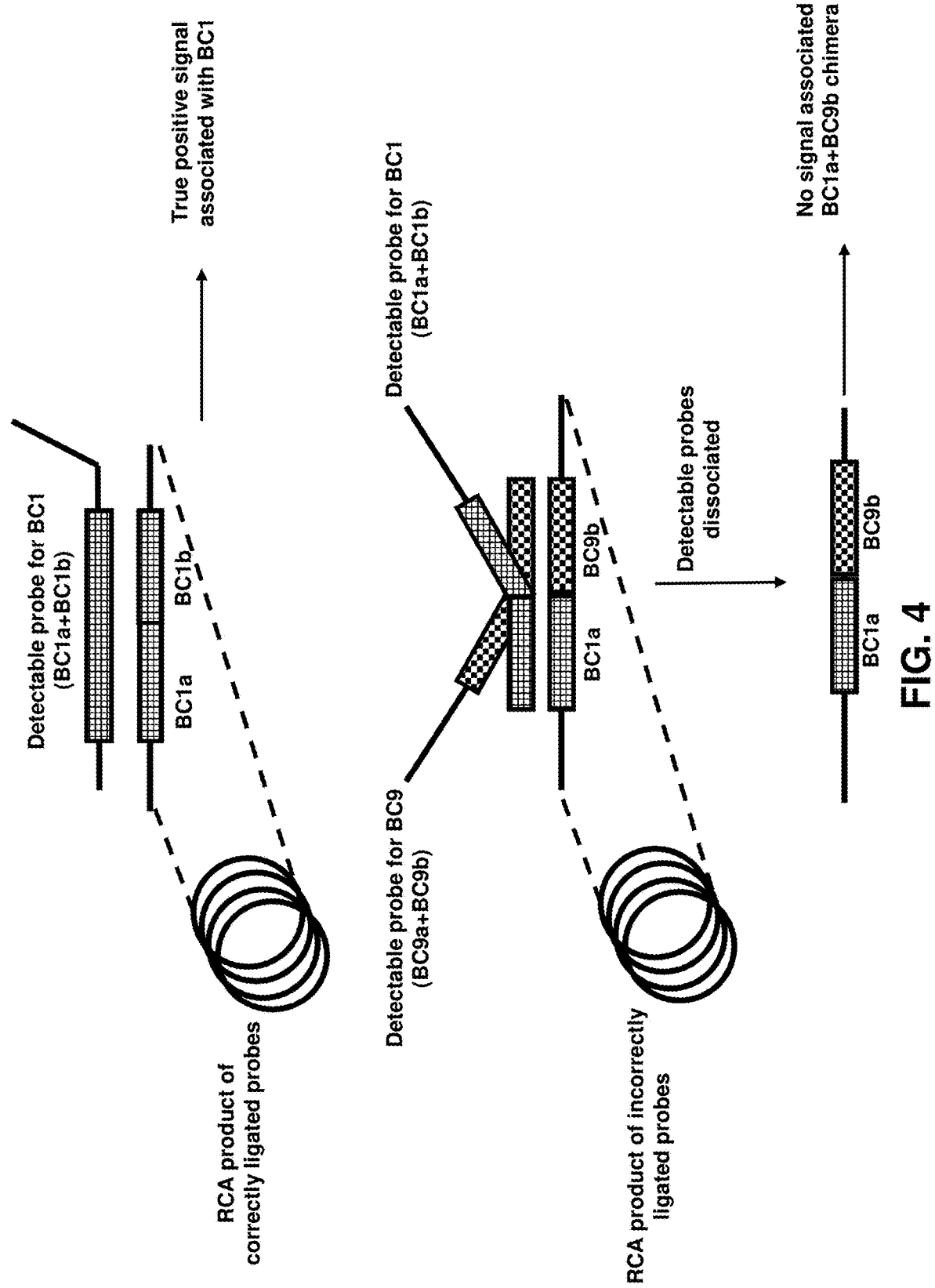
FIG. 4 shows another example of reducing false positive signals for detection of barcode sequences wherein the detection includes sequencing-by-hybridization (SBH).

FIG. 4 shows another example of reducing false positive signals for detection of barcode sequences. The RCA product comprising barcode region BC1 (which comprises two portions BC1a and BC1b) hybridizes to the detectable probe for BC1. As an example, BC1a and BC1b can each be 8 nucleotides in length and the detectable probe comprises a 16-nucleotide sequences that hybridizes to both BC1a and BC1b. The specifically hybridized detectable probe gives a true positive signal associated with BC1 corresponding to the correct analyte (e.g., Analyte 1) to be detected. A "false positive" RCA product can be generated from incorrectly ligated probes, for example, a first probe that comprises BC1a (or complement thereof) corresponding to Analyte 1 ligated to a second probe that comprises BC9b (or complement thereof) corresponding to Analyte 9. The second probe (for Analyte 9) may non-specifically bind to Analyte 1, and the hybridization regions of the first and second probes may be ligated by a ligase (e.g., a low-fidelity ligase) to generate the RCA product containing the BC1a+BC9b chimera, where BC1a and BC9b can each be 8 nucleotides in length. However, neither detectable probe (for BC1 or BC9) specifically binds the BC1a+BC9b chimera because each detectable probe only hybridizes to half of chimera. The detectable probes for BC1 and BC9 can be dissociated from the BC1a+BC9b chimera, such that no signal associated with the "false positive" RCA product is detected. In contrast, under the same conditions the detectable probe for BC1 can remain hybridized to the correct RCA product comprising BC1. As such, false positive signals can be rendered "invisible."

C. Other Signal Amplification Methods

Exemplary signal amplification methods include targeted deposition of detectable reactive molecules around the site of probe hybridization, targeted assembly of branched structures (e.g., bDNA or branched assay using locked nucleic acid (LNA)), programmed in situ growth of concatemers by enzymatic rolling circle amplification (RCA) (e.g., as described in US 2019/0055594 incorporated herein by reference), hybridization chain reaction, assembly of topologically catenated DNA structures using serial rounds of chemical ligation (clampFISH), signal amplification via hairpin-mediated concatemerization (e.g., as described in US 2020/0362398 incorporated herein by reference), e.g., primer exchange reactions such as signal amplification by exchange reaction (SABER) or SABER with DNA-Exchange (Exchange-SABER). In some embodiments, a non-enzymatic signal amplification method may be used.

The detectable reactive molecules may comprise tyramide, such as used in tyramide signal amplification (TSA) or multiplexed catalyzed reporter deposition (CARD)-FISH. In some embodiments, the detectable reactive molecule may be releasable and/or cleavable from a detectable label such as a fluorophore. In some embodiments, a method disclosed herein comprises multiplexed analysis of a biological sample comprising consecutive cycles of probe hybridization, fluorescence imaging, and signal removal, where the signal removal comprises removing the fluorophore from a fluorophore-labeled reactive molecule (e.g., tyramide). Exemplary detectable reactive reagents and methods are described in U.S. Pat. No. 6,828,109, US 2019/0376956, US 2022/0026433, US 2022/0128565, and US 2021/0222234, all of which are incorporated herein by reference in their entireties.

In some embodiments, hybridization chain reaction (HCR) can be used for signal amplification. HCR is an enzyme-free nucleic acid amplification based on a triggered chain of hybridization of nucleic acid molecules starting from HCR monomers, which hybridize to one another to form a nicked nucleic acid polymer. This polymer is the product of the HCR reaction which is ultimately detected in order to indicate the presence of the target analyte. HCR is described in detail in Dirks and Pierce, 2004, PNAS, 101 (43), 15275-15278 and in U.S. Pat. Nos. 7,632,641 and 7,721,721 (see also US 2006/00234261; Chemeris et al, 2008 Doklady Biochemistry and Biophysics, 419, 53-55; Niu et al, 2010, 46, 3089-3091; Choi et al, 2010, Nat. Biotechnol. 28(11), 1208-1212; and Song et al, 2012, Analyst, 137, 1396-1401). HCR monomers typically comprise a hairpin, or other metastable nucleic acid structure. In the simplest form of HCR, two different types of stable hairpin monomer, referred to here as first and second HCR monomers, undergo a chain reaction of hybridization events to form a long nicked double-stranded DNA molecule when an "initiator" nucleic acid molecule is introduced. The HCR monomers have a hairpin structure comprising a double stranded stem region, a loop region connecting the two strands of the stem region, and a single stranded region at one end of the double stranded stem region. The single stranded region which is exposed (and which is thus available for hybridization to another molecule, e.g. initiator or other HCR monomer) when the monomers are in the hairpin structure may be known as the "toehold region" (or "input domain"). The first HCR monomers each further comprise a sequence which is complementary to a sequence in the exposed toehold region of the second HCR monomers. This sequence of complementarity in the first HCR monomers may be known as the "interacting region" (or "output domain"). Similarly, the second HCR monomers each comprise an interacting region (output domain), e.g. a sequence which is complementary to the exposed toehold region (input domain) of the first HCR monomers. In the absence of the HCR initiator, these interacting regions are protected by the secondary structure (e.g. they are not exposed), and thus the hairpin monomers are stable or kinetically trapped (also referred to as "metastable"), and remain as monomers (e.g. preventing the system from rapidly equilibrating), because the first and second sets of HCR monomers cannot hybridize to each other. However, once the initiator is introduced, it is able to hybridize to the exposed toehold region of a first HCR monomer, and invade it, causing it to open up. This exposes the interacting region of the first HCR monomer (e.g. the sequence of complementarity to the toehold region of the second HCR monomers), allowing it to hybridize to and invade a second HCR monomer at the toehold region. This hybridization and invasion in turn opens up the second HCR monomer, exposing its interacting region (which is complementary to the toehold region of the first HCR monomers), and allowing it to hybridize to and invade another first HCR monomer. The reaction continues in this manner until all of the HCR monomers are exhausted (e.g. all of the HCR monomers are incorporated into a polymeric chain). Ultimately, this chain reaction leads to the formation of a nicked chain of alternating units of the first and second monomer species. The presence of the HCR initiator is thus required in order to trigger the HCR reaction by hybridization to and invasion of a first HCR monomer. The first and second HCR monomers are designed to hybridize to one another are thus may be defined as cognate to one another. They are also cognate to a given HCR initiator sequence. HCR monomers which interact with one another (hybridize) may be described as a set of HCR monomers or an HCR monomer, or hairpin, system. In some embodiments, the HCR initiator comprises a sequence for hybridizing to a portion of the first probe and/or the second probe. For example, the HCR initiator may hybridize to the first portion of the barcode region and the second portion of the barcode region.

An HCR reaction could be carried out with more than two species or types of HCR monomers. For example, a system involving three HCR monomers could be used. In such a system, each first HCR monomer may comprise an interacting region which binds to the toehold region of a second HCR monomer; each second HCR may comprise an interacting region which binds to the toehold region of a third HCR monomer; and each third HCR monomer may comprise an interacting region which binds to the toehold region of a first HCR monomer. The HCR polymerization reaction would then proceed as described above, except that the resulting product would be a polymer having a repeating unit of first, second and third monomers consecutively. Corresponding systems with larger numbers of sets of HCR monomers can be used.

In some embodiments, similar to HCR reactions that use hairpin monomers, linear oligo hybridization chain reaction (LO-HCR) can also be used for signal amplification. In some embodiments, provided herein is a method of detecting an analyte in a sample comprising: (i) performing a linear oligo hybridization chain reaction (LO-HCR), wherein an initiator is contacted with a plurality of LO-HCR monomers of at least a first and a second species to generate a polymeric LO-HCR product hybridized to a target nucleic acid molecule, wherein the first species comprises a first hybridization region complementary to the initiator and a second hybridization region complementary to the second species, wherein the first species and the second species are linear, single-stranded nucleic acid molecules; wherein the initiator is provided in one or more parts, and hybridizes directly or indirectly to or is comprised in the target nucleic acid molecule; and (ii) detecting the polymeric product, thereby detecting the analyte. In some embodiments, the first species and/or the second species may not comprise a hairpin structure. In some embodiments, the plurality of LO-HCR monomers may not comprise a metastable secondary structure. In some embodiments, the LO-HCR polymer may not comprise a branched structure. In some embodiments, performing the linear oligo hybridization chain reaction comprises contacting the target nucleic acid molecule with the initiator to provide the initiator hybridized to the target nucleic acid molecule. In any of the embodiments herein, the target nucleic acid molecule and/or the analyte can be an RCA product. Exemplary methods and compositions for LO-HCR are described in US 2021/0198723, incorporated herein by reference in its entirety.

In some embodiments, detection of nucleic acids sequences in situ includes an assembly for branched signal amplification. In some embodiments, the assembly complex comprises an amplifier hybridized directly or indirectly (via one or more oligonucleotides) to a sequence of the composite probe or an RCA product generated therefrom. In some embodiments, the assembly includes one or more amplifiers each including an amplifier repeating sequence. In some aspects, the one or more amplifiers is labeled. Described herein is a method of using the aforementioned assembly, including for example, using the assembly in multiplexed error-robust fluorescent in situ hybridization (MERFISH) applications, with branched DNA amplification for signal readout. In some embodiments, the amplifier repeating sequence is about 5-30 nucleotides, and is repeated N times in the amplifier. In some embodiments, the amplifier repeating sequence is about 20 nucleotides, and is repeated at least two times in the amplifier. In some aspects, the one or more amplifier repeating sequence is labeled. For exemplary branched signal amplification, see e.g., U.S. Pat. Pub. No. US20200399689A1, US20220064697A1, and Xia et al., Multiplexed Detection of RNA using MERFISH and branched DNA amplification. Scientific Reports (2019), each of which is fully incorporated by reference herein.

In some embodiments, a sequence of the composite probe or an RCA product generated therefrom can be detected in with a method that comprises signal amplification by performing a primer exchange reaction (PER). In various embodiments, a primer with domain on its 3' end binds to a catalytic hairpin, and is extended with a new domain by a strand displacing polymerase. For example, a primer with domain 1 on its 3' ends binds to a catalytic hairpin, and is extended with a new domain 1 by a strand displacing polymerase, with repeated cycles generating a concatemer of repeated domain 1 sequences. In various embodiments, the strand displacing polymerase is a Bst polymerase. In various embodiments, the catalytic hairpin includes a stopper which releases the strand displacing polymerase. In various embodiments, branch migration displaces the extended primer, which can then dissociate. In various embodiments, the primer undergoes repeated cycles to form a concatemer primer. In various embodiments, a plurality of concatemer primers is contacted with a sample comprising RCA products generated using methods described herein. In various embodiments, the RCA product may be contacted with a plurality of concatemer primers and a plurality of labeled probes. see e.g., U.S. Pat. Pub. No. US20190106733, which is incorporated herein by reference, for exemplary molecules and PER reaction components.

In some embodiments, a sequence of the composite probe or an RCA product generated therefrom can be detected by providing detection probes, such as probes for performing a chain reaction that forms an amplification product, e.g., HCR. In some embodiments, the analysis comprises determining the sequence of all or a portion of the amplification product. In some embodiments, the analysis comprises detecting a sequence present in the amplification product. In some embodiments, the sequence of all or a portion of the amplification product is indicative of the identity of a region of interest in a target nucleic acid. In other embodiments, the provided methods involve analyzing, e.g., detecting or determining, one or more sequences present in the polynucleotide probes (e.g., a barcode sequence present in an overhang region of the first and/or second probe).

V. Detection and Analysis

Figure 5:
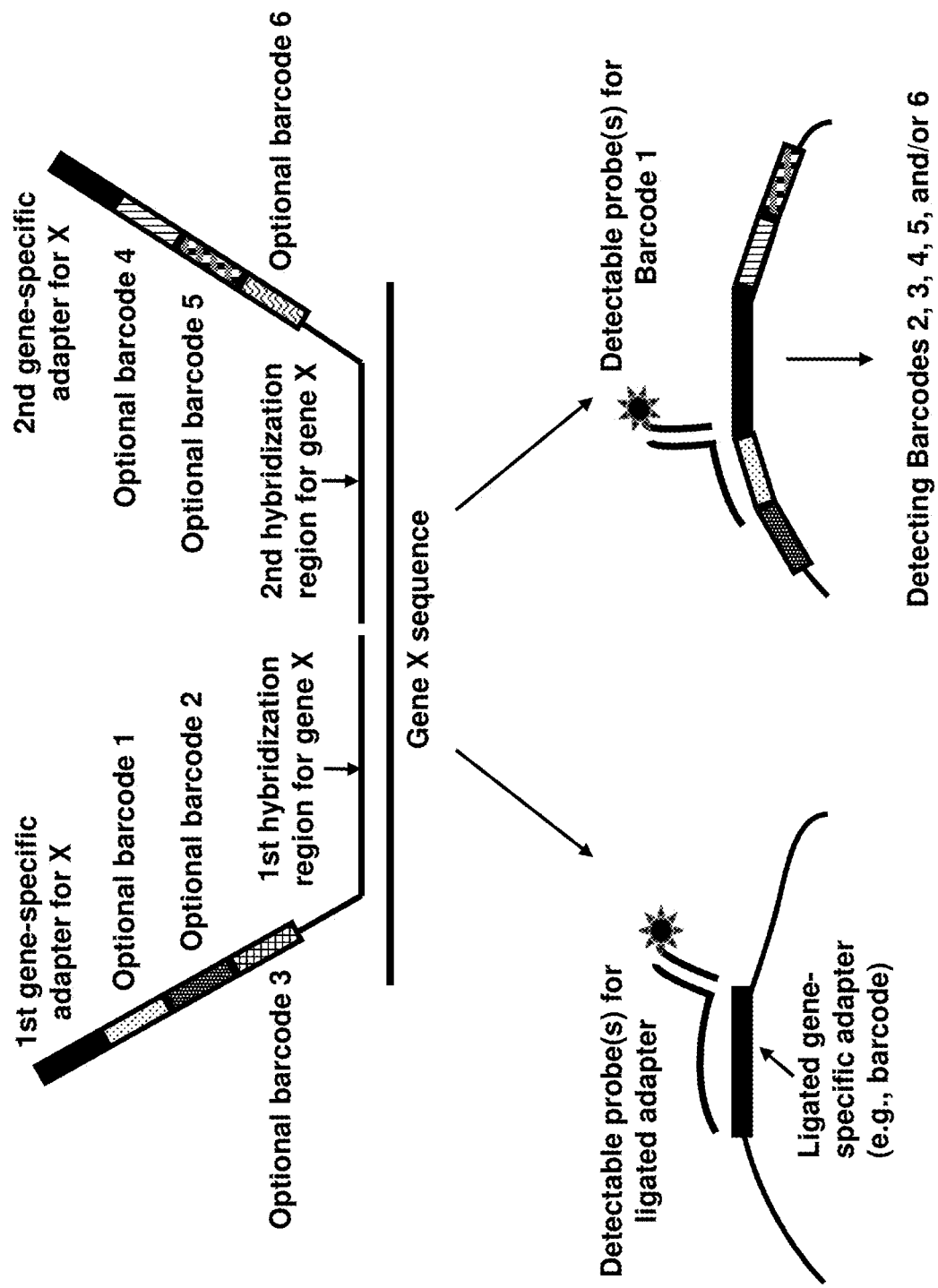
FIG. 5 shows a schematic illustrating probes comprising split gene-specific sequences (e.g., gene-specific adapters and/or barcode sequences) can be used in multiplex detection such as sequencing-by-hybridization (SBH).

In some embodiments, the methods comprise determining a sequence of all or a portion of the amplification product, such as one or more barcode sequences present in the amplification product. In some embodiments, the analysis and/or sequence determination comprises sequencing all or a portion of the amplification product or the probe(s) and/or in situ hybridization to the amplification product or the probe(s). In some embodiments, the sequence determination step involves sequencing by hybridization, sequencing by ligation, and/or fluorescent in situ sequencing, hybridization-based in situ sequencing and/or wherein the in situ hybridization comprises sequential fluorescent in situ hybridization. For instance, as shown in FIG. 5, probes comprising split gene-specific sequences (e.g., gene-specific adapters and/or barcode sequences) can be used in multiplex detection such as sequencing-by-hybridization (SBH).

In some embodiments, disclosed herein is a method for analyzing a biological sample, comprising: (a) contacting the biological sample with: (i) a first probe comprising a first hybridization region, a sequencing primer binding site, and a first portion of a barcode region (e.g., a gene specific adaptor), and (ii) a second probe comprising a second hybridization region and a second portion of the barcode region, wherein the first and second hybridization regions are complementary to target sequences in a target nucleic acid molecule in the biological sample; (b) ligating the first and second probes hybridized to the target nucleic acid molecule to form a composite probe by connecting the first and second portions of the barcode region; (c) contacting the composite probe with a sequencing primer that binds to the sequencing primer binding site; and (d) determining a sequence of the barcode region by sequencing-by-ligation (SBL) using the sequencing primer, wherein the sequence comprises both a sequence of the first portion and a sequence of the second portion. In cases where mismatched first and second probes are ligated, the sequence determined by SBL does not exist in a barcode pool (e.g., a predetermined or pre-associated set of barcodes and analytes), thereby allowing the identification of a false positive signal.

In some embodiments, the analysis and/or sequence determination comprises detecting a polymer generated by a hybridization chain reaction (HCR) reaction, see e.g., US 2017/0009278, which is incorporated herein by reference, for exemplary probes and HCR reaction components. In some embodiments, the detection or determination comprises hybridizing to the amplification product a detection oligonucleotide labeled with a fluorophore, an isotope, a mass tag, or a combination thereof. In some embodiments, the detection or determination comprises imaging the amplification product. In some embodiments, the target nucleic acid is an mRNA in a tissue sample, and the detection or determination is performed when the target nucleic acid and/or the amplification product is in situ in the tissue sample.

In some aspects, the provided methods comprise imaging the amplification product (e.g., amplicon) and/or one or more portions of the polynucleotides, for example, via binding of the detection probe and detecting the detectable label. In some embodiments, the detection probe comprises a detectable label that can be measured and quantitated. The terms "label" and "detectable label" comprise a directly or indirectly detectable moiety that is associated with (e.g., conjugated to) a molecule to be detected, e.g., a detectable probe, comprising, but not limited to, fluorophores, radioactive isotopes, fluorescers, chemiluminescers, enzymes, enzyme substrates, enzyme cofactors, enzyme inhibitors, chromophores, dyes, metal ions, metal sols, ligands (e.g., biotin or haptens) and the like.

The term "fluorophore" comprises a substance or a portion thereof that is capable of exhibiting fluorescence in the detectable range. Particular examples of labels that may be used in accordance with the provided embodiments comprise, but are not limited to phycoerythrin, Alexa dyes, fluorescein, YPet, CyPet, Cascade blue, allophycocyanin, Cy3, Cy5, Cy7, rhodamine, dansyl, umbelliferone, Texas red, luminol, acradimum esters, biotin, green fluorescent protein (GFP), enhanced green fluorescent protein (EGFP), yellow fluorescent protein (YFP), enhanced yellow fluorescent protein (EYFP), blue fluorescent protein (BFP), red fluorescent protein (RFP), firefly luciferase, Renilla luciferase, NADPH, beta-galactosidase, horseradish peroxidase, glucose oxidase, alkaline phosphatase, chloramphenical acetyl transferase, and urease.

Fluorescence detection in tissue samples can often be hindered by the presence of strong background fluorescence. "Autofluorescence" is the general term used to distinguish background fluorescence (that can arise from a variety of sources, including aldehyde fixation, extracellular matrix components, red blood cells, lipofuscin, and the like) from the desired immunofluorescence from the fluorescently labeled antibodies or probes. Tissue autofluorescence can lead to difficulties in distinguishing the signals due to fluorescent antibodies or probes from the general background. In some embodiments, a method disclosed herein utilizes one or more agents to reduce tissue autofluorescence, for example, Autofluorescence Eliminator (Sigma/EMD Millipore), TrueBlack® Lipofuscin Autofluorescence Quencher (Biotium), MaxBlock™ Autofluorescence Reducing Reagent Kit (MaxVision Biosciences), and/or a very intense black dye (e.g., Sudan Black, or comparable dark chromophore).

In some embodiments, a detectable probe containing a detectable label can be used to detect one or more polynucleotide(s) and/or amplification products (e.g., amplicon) described herein. In some embodiments, the methods involve incubating the detectable probe containing the detectable label with the sample, washing unbound detectable probe, and detecting the label, e.g., by imaging.

Examples of detectable labels comprise but are not limited to various radioactive moieties, enzymes, prosthetic groups, fluorescent markers, luminescent markers, bioluminescent markers, metal particles, protein-protein binding pairs and protein-antibody binding pairs. Examples of fluorescent proteins comprise, but are not limited to, yellow fluorescent protein (YFP), green fluorescence protein (GFP), cyan fluorescence protein (CFP), umbelliferone, fluorescein, fluorescein isothiocyanate, rhodamine, dichlorotriazinylamine fluorescein, dansyl chloride and phycoerythrin.

Examples of bioluminescent markers comprise, but are not limited to, luciferase (e.g., bacterial, firefly and click beetle), luciferin, aequorin and the like. Examples of enzyme systems having visually detectable signals comprise, but are not limited to, galactosidases, glucorimidases, phosphatases, peroxidases and cholinesterases. Identifiable markers also comprise radioactive compounds such as $^{125}I$, $^{35}S$, $^{14}C$, or $^{3}H$. Identifiable markers are commercially available from a variety of sources.

Examples of fluorescent labels and nucleotides and/or polynucleotides conjugated to such fluorescent labels comprise those described in, for example, Hoagland, Handbook of Fluorescent Probes and Research Chemicals, Ninth Edition (Molecular Probes, Inc., Eugene, 2002); Keller and Manak, DNA Probes, 2nd Edition (Stockton Press, New York, 1993); Eckstein, editor, Oligonucleotides and Analogues: A Practical Approach (IRL Press, Oxford, 1991); and Wetmur, Critical Reviews in Biochemistry and Molecular Biology, 26:227-259 (1991). In some embodiments, exemplary techniques and methods methodologies applicable to the provided embodiments comprise those described in, for example, U.S. Pat. Nos. 4,757,141, 5,151,507 and 5,091,519. In some embodiments, one or more fluorescent dyes are used as labels for labeled target sequences, for example, as described in U.S. Pat. No. 5,188,934 (4,7-dichlorofluorescein dyes); U.S. Pat. No. 5,366,860 (spectrally resolvable rhodamine dyes); U.S. Pat. No. 5,847,162 (4,7-dichlororhodamine dyes); U.S. Pat. No. 4,318,846 (ether-substituted fluorescein dyes); U.S. Pat. No. 5,800,996 (energy transfer dyes); U.S. Pat. No. 5,066,580 (xanthine dyes); and U.S. Pat. No. 5,688,648 (energy transfer dyes). Labelling can also be carried out with quantum dots, as described in U.S. Pat. Nos. 6,322,901, 6,576,291, 6,423,551, 6,251,303, 6,319,426, 6,426,513, 6,444,143, 5,990,479, 6,207,392, US 2002/0045045 and US 2003/0017264. As used herein, the term "fluorescent label" comprises a signaling moiety that conveys information through the fluorescent absorption and/or emission properties of one or more molecules. Exemplary fluorescent properties comprise fluorescence intensity, fluorescence lifetime, emission spectrum characteristics and energy transfer.

Examples of commercially available fluorescent nucleotide analogues readily incorporated into nucleotide and/or polynucleotide sequences comprise, but are not limited to, Cy3-dCTP, Cy3-dUTP, Cy5-dCTP, Cy5-dUTP (Amersham Biosciences, Piscataway, N.J.), fluorescein-12-dUTP, tetramethylrhodamine-6-dUTP, TEXAS RED™-5-dUTP, CASCADE BLUE™-7-dUTP, BODIPY™ TMFL-14-dUTP, BODIPY™ TMR-14-dUTP, BODIPY™ TMTR-14-dUTP, RHOD AMINE GREEN™-5-dUTP, OREGON GREENR™ 488-5-dUTP, TEXAS RED™-12-dUTP, BODIPY™ 630/650-14-dUTP, BODIPY™ 650/665-14-dUTP, ALEXA FLUOR™ 488-5-dUTP, ALEXA FLUOR™ 532-5-dUTP, ALEXA FLUOR™ 568-5-dUTP, ALEXA FLUOR™ 594-5-dUTP, ALEXA FLUOR™ 546-14-dUTP, fluorescein-12-UTP, tetramethylrhodamine-6-UTP, TEXAS RED™-5-UTP, mCherry, CASCADE BLUE™-7-UTP, BODIPY™ FL-14-UTP, BODIPY™ TMR-14-UTP, BODIPY™ TR-14-UTP, RHOD AMINE GREEN™-5-UTP, ALEXA FLUOR™ 488-5-UTP, and ALEXA FLUOR™ 546-14-UTP (Molecular Probes, Inc. Eugene, Oreg.). Methods for custom synthesis of nucleotides having other fluorophores include those described in Henegariu et al. (2000) Nature Biotechnol. 18:345, incorporated herein by reference in its entirety.

Other fluorophores available for post-synthetic attachment comprise, but are not limited to, ALEXA FLUOR™ 350, ALEXA FLUOR™ 532, ALEXA FLUOR™ 546, ALEXA FLUOR™ 568, ALEXA FLUOR™ 594, ALEXA FLUOR™ 647, BODIPY™ 493/503, BODIPY™ FL, BODIPY™ R6G, BODIPY 530/550, BODIPY™ TMR, BODIPY™ 558/568, BODIPY™ 558/568, BODIPY™ 564/570, BODIPY™ 576/589, BODIPY™ 581/591, BODIPY™ 630/650, BODIPY™ 650/665, Cascade Blue™, Cascade Yellow™, Dansyl, lissamine rhodamine B, Marina Blue™, Oregon Green™ 488, Oregon Green™ 514, Pacific Blue™, rhodamine 6G, rhodamine green, rhodamine red, tetramethyl rhodamine, Texas Red™ (available from Molecular Probes, Inc., Eugene, Oreg.), Cy2, Cy3.5, Cy5.5, and Cy7 (Amersham Biosciences, Piscataway, N.J.). FRET tandem fluorophores may also be used, comprising, but not limited to, PerCP-Cy5.5, PE-Cy5, PE-Cy5.5, PE-Cy7, PE-Texas Red, APC-Cy7, PE-Alexa™ dyes (610, 647, 680), and APC-Alexa™ dyes.

In some cases, metallic silver or gold particles may be used to enhance signal from fluorescently labeled nucleotide and/or polynucleotide sequences (Lakowicz et al. (2003) Bio Techniques 34:62).

Biotin, or a derivative thereof, may also be used as a label on a nucleotide and/or a polynucleotide sequence, and subsequently bound by a detectably labeled avidin/streptavidin derivative (e.g., phycoerythrin-conjugated streptavidin), or a detectably labeled anti-biotin antibody. Digoxigenin may be incorporated as a label and subsequently bound by a detectably labeled anti-digoxigenin antibody (e.g., fluoresceinated anti-digoxigenin). An aminoallyl-dUTP residue may be incorporated into a polynucleotide sequence and subsequently coupled to an N-hydroxy succinimide (NHS) derivatized fluorescent dye. In general, any member of a conjugate pair may be incorporated into a detection polynucleotide provided that a detectably labeled conjugate partner can be bound to permit detection. As used herein, the term antibody refers to an antibody molecule of any class, or any sub-fragment thereof, such as a Fab.

Other suitable labels for a polynucleotide sequence may comprise fluorescein (FAM), digoxigenin, dinitrophenol (DNP), dansyl, biotin, bromodeoxyuridine (BrdU), hexahistidine (6×His), and phosphor-amino acids (e.g., P-tyr, P-ser, P-thr). In some embodiments the following hapten/antibody pairs are used for detection, in which each of the antibodies is derivatized with a detectable label: biotin/a-biotin, digoxigenin/a-digoxigenin, dinitrophenol (DNP)/a-DNP, 5-Carboxyfluorescein (FAM)/a-FAM.

In some embodiments, a nucleotide and/or an polynucleotide sequence can be indirectly labeled, especially with a hapten that is then bound by a capture agent, e.g., as disclosed in U.S. Pat. Nos. 5,344,757, 5,702,888, 5,354,657, 5,198,537 and 4,849,336, and PCT publication WO 91/17160. Many different hapten-capture agent pairs are available for use. Exemplary haptens comprise, but are not limited to, biotin, des-biotin and other derivatives, dinitrophenol, dansyl, fluorescein, Cy5, and digoxigenin. For biotin, a capture agent may be avidin, streptavidin, or antibodies. Antibodies may be used as capture agents for the other haptens (many dye-antibody pairs being commercially available, e.g., Molecular Probes, Eugene, Oreg.).

In some aspects, the analysis and/or sequence determination can be carried out at room temperature for best preservation of tissue morphology with low background noise and error reduction. In some embodiments, the analysis and/or sequence determination comprises eliminating error accumulation as sequencing proceeds.

In some embodiments, the analysis and/or sequence determination involves washing to remove unbound polynucleotides, thereafter revealing a fluorescent product for imaging.

In some aspects, the detecting involves using detection methods such as flow cytometry; sequencing; probe binding and electrochemical detection; pH alteration; catalysis induced by enzymes bound to DNA tags; quantum entanglement; Raman spectroscopy; terahertz wave technology; and/or scanning electron microscopy. In some aspects, the flow cytometry is mass cytometry or fluorescence-activated flow cytometry. In some aspects, the detecting comprises performing microscopy, scanning mass spectrometry or other imaging techniques described herein. In such aspects, the detecting comprises determining a signal, e.g., a fluorescent signal.

In some aspects, the detection (comprising imaging) is carried out using any of a number of different types of microscopy, e.g., confocal microscopy, two-photon microscopy, light-field microscopy, intact tissue expansion microscopy, and/or CLARITY™_optimized light sheet microscopy (COLM).

In some embodiments, fluorescence microscopy is used for detection and imaging of the detection probe. In some aspects, a fluorescence microscope is an optical microscope that uses fluorescence and phosphorescence instead of, or in addition to, reflection and absorption to study properties of organic or inorganic substances. In fluorescence microscopy, a sample is illuminated with light of a wavelength which excites fluorescence in the sample. The fluoresced light, which is usually at a longer wavelength than the illumination, is then imaged through a microscope objective. Two filters may be used in this technique; an illumination (or excitation) filter which ensures the illumination is near monochromatic and at the correct wavelength, and a second emission (or barrier) filter which ensures none of the excitation light source reaches the detector. Alternatively, these functions may both be accomplished by a single dichroic filter. The "fluorescence microscope" comprises any microscope that uses fluorescence to generate an image, whether it is a more simple set up like an epifluorescence microscope, or a more complicated design such as a confocal microscope, which uses optical sectioning to get better resolution of the fluorescent image.

In some embodiments, confocal microscopy is used for detection and imaging of the detection probe. Confocal microscopy uses point illumination and a pinhole in an optically conjugate plane in front of the detector to eliminate out-of-focus signal. As only light produced by fluorescence very close to the focal plane can be detected, the image's optical resolution, particularly in the sample depth direction, is much better than that of wide-field microscopes. However, as much of the light from sample fluorescence is blocked at the pinhole, this increased resolution is at the cost of decreased signal intensity—so long exposures are often required. As only one point in the sample is illuminated at a time, 2D or 3D imaging requires scanning over a regular raster (e.g., a rectangular pattern of parallel scanning lines) in the specimen. The achievable thickness of the focal plane is defined mostly by the wavelength of the used light divided by the numerical aperture of the objective lens, but also by the optical properties of the specimen. The thin optical sectioning possible makes these types of microscopes particularly good at 3D imaging and surface profiling of samples. CLARITY™-optimized light sheet microscopy (COLM) provides an alternative microscopy for fast 3D imaging of large clarified samples. COLM interrogates large immunostained tissues, permits increased speed of acquisition and results in a higher quality of generated data.

Other types of microscopy that can be employed comprise bright field microscopy, oblique illumination microscopy, dark field microscopy, phase contrast, differential interference contrast (DIC) microscopy, interference reflection microscopy (also known as reflected interference contrast, or RIC), single plane illumination microscopy (SPIM), super-resolution microscopy, laser microscopy, electron microscopy (EM), Transmission electron microscopy (TEM), Scanning electron microscopy (SEM), reflection electron microscopy (REM), Scanning transmission electron microscopy (STEM) and low-voltage electron microscopy (LVEM), scanning probe microscopy (SPM), atomic force microscopy (ATM), ballistic electron emission microscopy (BEEM), chemical force microscopy (CFM), conductive atomic force microscopy (C-AFM), electrochemical scanning tunneling microscope (ECS™), electrostatic force microscopy (EFM), fluidic force microscope (FluidFM), force modulation microscopy (FMM), feature-oriented scanning probe microscopy (FOSPM), kelvin probe force microscopy (KPFM), magnetic force microscopy (MFM), magnetic resonance force microscopy (MRFM), near-field scanning optical microscopy (NSOM) (or SNOM, scanning near-field optical microscopy, SNOM, Piezoresponse Force Microscopy (PFM), PS™, photon scanning tunneling microscopy (PS™), PTMS, photothermal microspectroscopy/microscopy (PTMS), SCM, scanning capacitance microscopy (SCM), SECM, scanning electrochemical microscopy (SECM), SGM, scanning gate microscopy (SGM), SHPM, scanning Hall probe microscopy (SHPM), SICM, scanning ion-conductance microscopy (SICM), SPSM spin polarized scanning tunneling microscopy (SPSM), SSRM, scanning spreading resistance microscopy (SSRM), SThM, scanning thermal microscopy (SThM), STM, scanning tunneling microscopy (STM), STP, scanning tunneling potentiometry (STP), SVM, scanning voltage microscopy (SVM), and synchrotron x-ray scanning tunneling microscopy (SXS™), and intact tissue expansion microscopy (exM).

In some embodiments, sequence determination (e.g., sequencing and/or sequence detection using probe hybridization) can be performed in situ. In situ sequence determination can involve incorporation of a labeled nucleotide (e.g., fluorescently labeled mononucleotides or dinucleotides) in a sequential, template-dependent manner or hybridization of a labeled primer (e.g., a labeled random hexamer) to a nucleic acid template such that the identities (e.g., nucleotide sequence) of the incorporated nucleotides or labeled primer extension products can be determined, and consequently, the nucleotide sequence of the corresponding template nucleic acid. Aspects of in situ sequence determination are described, for example, in Mitra et al., (2003) *Anal. Biochem.* 320, 55-65, and Lee et al., (2014) *Science,* 343(6177), 1360-1363. In addition, examples of methods and systems for performing in situ sequence determination are described in US 2016/0024555, US 2019/0194709, and in U.S. Pat. Nos. 10,138,509, 10,494,662 and 10,179,932. Exemplary techniques for in situ sequence determination comprise, but are not limited to, STARmap (described for example in Wang et al., (2018) *Science,* 361(6499) 5691), MERFISH (described for example in Moffitt, (2016) *Methods in Enzymology,* 572, 1-49), sequence determination based on probe hybridization (e.g., described for example in Gyllborg et al., Nucleic Acids Res (2020) 48(19):e112, and FISSEQ (described for example in US 2019/0032121).

In some embodiments, sequence determination can be performed by sequencing-by-synthesis (SBS). In some embodiments, a sequencing primer is complementary to sequences at or near the one or more barcode(s). In such embodiments, sequencing-by-synthesis can comprise reverse transcription and/or amplification in order to generate a template sequence from which a primer sequence can bind. Exemplary SBS methods comprise those described for example, but not limited to, US 2007/0166705, US 2006/0188901, U.S. Pat. No. 7,057,026, US 2006/0240439, US 2006/0281109, US 2011/005986, US 2005/0100900, U.S. Pat. No. 9,217,178, US 2009/0118128, US 2012/0270305, US 2013/0260372, and US 2013/0079232.

In some embodiments, sequence determination of nucleic acids (e.g., nucleic acids such as probes or RCA products comprising barcode sequences) can be performed by sequential hybridization of probes (e.g., sequencing by hybridization and/or sequential in situ fluorescence hybridization). Sequential hybridization can involve sequential hybridization of detectable probes comprising an oligonucleotide and a detectable label. In some embodiments, a method disclosed herein comprises sequential hybridization of the detectable probes disclosed herein, including detectably labeled probes (e.g., fluorophore conjugated oligonucleotides) and/or probes that are not detectably labeled per se but are capable of binding (e.g., via nucleic acid hybridization) and being detected by detectably labeled probes. Exemplary methods comprising sequential fluorescence hybridization of detectable probes are described in US 2019/0161796, US 2020/0224244, US 2022/0010358, US 2021/0340618, and WO 2021/138676, all of which are incorporated herein by reference. In some embodiments, the methods provided herein can include analyzing identifier sequences (e.g., analyte sequences or barcode sequences) by sequential hybridization and detection with a plurality of labeled probes (e.g., detection oligonucleotides).

In some embodiments, sequence determination comprises contacting the biological sample with one or more intermediate probes that directly or indirectly hybridize to a rolling circle amplification product, wherein the one or more intermediate probes are detectable using one or more detectably-labeled probes, and dehybridizing the one or more intermediate probes and/or the one or more detectably-labeled probes from the rolling circle amplification product. In some embodiments, the one or more intermediate probes comprise one or more overhang regions (e.g., a 5' and/or 3' end of the probe that does not hybridize to the rolling circle amplification product). A probe comprising a single overhang region may be referred to as an "L-shaped probe," and a probe comprising two overhangs may be referred to as a "U-shaped probe." In some cases, the overhang region comprises a binding region for binding one or more detectably-labeled probes. In some embodiments, the detecting comprises contacting the biological sample with a pool of intermediate probes corresponding to different barcode sequences or portions thereof, and a pool of detectably-labeled probes corresponding to different detectable labels. In some embodiments, the biological sample is sequentially contacted with different pools of intermediate probes. In some instances, a common or universal pool of detectably-labeled probes is used in a plurality of sequential hybridization steps (e.g., with different pools of intermediate probes).

In some embodiments, provided herein are methods for in situ analysis of analytes in a sample using sequential probe hybridization. In some aspects provided herein is a method for analyzing a biological sample, comprising: a) generating a rolling circle amplification product (RCP) of a circularized probe (e.g., a composite probe described in Section III), the RCP comprising an identifier sequence such as a barcode sequence or analyte sequence, wherein the identifier sequence is associated with an analyte of interest and is assigned a signal code sequence; b) contacting the biological sample with a first intermediate probe (e.g., an L-probe) and a first detectably labeled probe to generate a first complex comprising the first intermediate probe hybridized to the RCP and the first detectably labeled probe hybridized to the first intermediate probe, wherein the first intermediate probe comprises (i) a recognition sequence (e.g., a target-binding sequence) complementary to the identifier sequence (e.g., barcode sequence or analyte sequence) and (ii) a first landing sequence (e.g., an overhang sequence), and wherein the first detectably labeled probe comprises a sequence complementary to the first landing sequence; c) detecting a first signal associated with the first detectably labeled probe, wherein the first signal corresponds to a first signal code in the signal code sequence; d) contacting the biological sample with a second intermediate probe (e.g., an L-probe) and a second detectably labeled probe to generate a second complex comprising the second intermediate probe hybridized to the RCP and the second detectably labeled probe hybridized to the second intermediate probe, wherein the second intermediate probe comprises (i) a recognition sequence (e.g., a target-binding sequence) complementary to the identifier sequence (e.g., barcode sequence or analyte sequence) and (ii) a second landing sequence (e.g., an overhang sequence), and wherein the second detectably labeled probe comprises a sequence complementary to the second landing sequence; and e) detecting a second signal associated with the second detectably labeled probe, wherein the second signal corresponds to a second signal code in the signal code sequence, wherein the signal code sequence comprising the first signal code and the second signal code is determined at a location in the biological sample, thereby decoding the identifier sequence (e.g., barcode sequence or analyte sequence) and identifying the analyte of interest at the location in the biological sample. In some embodiments, the detectable label of the first detectably labeled probe and the detectable label of the second detectably labeled probe are the same. In some embodiments, the detectable labels of the first detectably labeled probe and the second detectably labeled probe are different. In some embodiments, the first signal code and the second signal code are the same. In some embodiments, the first signal code and the second signal code are different.

In some embodiments, the first intermediate probe (e.g., first L-probe), the second intermediate probe (e.g., second L-probe), and one or more subsequent probes (e.g., subsequent intermediate probe such as subsequent L-probes) are contacted with the biological sample sequentially in a predetermined sequence which corresponds to the signal code sequence assigned to the identifier sequence (e.g., barcode sequence or analyte sequence), wherein the one or more subsequent probes each comprises (i) a recognition sequence complementary to the identifier sequence (e.g., barcode sequence or analyte sequence) and (ii) an overhang sequence complementary to a detectably labeled probe of a pool (e.g., a universal pool across different cycles of probe hybridization) of detectably labeled probes. In some embodiments, the biological sample is contacted with the first intermediate probe before the second intermediate probe and one or more subsequent probes. In some embodiments, the biological sample is contacted with the second after the first intermediate probe and before and one or more subsequent probes. In some embodiments, the biological sample is contacted with the one or more subsequent probes after the first intermediate probe. In some embodiments, the biological sample is contacted with the one or more subsequent probes after the first intermediate probe and the second intermediate probe.

In some embodiments, the first detectably labeled probe and the second detectably labeled probe are in the pool of detectably labeled probes. A pool of detectably labeled probes may comprises at least two detectably labeled probes, and may be used for multiplexing analyses of two or more target analytes (e.g., target nucleic acids) in a biological sample. In some embodiments, the contacting in b) comprises contacting the biological sample with the universal pool of detectably labeled probes, and the contacting in d) comprises contacting the biological sample with the universal pool of detectably labeled probes. In some embodiments, the universal pool of detectably labeled probes used in the contacting in b) is the same as the universal pool of detectably labeled probes used in the contacting in d). In some embodiments, the universal pool comprises detectably labeled probes each having a detectable label corresponding to a different nucleic acid sequence for hybridization to a landing sequence (e.g., an overhang sequence) in a probe (e.g., an intermediate probe such as an L-probe). In some embodiments, the number of different detectably labeled probes in the universal pool is four.

In some embodiments, the one or more subsequent probes are contacted with the biological sample to determine signal codes in the signal code sequence until sufficient signal codes have been determined to decode the identifier sequence (e.g., barcode sequence or analyte sequence), thereby identifying the target analyte (e.g., target nucleic acid). In some embodiments, the method further comprises a step of removing the first intermediate probe and/or the first detectably labeled probe from the biological sample before contacting the sample with a subsequent probe and a detectably labeled probe hybridizing to the subsequent probe. In some embodiments, the method further comprises a step of removing the second intermediate probe and/or the second detectably labeled probe from the biological sample, before contacting the sample with a subsequent probe and a detectably labeled probe hybridizing to the subsequent probe.

In some embodiments, the method further comprises identifying multiple different target analytes present at locations (e.g., different locations) in the biological sample. In some embodiments, each different target analyte is assigned a different signal code sequence and is targeted by a circularized probe (e.g., a composite probe described in Section III) comprising a complement of a different barcode sequence of the plurality of barcode sequences. In some embodiments, the number of different probes (e.g., L-probes that have different recognition sequences that bind to the barcode sequences) in each pool of probes is greater than the number of different detectably labeled probes in the universal pool of detectably labeled probes. In some embodiments, the number of different detectably labeled probes in the universal pool is four. In some embodiments, the number of different probes in each pool of probes (e.g., L-probes) is about 10, about 20, about 30, about 40, about 50, about 100, about 200, about 500, about 1,000, or more. In some embodiments, the number of different recognition sequences (e.g., recognition sequences that bind to the barcode sequences) of probes in each pool of probes in at least about 10, such as at least any of about 20, 30, 40, 50, 100, 200, 500, 1,000, or more.

In some embodiments, sequence determination can be performed using single molecule sequencing by ligation. Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. Aspects and features involved in sequencing by ligation are described, for example, in Shendure et al. *Science* (2005), 309: 1728-1732, and in U.S. Pat. Nos. 5,599,675; 5,750,341; 6,969,488; 6,172,218; and 6,306,597, each incorporated herein by reference in its entirety.

In some embodiments, the barcodes of the probes (e.g., the first probe, the second probe, and/or the composite probe disclosed herein) are targeted by detectably labeled detection oligonucleotides, such as fluorescently labeled oligonucleotides. In some embodiments, one or more decoding schemes are used to decode the signals, such as fluorescence, for sequence determination. In any of the embodiments herein, barcodes (e.g., primary and/or secondary barcode sequences) can be analyzed (e.g., detected or sequenced) using any suitable methods or techniques, comprising those described herein, such as in situ sequencing, targeted in situ sequencing, fluorescent in situ sequencing (FISSEQ), or spatially-resolved transcript amplicon readout mapping (STARmap). In some embodiments, the methods provided herein comprise analyzing the barcodes by sequential hybridization and detection with a plurality of labelled probes (e.g., detection oligonucleotides). Exemplary decoding schemes are described in Eng et al., "Transcriptome-scale Super-Resolved Imaging in Tissues by RNA SeqFISH+," *Nature* 568(7751):235-239 (2019); Chen et al., "Spatially resolved, highly multiplexed RNA profiling in single cells," *Science;* 348(6233):aaa6090 (2015); Gyllborg et al., Nucleic Acids Res (2020) 48(19):e112; U.S. Pat. No. 10,457,980 B2; U.S. Pat. No. 10,510,435 B2; US 2016/0369329 A1; WO 2018/026873 A1; and US 2017/0220733 A1, all of which are incorporated by reference in their entirety. In some embodiments, these assays enable signal amplification, combinatorial decoding, and error correction schemes at the same time.

In some embodiments, nucleic acid hybridization can be used for sequencing. These methods utilize labeled nucleic acid decoder probes that are complementary to at least a portion of a barcode sequence. Multiplex decoding can be performed with pools of many different probes with distinguishable labels. Non-limiting examples of nucleic acid hybridization sequencing are described for example in U.S. Pat. No. 8,460,865, and in Gunderson et al., *Genome Research* 14:870-877 (2004).

In some embodiments, real-time monitoring of DNA polymerase activity can be used during sequencing. For example, nucleotide incorporations can be detected through fluorescence resonance energy transfer (FRET), as described for example in Levene et al., *Science* (2003), 299, 682-686, Lundquist et al., *Opt. Lett.* (2008), 33, 1026-1028, and Korlach et al., *Proc. Natl. Acad. Sci. USA* (2008), 105, 1176-1181.

VI. Compositions and Kits

Also provided herein are kits, for example comprising one or more polynucleotides, e.g., any described in Section III, and reagents for performing the methods provided herein, for example reagents required for one or more steps comprising hybridization, ligation, amplification, detection, sequencing, and/or sample preparation as described herein. In some embodiments, the kit further comprises a target nucleic acid, e.g., any described in Section II. In some embodiments, any or all of the polynucleotides are DNA molecules. In some embodiments, the target nucleic acid is a messenger RNA molecule. In some embodiments, the kit further comprises one or more ligases, for instance for forming a circular composite probe from the split probe pair. In some embodiments, the kit further comprises a polymerase, for instance for performing amplification of a circularized composite probe, e.g., using any of the methods described in Section IV. In some embodiments, the kit further comprises a primer for amplification. In some embodiments, the kit further comprises one or more detection reagents such as those disclosed in Section V.

In some embodiments, disclosed herein is a kit for analyzing a biological sample, comprising: (a) a first probe comprising a first hybridization region and a first portion of a barcode sequence, and (b) a second probe comprising a second hybridization region and a second portion of the barcode sequence, wherein the first and second hybridization regions are complementary to adjacent target sequences in a target RNA molecule, and the barcode sequence corresponds to the target RNA molecule. In some embodiments, the kit can further comprise (c) a splint that hybridizes to the first and second probes for ligation of the first and second portions to form a composite probe comprising the barcode sequence. In some embodiments, the first and second portions of the barcode sequence each can be no more than 10 nucleotides in length. In some embodiments, the barcode sequence can be at least 15 nucleotides in length.

In some embodiments, disclosed herein is a kit for analyzing a biological sample, comprising: (a) a plurality of first probes, (b) a plurality of second probes, wherein the first and second hybridization regions of each first and second probes hybridize to corresponding target sequences in a target nucleic acid molecule. In some embodiments, the kit can further comprise (c) a plurality of splints that hybridize each of the first and second probes (each pair of first and second probes) to form a composite probe. In some embodiments, each composite probe comprises the first and second portions of the barcode region of the first and second probes, respectively. In some embodiments, each first and second probe is provided with a corresponding unique splint molecule. In some aspects, a pool of first probes, second probes, and splints are provided to target a plurality of target nucleic acid molecules. For example, the pool comprises at least 2, at least 5, at least 10, at least 25, at least 50, at least 75, at least 100, at least 300, at least 1,000, at least 3,000, at least 10,000, at least 30,000, at least 50,000, at least 100,000, at least 250,000, at least 500,000, or at least 1,000,000 distinguishable first probes and at least 2, at least 5, at least 10, at least 25, at least 50, at least 75, at least 100, at least 300, at least 1,000, at least 3,000, at least 10,000, at least 30,000, at least 50,000, at least 100,000, at least 250,000, at least 500,000, or at least 1,000,000 distinguishable second probes. In some embodiments, the pool further comprises at least 2, at least 5, at least 10, at least 25, at least 50, at least 75, at least 100, at least 300, at least 1,000, at least 3,000, at least 10,000, at least 30,000, at least 50,000, at least 100,000, at least 250,000, at least 500,000, or at least 1,000,000 distinguishable splints for each corresponding pair of first and second probes.

The various components of the kit may be present in separate containers or certain compatible components may be pre-combined into a single container. In some embodiments, the kits further contain instructions for using the components of the kit to practice the provided methods.

In some embodiments, the kits can contain reagents and/or consumables required for performing one or more steps of the provided methods. In some embodiments, the kits contain reagents for fixing, embedding, and/or permeabilizing the biological sample. In some embodiments, the kits contain reagents, such as enzymes and buffers for ligation and/or amplification, such as ligases and/or polymerases. In some aspects, the kit can also comprise any of the reagents described herein, e.g., wash buffer and ligation buffer. In some embodiments, the kits contain reagents for detection and/or sequencing, such as barcode detection probes or detectable labels. In some embodiments, the kits optionally contain other components, for example nucleic acid primers, enzymes and reagents, buffers, nucleotides, modified nucleotides, reagents for additional assays.

In some aspects, the provided embodiments can be applied in an in situ method of analyzing nucleic acid sequences, such as an in situ transcriptomic analysis or in situ sequencing, for example from intact tissues or samples in which the spatial information has been preserved. In some aspects, the embodiments can be applied in an imaging or detection method for multiplexed nucleic acid analysis. In some aspects, the provided embodiments can be used to identify or detect regions of interest in target nucleic acids.

In some embodiments, the region of interest comprises a single-nucleotide polymorphism (SNP). In some embodiments, the region of interest comprises is a single-nucleotide variant (SNV). In some embodiments, the region of interest comprises a single-nucleotide substitution. In some embodiments, the region of interest comprises a point mutation. In some embodiments, the region of interest comprises a single-nucleotide insertion.

In some aspects, the embodiments can be applied in investigative and/or diagnostic applications, for example, for characterization or assessment of particular cell or a tissue from a subject. Applications of the provided method can comprise biomedical research and clinical diagnostics. For example, in biomedical research, applications comprise, but are not limited to, spatially resolved gene expression analysis for biological investigation or drug screening. In clinical diagnostics, applications comprise, but are not limited to, detecting gene markers such as disease, immune responses, bacterial or viral DNA/RNA for patient samples.

In some aspects, the embodiments can be applied to visualize the distribution of genetically encoded markers in whole tissue at subcellular resolution, for example, chromosomal abnormalities (inversions, duplications, translocations, etc.), loss of genetic heterozygosity, the presence of gene alleles indicative of a predisposition towards disease or good health, likelihood of responsiveness to therapy, or in personalized medicine or ancestry.

VIII. Terminology

Specific terminology is used throughout this disclosure to explain various aspects of the apparatus, systems, methods, and compositions that are described.

Having described some illustrative embodiments of the present disclosure, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the present disclosure. In particular, although many of the examples presented herein involve specific combinations of method acts or system elements, it should be understood that those acts and those elements may be combined in other ways to accomplish the same objectives.

As used herein, the singular forms "a," "an," and "the" include plural referents unless the context clearly dictates otherwise. For example, "a" or "an" means "at least one" or "one or more."

The term "about" as used herein refers to the usual error range for the respective value readily known to the skilled person in this technical field. Reference to "about" a value or parameter herein includes (and describes) embodiments that are directed to that value or parameter per se.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Similarly, use of a), b), etc., or i), ii), etc. does not by itself connote any priority, precedence, or order of steps in the claims. Similarly, the use of these terms in the specification does not by itself connote any required priority, precedence, or order.

(i) Barcode

A "barcode" is a label, or identifier, that conveys or is capable of conveying information (e.g., information about an analyte in a sample and/or a probe). A barcode can be part of an analyte, or independent of an analyte. A barcode can be attached to an analyte. A particular barcode can be unique relative to other barcodes.

Barcodes can have a variety of different formats. For example, barcodes can include polynucleotide barcodes, random nucleic acid and/or amino acid sequences, and synthetic nucleic acid and/or amino acid sequences.

Barcodes can spatially-resolve molecular components found in biological samples, for example, at single-cell resolution. In some embodiments, a barcode includes two or more sub-barcodes that together function as a single barcode. For example, a polynucleotide barcode can include two or more polynucleotide sequences (e.g., sub-barcodes) that are separated by one or more non-barcode sequences.

(ii) Nucleic Acid and Nucleotide

The terms "nucleic acid" and "nucleotide" are intended to be consistent with their use in the art and to include naturally-occurring species or functional analogs thereof. Particularly useful functional analogs of nucleic acids are capable of hybridizing to a nucleic acid in a sequence-specific fashion (e.g., capable of hybridizing to two nucleic acids such that ligation can occur between the two hybridized nucleic acids) or are capable of being used as a template for replication of a particular nucleotide sequence. Naturally-occurring nucleic acids generally have a backbone containing phosphodiester bonds. An analog structure can have an alternate backbone linkage. Naturally-occurring nucleic acids generally have a deoxyribose sugar (e.g., found in deoxyribonucleic acid (DNA)) or a ribose sugar (e.g. found in ribonucleic acid (RNA)).

A nucleic acid can contain nucleotides having any of a variety of analogs of the sugar moieties. A nucleic acid can include native or non-native nucleotides. In this regard, a native deoxyribonucleic acid can have one or more bases selected from the group consisting of adenine (A), thymine (T), cytosine (C), or guanine (G), and a ribonucleic acid can have one or more bases selected from the group consisting of uracil (U), adenine (A), cytosine (C), or guanine (G).

(iii) Probe and Target

A "probe" or a "target," when used in reference to a nucleic acid or sequence of a nucleic acids, is intended as a semantic identifier for the nucleic acid or sequence in the context of a method or composition, and does not limit the structure or function of the nucleic acid or sequence beyond what is expressly indicated.

(iv) Oligonucleotide and Polynucleotide

The terms "oligonucleotide" and "polynucleotide" are used interchangeably to refer to a single-stranded multimer of nucleotides from about 2 to about 500 nucleotides in length. Oligonucleotides can be synthetic, made enzymatically (e.g., via polymerization), or using a "split-pool" method. Oligonucleotides can include ribonucleotide monomers (e.g., can be oligoribonucleotides) and/or deoxyribonucleotide monomers (e.g., oligodeoxyribonucleotides). In some examples, oligonucleotides can include a combination of both deoxyribonucleotide monomers and ribonucleotide monomers in the oligonucleotide (e.g., random or ordered combination of deoxyribonucleotide monomers and ribonucleotide monomers). An oligonucleotide can be 4 to 10, 10 to 20, 21 to 30, 31 to 40, 41 to 50, 51 to 60, 61 to 70, 71 to 80, 80 to 100, 100 to 150, 150 to 200, 200 to 250, 250 to 300, 300 to 350, 350 to 400, or 400-500 nucleotides in length, for example. Oligonucleotides can include one or more functional moieties that are attached (e.g., covalently or non-covalently) to the multimer structure. For example, an oligonucleotide can include one or more detectable labels (e.g., a radioisotope or fluorophore).

(v) Hybridizing, Hybridize, Annealing, and Anneal

The terms "hybridizing," "hybridize," "annealing," and "anneal" are used interchangeably in this disclosure, and refer to the pairing of substantially complementary or complementary nucleic acid sequences within two different molecules. Pairing can be achieved by any process in which a nucleic acid sequence joins with a substantially or fully complementary sequence through base pairing to form a hybridization complex. For purposes of hybridization, two nucleic acid sequences are "substantially complementary" if at least 60% (e.g., at least 70%, at least 80%, or at least 90%) of their individual bases are complementary to one another.

(vi) Primer

A "primer" is a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence.

(vii) Primer Extension

Two nucleic acid sequences can become linked (e.g., hybridized) by an overlap of their respective terminal complementary nucleic acid sequences (e.g., 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

(viii) Nucleic Acid Extension

A "nucleic acid extension" generally involves incorporation of one or more nucleic acids (e.g., A, G, C, T, U, nucleotide analogs, or derivatives thereof) into a molecule (such as, but not limited to, a nucleic acid sequence) in a template-dependent manner, such that consecutive nucleic acids are incorporated by an enzyme (such as a polymerase or reverse transcriptase), thereby generating a newly synthesized nucleic acid molecule. For example, a primer that hybridizes to a complementary nucleic acid sequence can be used to synthesize a new nucleic acid molecule by using the complementary nucleic acid sequence as a template for nucleic acid synthesis. Similarly, a 3' polyadenylated tail of an mRNA transcript that hybridizes to a poly (dT) sequence can be used as a template for single-strand synthesis of a corresponding cDNA molecule.

(ix) PCR Amplification

A "PCR amplification" refers to the use of a polymerase chain reaction (PCR) to generate copies of genetic material, including DNA and RNA sequences. Suitable reagents and conditions for implementing PCR are described, for example, in U.S. Pat. Nos. 4,683,202, 4,683,195, 4,800,159, 4,965,188, and 5,512,462, the entire contents of each of which are incorporated herein by reference. In a typical PCR amplification, the reaction mixture includes the genetic material to be amplified, an enzyme, one or more primers that are employed in a primer extension reaction, and reagents for the reaction. The oligonucleotide primers are of sufficient length to provide for hybridization to complementary genetic material under annealing conditions. The length of the primers generally depends on the length of the amplification domains, but will typically be at least 4 bases, at least 5 bases, at least 6 bases, at least 8 bases, at least 9 bases, at least 10 base pairs (bp), at least 11 bp, at least 12 bp, at least 13 bp, at least 14 bp, at least 15 bp, at least 16 bp, at least 17 bp, at least 18 bp, at least 19 bp, at least 20 bp, at least 25 bp, at least 30 bp, at least 35 bp, and can be as long as 40 bp or longer, where the length of the primers will generally range from 18 to 50 bp. The genetic material can be contacted with a single primer or a set of two primers (forward and reverse primers), depending upon whether primer extension, linear or exponential amplification of the genetic material is desired.

In some embodiments, the PCR amplification process uses a DNA polymerase enzyme. The DNA polymerase activity can be provided by one or more distinct DNA polymerase enzymes. In certain embodiments, the DNA polymerase enzyme is from a bacterium, e.g., the DNA polymerase enzyme is a bacterial DNA polymerase enzyme. For instance, the DNA polymerase can be from a bacterium of the genus *Escherichia*, *Bacillus*, *Thermophilus*, or *Pyrococcus*.

Suitable examples of DNA polymerases that can be used include, but are not limited to: E. coli DNA polymerase I, Bsu DNA polymerase, Bst DNA polymerase, Taq DNA polymerase, VENT™ DNA polymerase, DEEPVENT™ DNA polymerase, LongAmp® Taq DNA polymerase, LongAmp® Hot Start Taq DNA polymerase, Crimson LongAmp® Taq DNA polymerase, Crimson Taq DNA polymerase, OneTaq® DNA polymerase, OneTaq® QuickLoad® DNA polymerase, Hemo KlenTaq® DNA polymerase, REDTaq® DNA polymerase, Phusion® DNA polymerase, Phusion® High-Fidelity DNA polymerase, Platinum™ Pfx DNA polymerase, AccuPrime™ Pfx DNA polymerase, Phi29 DNA polymerase, Klenow fragment, Pwo DNA polymerase, Pfu DNA polymerase, T4 DNA polymerase and T7 DNA polymerase enzymes.

The term "DNA polymerase" includes not only naturally-occurring enzymes but also all modified derivatives thereof, including also derivatives of naturally-occurring DNA polymerase enzymes. For instance, in some embodiments, the DNA polymerase can have been modified to remove 5'-3' exonuclease activity. Sequence-modified derivatives or mutants of DNA polymerase enzymes that can be used include, but are not limited to, mutants that retain at least some of the functional, e.g. DNA polymerase activity of the wild-type sequence. Mutations can affect the activity profile of the enzymes, e.g. enhance or reduce the rate of polymerization, under different reaction conditions, e.g. temperature, template concentration, primer concentration, etc. Mutations or sequence-modifications can also affect the exonuclease activity and/or thermostability of the enzyme.

In some embodiments, PCR amplification can include reactions such as, but not limited to, a strand-displacement amplification reaction, a rolling circle amplification reaction, a ligase chain reaction, a transcription-mediated amplification reaction, an isothermal amplification reaction, and/or a loop-mediated amplification reaction.

In some embodiments, PCR amplification uses a single primer that is complementary to the 3' tag of target DNA fragments. In some embodiments, PCR amplification uses a first and a second primer, where at least a 3' end portion of the first primer is complementary to at least a portion of the 3' tag of the target nucleic acid fragments, and where at least a 3' end portion of the second primer exhibits the sequence of at least a portion of the 5' tag of the target nucleic acid fragments. In some embodiments, a 5' end portion of the first primer is non-complementary to the 3' tag of the target nucleic acid fragments, and a 5' end portion of the second primer does not exhibit the sequence of at least a portion of the 5' tag of the target nucleic acid fragments. In some embodiments, the first primer includes a first universal sequence and/or the second primer includes a second universal sequence.

In some embodiments, the PCR amplification products can be ligated to additional sequences using a DNA ligase enzyme. The DNA ligase activity can be provided by one or more distinct DNA ligase enzymes. In some embodiments, the DNA ligase enzyme is from a bacterium, e.g., the DNA ligase enzyme is a bacterial DNA ligase enzyme. In some embodiments, the DNA ligase enzyme is from a virus (e.g., a bacteriophage). For instance, the DNA ligase can be T4

DNA ligase. Other enzymes appropriate for the ligation step include, but are not limited to, Tth DNA ligase, Taq DNA ligase, *Thermococcus* sp. (strain 9oN) DNA ligase (9oN™ DNA ligase, available from New England Biolabs, Ipswich, MA), and Ampligase™ (available from Epicentre Biotechnologies, Madison, WI). Derivatives, e.g. sequence-modified derivatives, and/or mutants thereof, can also be used.

In some embodiments, genetic material is amplified by reverse transcription polymerase chain reaction (RT-PCR). The desired reverse transcriptase activity can be provided by one or more distinct reverse transcriptase enzymes, suitable examples of which include, but are not limited to: M-MLV, MuLV, AMV, HIV, ArrayScript™, MultiScribe™, ThermoScript™ and SuperScript® I, II, III, and IV enzymes. "Reverse transcriptase" includes not only naturally occurring enzymes, but all such modified derivatives thereof, including also derivatives of naturally-occurring reverse transcriptase enzymes.

In addition, reverse transcription can be performed using sequence-modified derivatives or mutants of M-MLV, MuLV, AMV, and HIV reverse transcriptase enzymes, including mutants that retain at least some of the functional, e.g. reverse transcriptase, activity of the wild-type sequence. The reverse transcriptase enzyme can be provided as part of a composition that includes other components, e.g. stabilizing components that enhance or improve the activity of the reverse transcriptase enzyme, such as RNase inhibitor(s), inhibitors of DNA-dependent DNA synthesis, e.g. actinomycin D. Many sequence-modified derivative or mutants of reverse transcriptase enzymes, e.g. M-MLV, and compositions including unmodified and modified enzymes are commercially available, e.g. ArrayScript™, MultiScribe™ ThermoScript™, and SuperScript® I, II, III, and IV enzymes.

Certain reverse transcriptase enzymes (e.g. Avian Myeloblastosis Virus (AMV) Reverse Transcriptase and Moloney Murine Leukemia Virus (M-MuLV, MMLV) Reverse Transcriptase) can synthesize a complementary DNA strand using both RNA (cDNA synthesis) and single-stranded DNA (ssDNA) as a template. Thus, in some embodiments, the reverse transcription reaction can use an enzyme (reverse transcriptase) that is capable of using both RNA and ssDNA as the template for an extension reaction, e.g. an AMV or MMLV reverse transcriptase.

In some embodiments, the quantification of RNA and/or DNA is carried out by real-time PCR (also known as quantitative PCR or qPCR), using techniques such as but not limited to "TAQMAN™" or "SYBR®", or on capillaries ("LightCycler® Capillaries"). In some embodiments, the quantification of genetic material is determined by optical absorbance and with real-time PCR. In some embodiments, the quantification of genetic material is determined by digital PCR. In some embodiments, the genes analyzed can be compared to a reference nucleic acid extract (DNA and RNA) corresponding to the expression (mRNA) and quantity (DNA) in order to compare expression levels of the target nucleic acids.

(x) Antibody

An "antibody" is a polypeptide molecule that recognizes and binds to a complementary target antigen. Antibodies typically have a molecular structure shape that resembles a Y shape. Naturally-occurring antibodies, referred to as immunoglobulins, belong to one of the immunoglobulin classes IgG, IgM, IgA, IgD, and IgE. Antibodies can also be produced synthetically. For example, recombinant antibodies, which are monoclonal antibodies, can be synthesized using synthetic genes by recovering the antibody genes from source cells, amplifying into an appropriate vector, and introducing the vector into a host to cause the host to express the recombinant antibody. In general, recombinant antibodies can be cloned from any species of antibody-producing animal using suitable oligonucleotide primers and/or hybridization probes. Recombinant techniques can be used to generate antibodies and antibody fragments, including non-endogenous species.

Synthetic antibodies can be derived from non-immunoglobulin sources. For example, antibodies can be generated from nucleic acids (e.g., aptamers), and from non-immunoglobulin protein scaffolds (such as peptide aptamers) into which hypervariable loops are inserted to form antigen binding sites. Synthetic antibodies based on nucleic acids or peptide structures can be smaller than immunoglobulin-derived antibodies, leading to greater tissue penetration.

Antibodies can also include affimer proteins, which are affinity reagents that typically have a molecular weight of about 12-14 kDa. Affimer proteins generally bind to a target (e.g., a target protein) with both high affinity and specificity. Examples of such targets include, but are not limited to, ubiquitin chains, immunoglobulins, and C-reactive protein. In some embodiments, affimer proteins are derived from cysteine protease inhibitors, and include peptide loops and a variable N-terminal sequence that provides the binding site.

Antibodies can also refer to an "epitope binding fragment" or "antibody fragment," which as used herein, generally refers to a portion of a complete antibody capable of binding the same epitope as the complete antibody, albeit not necessarily to the same extent. Although multiple types of epitope binding fragments are possible, an epitope binding fragment typically comprises at least one pair of heavy and light chain variable regions (VH and VL, respectively) held together (e.g., by disulfide bonds) to preserve the antigen binding site, and does not contain all or a portion of the Fc region. Epitope binding fragments of an antibody can be obtained from a given antibody by any suitable technique (e.g., recombinant DNA technology or enzymatic or chemical cleavage of a complete antibody), and typically can be screened for specificity in the same manner in which complete antibodies are screened. In some embodiments, an epitope binding fragment comprises an $F(ab')_2$ fragment, Fab' fragment, Fab fragment, Fd fragment, or Fv fragment. In some embodiments, the term "antibody" includes antibody-derived polypeptides, such as single chain variable fragments (scFv), diabodies or other multimeric scFvs, heavy chain antibodies, single domain antibodies, or other polypeptides comprising a sufficient portion of an antibody (e.g., one or more complementarity determining regions (CDRs)) to confer specific antigen binding ability to the polypeptide.

(xi) Label, Detectable Label, and Optical Label

The terms "detectable label," "optical label," and "label" are used interchangeably herein to refer to a directly or indirectly detectable moiety that is associated with (e.g., conjugated to) a molecule to be detected, e.g., a probe or analyte. The detectable label can be directly detectable by itself (e.g., radioisotope labels or fluorescent labels) or, in the case of an enzymatic label, can be indirectly detectable, e.g., by catalyzing chemical alterations of a substrate compound or composition, which substrate compound or composition is directly detectable. Detectable labels can be suitable for small scale detection and/or suitable for high-throughput screening. As such, suitable detectable labels include, but are not limited to, radioisotopes, fluorophores, chemiluminescent compounds, bioluminescent compounds, and dyes.

The detectable label can be qualitatively detected (e.g., optically or spectrally), or it can be quantified. Qualitative detection generally includes a detection method in which the existence or presence of the detectable label is confirmed, whereas quantifiable detection generally includes a detection method having a quantifiable (e.g., numerically reportable) value such as an intensity, duration, polarization, and/or other properties. In some embodiments, the detectable label is bound to a feature or to a probe associated with a feature. For example, detectably labelled features can include a fluorescent, a colorimetric, or a chemiluminescent label (see, for example, Rajeswari et al., *J. Microbiol Methods* 139:22-28, 2017, and Forcucci et al., *J. Biomed Opt.* 10:105010, 2015, the entire contents of each of which are incorporated herein by reference).

In some embodiments, a plurality of detectable labels can be attached to a feature, probe, or composition to be detected. For example, detectable labels can be incorporated during nucleic acid polymerization or amplification (e.g., Cy5@-labelled nucleotides, such as Cy5®-dCTP). Any suitable detectable label can be used. In some embodiments, the detectable label is a fluorophore. For example, the fluorophore can be from a group that includes: 7-AAD (7-Aminoactinomycin D), Acridine Orange (+DNA), Acridine Orange (+RNA), Alexa Fluor® 350, Alexa Fluor® 430, Alexa Fluor® 488, Alexa Fluor® 532, Alexa Fluor® 546, Alexa Fluor® 555, Alexa Fluor® 568, Alexa Fluor® 594, Alexa Fluor® 633, Alexa Fluor® 647, Alexa Fluor® 660, Alexa Fluor® 680, Alexa Fluor® 700, Alexa Fluor® 750, Allophycocyanin (APC), AMCA/AMCA-X, 7-Aminoactinomycin D (7-AAD), 7-Amino-4-methylcoumarin, 6-Aminoquinoline, Aniline Blue, ANS, APC-Cy7, ATTO-TAG™ CBQCA, ATTO-TAG™ FQ, Auramine O-Feulgen, BCECF (high pH), BFP (Blue Fluorescent Protein), BFP/GFP FRET, BOBO™-1/BO-PRO™-1, BOBO™-3/BO-PRO™-3, BODIPY® FL, BODIPY® TMR, BODIPY® TR-X, BODIPY® 530/550, BODIPY® 558/568, BODIPY® 564/570, BODIPY® 581/591, BODIPY® 630/650-X, BODIPY® 650-665-X, BTC, Calcein, Calcein Blue, Calcium Crimson™, Calcium Green-1™, Calcium Orange™, Calcofluor® White, 5-Carboxyfluoroscein (5-FAM), 5-Carboxynaphthofluoroscein, 6-Carboxyrhodamine 6G, 5-Carboxytetramethylrhodamine (5-TAMRA), Carboxy-X-rhodamine (5-ROX), Cascade Blue®, Cascade Yellow™, CCF2 (GeneBLAzer™), CFP (Cyan Fluorescent Protein), CFP/YFP FRET, Chromomycin A3, Cl-NERF (low pH), CPM, 6-CR 6G, CTC Formazan, Cy2®, Cy3®, Cy3.5®, Cy5®, Cy5.5®, Cy7®, Cychrome (PE-Cy5), Dansylamine, Dansyl cadaverine, Dansylchloride, DAPI, Dapoxyl, DCFH, DHR, DiA (4-Di-16-ASP), DiD (DilC18 (5)), DIDS, Dil (DilC18(3)), DiO (DiOC18(3)), DiR (DilC18(7)), Di-4 ANEPPS, Di-8 ANEPPS, DM-NERF (4.5-6.5 pH), DsRed (Red Fluorescent Protein), EBFP, ECFP, EGFP, ELF®-97 alcohol, Eosin, Erythrosin, Ethidium bromide, Ethidium homodimer-1 (EthD-1), Europium (III) Chloride, 5-FAM (5-Carboxyfluorescein), Fast Blue, Fluorescein-dT phosphoramidite, FITC, Fluo-3, Fluo-4, FluorX@, Fluoro-Gold™ (high pH), Fluoro-Gold™ (low pH), Fluoro-Jade, FM® 1-43, Fura-2 (high calcium), Fura-2/BCECF, Fura Red™ (high calcium), Fura Red™/Fluo-3, GeneBLAzer™ (CCF2), GFP Red Shifted (rsGFP), GFP Wild Type, GFP/BFP FRET, GFP/DsRed FRET, Hoechst 33342 & 33258, 7-Hydroxy-4-methylcoumarin (pH 9), 1,5 IAEDANS, Indo-1 (high calcium), Indo-1 (low calcium), Indodicarbocyanine, Indotricarbocyanine, JC-1, 6-JOE, JOJO™-1/JO-PRO™-1, LDS 751 (+DNA), LDS 751 (+RNA), LOLO™-1/LO-PRO™-1, Lucifer Yellow, LysoSensor™ Blue (pH 5), LysoSensor™ Green (pH 5), LysoSensor™ Yellow/Blue (pH 4.2), LysoTracker® Green, LysoTracker® Red, LysoTracker® Yellow, Mag-Fura-2, Mag-Indo-1, Magnesium Green™, Marina Blue®, 4-Methylumbelliferone, Mithramycin, MitoTracker® Green, MitoTracker® Orange, MitoTracker® Red, NBD (amine), Nile Red, Oregon Green® 488, Oregon Green® 500, Oregon Green® 514, Pacific Blue, PBF1, PE (R-phycoerythrin), PE-Cy5, PE-Cy7, PE-Texas Red, PerCP (Peridinin chlorphyll protein), PerCP-Cy5.5 (TruRed), PharRed (APC-Cy7), C-phycocyanin, R-phycocyanin, R-phycoerythrin (PE), PI (Propidium Iodide), PKH26, PKH67, POPO™-1/PO-PRO™-1, POPO™-3/PO-PRO™-3, Propidium Iodide (PI), PyMPO, Pyrene, Pyronin Y, Quantam Red (PE-Cy5), Quinacrine Mustard, R670 (PE-Cy5), Red 613 (PE-Texas Red), Red Fluorescent Protein (DsRed), Resorufin, RH 414, Rhod-2, Rhodamine B, Rhodamine Green™, Rhodamine Red™, Rhodamine Phalloidin, Rhodamine 110, Rhodamine 123, 5-ROX (carboxy-X-rhodamine), S65A, S65C, S65L, S65T, SBFI, SITS, SNAFL®-1 (high pH), SNAFL®-2, SNARF®-1 (high pH), SNARF@-1 (low pH), Sodium Green™, SpectrumAqua®, SpectrumGreen® #1, SpectrumGreen® #2, SpectrumOrange®, SpectrumRed®, SYTO® 11, SYTO® 13, SYTO® 17, SYTO® 45, SYTOX® Blue, SYTOX® Green, SYTOX® Orange, 5-TAMRA (5-Carboxytetramethylrhodamine), Tetramethylrhodamine (TRITC), Texas Red®/Texas Red®-X, Texas Red®-X (NHS Ester), Thiadicarbocyanine, Thiazole Orange, TOTO®-1/TO-PRO®-1, TOTO@-3/TO-PRO®-3, TO-PRO®-5, Tri-color (PE-Cy5), TRITC (Tetramethylrhodamine), TruRed (PerCP-Cy5.5), WW 781, X-Rhodamine (XRITC), Y66F, Y66H, Y66W, YFP (Yellow Fluorescent Protein), YOYO@-1/YO-PRO@-1, YOYO@-3/YO-PRO®-3, 6-FAM (Fluorescein), 6-FAM (NHS Ester), 6-FAM (Azide), HEX, TAMRA (NHS Ester), Yakima Yellow, MAX, TET, TEX615, ATTO 488, ATTO 532, ATTO 550, ATTO 565, ATTO Rho101, ATTO 590, ATTO 633, ATTO 647N, TYE 563, TYE 665, TYE 705, 5' IRDye® 700, 5' IRDye® 800, 5' IRDye® 800CW (NHS Ester), WellRED D4 Dye, WellRED D3 Dye, WellRED D2 Dye, Lightcycler® 640 (NHS Ester), and Dy 750 (NHS Ester).

As mentioned above, in some embodiments, a detectable label is or includes a luminescent or chemiluminescent moiety. Common luminescent/chemiluminescent moieties include, but are not limited to, peroxidases such as horseradish peroxidase (HRP), soybean peroxidase (SP), alkaline phosphatase, and luciferase. These protein moieties can catalyze chemiluminescent reactions given the appropriate substrates (e.g., an oxidizing reagent plus a chemiluminescent compound. A number of compound families can provide chemiluminescence under a variety of conditions. Non-limiting examples of chemiluminescent compound families include 2,3-dihydro-1,4-phthalazinedione luminol, 5-amino-6,7,8-trimethoxy- and the dimethylamino[ca]benz analog. These compounds can luminesce in the presence of alkaline hydrogen peroxide or calcium hypochlorite and base. Other examples of chemiluminescent compound families include, e.g., 2,4,5-triphenylimidazoles, para-dimethylamino and -methoxy substituents, oxalates such as oxalyl active esters, p-nitrophenyl, N-alkyl acridinum esters, luciferins, lucigenins, or acridinium esters. In some embodiments, a detectable label is or includes a metal-based or mass-based label. For example, small cluster metal ions, metals, or semiconductors may act as a mass code. In some examples, the metals can be selected from Groups 3-15 of the periodic table, e.g., Y, La, Ag, Au, Pt, Ni, Pd, Rh, Ir, Co, Cu, Bi, or a combination thereof.

EXAMPLE

The following example is included for illustrative purposes only and is not intended to limit the scope of the present disclosure.

Example 1: Detection of Target RNA Molecules in a Sample Using Probe Pairs with Split Barcode Regions This example demonstrates a method for detecting RNA molecules in a biological sample in situ. In particular, a "split split" probe pair including a first and second probe with both a split target hybridization region and split barcode region can be used to enhance detection specificity by "blinding out" (e.g., not detecting) incorrectly ligated probe pairs formed due to nonspecific probe hybridization and ligation.

Figure 6A:
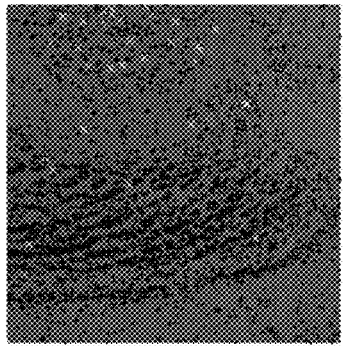
FIG. 6A shows exemplary probes for detecting Gpr88 RNA molecules in mouse brain tissues. Gpr88 RNA molecules Gpr88_5 (SEQ ID NO: 1), Gpr88_3 (SEQ ID NO: 2) as well as scramble molecules Scramble_5 (SEQ ID NO: 3) and Scramble_3 (SEQ ID NO: 4).

A pair of split probes for Gpr88 (Gpr88_5 and Gpr88_3 shown in FIG. 6A) were used to detect mRNA transcripts in fresh frozen mouse brain tissue sections. A pair of scramble split probes (Scramble_5 and Scramble_3 shown in FIG. 6A) having scrambled hybridization region sequences were used as control.

```
Gpr88_5 (SEQ ID NO: 1):
AACTCACGACGGTGTACACATGCGTCTATTTAGTGGAGCCATAGGCGTAA.

Gpr88_3 (SEQ ID NO: 2):
CGACGTATAGTCTACGAGTTTGCAGTCACGGGGCCTGAGGTCTCAGTGGC.

Scramble_5 (SEQ ID NO: 3):
NNNNNNNNNNNNNNNNNNNNNNTGCGTCTATTTAGTGGAGCCTGACCCGTGC,
``` each N can independently be any nucleotide residue.

```
Scramble_3 (SEQ ID NO: 4):
CCATAGGTATTCTACGAGTTTGCAGTCACGNNNNNNNNNNNNNNNNNNNN,
``` each N can independently be any nucleotide residue.

The split probe pairs were hybridized to the tissue samples in a hybridization buffer including SSC and formamide and incubated. For probe pairs hybridized to RNA in the samples, the "lower ligation" (between the hybridization regions) was performed using SplintR® ligase in a SplintR® ligase buffer, and the samples were washed. The "upper ligation" (of the split barcode region of the ligated probe pairs) was performed using either template-independent ligation or templated ligation. For template-independent ligation, CircLigase™ in a CircLigase™ ligase buffer. For templated ligation, splints for the Gpr88 probes and the scramble probes were used to template ligation by T4 DNA ligase in a T4 DNA ligase buffer. The samples were washed before rolling circle amplification (RCA) of the circularized probes using a RCA reaction mixture containing a Phi29 reaction buffer, dNTPs, and Phi29 polymerase. RCA products in the samples were detected using fluorescently-labelled detectable probes. The scramble split probes were detected using fluorescently-labelled detectable probes that hybridize to an anchor sequence on either of the split probes (e.g., the first or second probe) and the gpr88 probes were detected using fluorescently-labelled detectable probes that bound the split barcode region across the split probes (e.g., across the first and second probe).

Figure 6B:
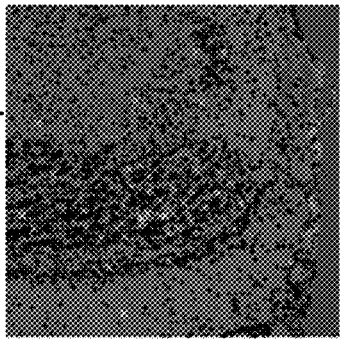
FIG. 6B shows exemplary images of fluorescent signals associated with RCA products using CircLigase™ (FIG. 6B, left image) or T4 DNA ligase (FIG. 6B, right image) for split barcode ligation.

FIG. 6B shows exemplary images of fluorescent signals associated with RCA products (for Gpr88 probes or scramble probes) using CircLigase™ (FIG. 6B, left image) or T4 DNA ligase (FIG. 6B, right image) for split barcode ligation. In both experiments, as expected, the scrambled probes generated gene-unspecific signals through detection of random RNA or DNA sequences across the sample. By detecting an anchor sequence in the probe region between the target hybridization region and the barcode region, it was possible to observe signals generated by "half circles," indicating that circularizable probes (e.g., padlock probes) with conventional, non-split barcode sequences would give rise to non-specific, false positive signals. In contrast, using a split barcode design disclosed herein, only true positive signals where both correct split probe pairs come together forming a matching composite probe, the presence of the target nucleic acid molecule would be detected. FIG. 6B shows specific signals for Gpr88 can be detected by using the "split split" probe design to render false positive signals from chimeric probes undetectable.

These results demonstrate that the "split split" probe design can be used to reduce and/or distinguish false positive signals and enhance detection specificity, particularly for detecting RNA molecules in situ in a sample.

The present disclosure is not intended to be limited in scope to the particular disclosed embodiments, which are provided, for example, to illustrate various aspects of the disclosure. Various modifications to the compositions and methods described will become apparent from the description and teachings herein. Such variations may be practiced without departing from the true scope and spirit of the disclosure and are intended to fall within the scope of the present disclosure.

The invention claimed is:

1. A method for analyzing a biological sample, comprising:
   (a) contacting the biological sample with:
      (i) a first probe comprising a first hybridization region and a first portion of a barcode region, and
      (ii) a second probe comprising a second hybridization region and a second portion of the barcode region,
      wherein the first and second hybridization regions are complementary to target sequences in a target RNA molecule in the biological sample,
      wherein the first probe and the second probe hybridize to the target RNA molecule in the biological sample, and
      wherein the barcode region comprises one or more barcode sequences corresponding to the target RNA molecule;
   (b) ligating the first and second probes hybridized to the target RNA molecule to form a composite probe by connecting the first and second portions of the barcode region and by connecting the ends of the first hybridization region and the second hybridization region; and
   (c) contacting the biological sample with a detectable probe that hybridizes to the barcode region at sequences corresponding to both the first portion of the barcode region and the second portion of the barcode region, or a complement thereof,
      wherein a signal associated with the detectable probe is detected in the biological sample, thereby detecting the target RNA molecule in the biological sample.

2. The method of claim 1, wherein the first probe comprises one or more ribonucleotides at or near a ligatable 3' end of the first probe, or the second probe comprises one or more ribonucleotides at or near a ligatable 3' end of the second probe.

3. The method of claim 1, wherein the ends of the first hybridization region and the second hybridization region are ligated using enzymatic ligation or chemical ligation, with or without gap filling prior to ligation.

4. The method of claim 1, wherein the ends of the first hybridization region and the second hybridization region are ligated using template-dependent ligation or template-independent ligation, with or without gap filling prior to ligation.

5. The method of claim 1, wherein the ends of the first hybridization region and the second hybridization region are ligated using a ligase having an RNA-templated ligase activity.

6. The method of claim 1, wherein the ends of the first hybridization region and the second hybridization region are ligated using a ligase selected from the group consisting of a Chlorella virus DNA ligase (PBCV DNA ligase), a T4 RNA ligase, a T4 DNA ligase, and a single-stranded DNA (ssDNA) ligase.

7. The method of claim 1, wherein the ends of the first and second portions of the barcode region are ligated using enzymatic ligation or chemical ligation, with or without gap filling prior to ligation.

8. The method of claim 1, wherein the ends of the first and second portions of the barcode region are ligated using a splint that hybridizes to (i) the first portion or a subportion thereof and (ii) the second portion or a subportion thereof.

9. The method of claim 8, further comprising removing an additional splint comprising a mismatch with (i) the first portion of the barcode region and/or (ii) the second of the barcode region, whereas under the same conditions, the splint that hybridizes to both (i) the first portion and (ii) the second portion of the barcode region remains hybridized to the barcode region for subsequent ligation.

10. The method of claim 1, comprising removing a detectable probe comprising a mismatch with (i) the first portion or a subportion thereof or (ii) the second portion or a subportion thereof, whereas under the same conditions, the detectable probe complementary to both (i) the first portion or a subportion thereof and (ii) the second portion or a subportion thereof remain hybridized to the barcode region or complement thereof.

11. The method of claim 1, comprising circularizing the composite probe and generating a rolling circle amplification (RCA) product of the circularized composite probe, wherein the RCA product comprises multiple copies of the complement of the barcode region.

12. The method of claim 1, wherein the detectable probe comprises a detectable label or a sequence complementary to a sequence of a detectably labelled probe.

13. The method of claim 1, wherein the composite probe or a product thereof is generated in situ in the biological sample or in a matrix embedding the biological sample or molecules thereof.

14. The method of claim 1, wherein the method comprises imaging the biological sample to detect the signal associated with the detectable probe.

15. A method for analyzing a biological sample, comprising:
   (a) contacting the biological sample with:
      (i) a first probe comprising a first hybridization region and a first barcode sequence, and
      (ii) a second probe comprising a second hybridization region and a second barcode sequence,
      wherein the first and second hybridization regions are complementary to adjacent target sequences in a target RNA molecule in the biological sample, wherein the first probe and the second probe hybridize to the target RNA molecule in the biological sample, and wherein the first and second barcode sequences each corresponds to the target RNA molecule;

(b) ligating the first and second probes hybridized to the target RNA molecule, wherein the ligating comprises:
  (i) ligating the first and second hybridization regions hybridized to the adjacent target sequences using the target RNA molecule as a template, and
  (ii) ligating the first barcode sequence and the second barcode sequence to form a composite probe comprising the first and second barcode sequences corresponding to the target RNA molecule, wherein the composite probe is a circular probe;

(c) generating a rolling circle amplification product of the composite probe; and (d) contacting the biological sample with a detectable probe that hybridizes to the composite probe or a complement thereof in the rolling circle amplification product at sequences corresponding to both the first and second barcode sequences, wherein a signal associated with the detectable probe is detected in the biological sample, thereby detecting the target RNA molecule in the biological sample.

16. The method of claim 15, comprising:

contacting the biological sample with the detectable probe which is an intermediate probe, wherein the intermediate probe is detectable using a detectably-labeled probe, and dehybridizing the intermediate probe or the detectably-labeled probe, wherein the contacting and dehybridizing steps are repeated with one or more other intermediate probes or one or more other detectably-labeled probes.

17. The method of claim 15, wherein the ends of the first and second barcode sequences are ligated using a splint.

18. A system for analyzing a biological sample, comprising:
  (a) a first probe comprising a first hybridization region and a first portion of a barcode sequence;
  (b) a second probe comprising a second hybridization region and a second portion of the barcode sequence,
  wherein the first and second hybridization regions are complementary to adjacent target sequences in a target RNA molecule, and the barcode sequence corresponds to the target RNA molecule;
  (c) a splint that hybridizes to the first and second probes for ligation of the first and second portions to form a composite probe comprising the barcode sequence;
  wherein (i) the first and second portions of the barcode sequence are no more than 10 nucleotides in length, and the barcode sequence is at least 15 nucleotides in length; and/or (ii) the splint is single-stranded; and
  a detectable probe that hybridizes to the barcode region at sequences corresponding to both the first portion of the barcode region and the second portion of the barcode region or a complement thereof.

19. The system of claim 18, further comprising a plurality of pairs of first and second probes, wherein: the first probe of each pair comprises a first hybridization region and a first portion of a barcode sequence, and the second probe of each pair comprises a second hybridization region and a second portion of the barcode sequence, and wherein the first and second hybridization regions of each pair of first and second probes hybridize to corresponding target sequences in a target nucleic acid molecule.

20. The system of claim 19, comprising at least 10 distinguishable first probes, at least 10 distinguishable second probes, and at least 10 distinguishable splints for each corresponding pair of first and second probes.

* * * * *

SEQUENCE LISTING

```
Sequence total quantity: 4
SEQ ID NO: 1            moltype = DNA  length = 50
FEATURE                 Location/Qualifiers
source                  1..50
                        mol_type = other DNA
                        organism = synthetic construct
SEQUENCE: 1
aactcacgac ggtgtacaca tgcgtctatt tagtggagcc ataggcgtaa            50

SEQ ID NO: 2            moltype = DNA  length = 50
FEATURE                 Location/Qualifiers
source                  1..50
                        mol_type = other DNA
                        organism = synthetic construct
SEQUENCE: 2
cgacgtatag tctacgagtt tgcagtcacg gggcctgagg tctcagtggc            50
```

```
SEQ ID NO: 3              moltype = DNA  length = 50
FEATURE                   Location/Qualifiers
source                    1..50
                          mol_type = other DNA
                          organism = synthetic construct
SEQUENCE: 3
nnnnnnnnnn nnnnnnnnnn tgcgtctatt tagtggagcc tgacccgtgc          50

SEQ ID NO: 4              moltype = DNA  length = 50
FEATURE                   Location/Qualifiers
source                    1..50
                          mol_type = other DNA
                          organism = synthetic construct
SEQUENCE: 4
ccataggtat tctacgagtt tgcagtcacg nnnnnnnnnn nnnnnnnnnn          50
```